US012675658B2

(12) United States Patent
Sanderson et al.

(10) Patent No.: US 12,675,658 B2
(45) Date of Patent: Jul. 7, 2026

(54) ADAPTABLE QR CODES TO LAUNCH CUSTOMIZED EXPERIENCES

(71) Applicant: PAYPAL, INC., San Jose, CA (US)

(72) Inventors: Oscar Charles Edward Sanderson, Singapore (SG); Rajvijay Govindaraju, Singapore (SG); Nitin Prabhu, Fremont, CA (US); Patrick Babcock, Sturbridge, MA (US); Susheela Tirukavalluri, Manteca, CA (US); William Lowell Conway, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/566,553

(22) PCT Filed: May 27, 2022

(86) PCT No.: PCT/US2022/031397
§ 371 (c)(1),
(2) Date: Dec. 1, 2023

(87) PCT Pub. No.: WO2022/256260
PCT Pub. Date: Dec. 8, 2022

(65) Prior Publication Data
US 2024/0256815 A1 Aug. 1, 2024

(51) Int. Cl.
*G06K 19/06* (2006.01)
*G06F 16/9035* (2019.01)
(Continued)

(52) U.S. Cl.
CPC ... *G06K 19/06037* (2013.01); *G06F 16/9035* (2019.01); *G06Q 20/4015* (2020.05);
(Continued)

(58) Field of Classification Search
CPC ........... G06K 19/06037; G06K 7/1417; G06K 19/06103; G06F 16/9035; G06Q 20/4015;
(Continued)

(56) References Cited

U.S. PATENT DOCUMENTS

| 10,230,705 | B1 * | 3/2019 | Joshi | ..................... H04L 63/123 |
| 2013/0175337 | A1 | 7/2013 | Briancon | |
| 2013/0191213 | A1 * | 7/2013 | Beck | .................. G06Q 30/0207 |
| | | | | 705/14.64 |
| 2014/0229251 | A1 | 8/2014 | Lim | |

(Continued)

FOREIGN PATENT DOCUMENTS

WO 2018092956 A1 5/2018

*Primary Examiner* — Edwyn Labaze
(74) *Attorney, Agent, or Firm* — Greenberg Traurig, LLP

(57) ABSTRACT

Systems, computer-implemented methods, apparatus, and/or computer program products that can facilitate adaptable QR codes to launch customized experiences are provided. In various embodiments, a system can receive, from a client device, a quick response (QR) code, a client identifier, and location data associated with the client device. In various aspects, the system can identify, from a plurality of merchants, a first merchant that corresponds to the QR code, based on identifying that the first merchant corresponds to the location data. In various instances, the system can identify, from a plurality of client profiles, a first client profile that corresponds to the client identifier. In various cases, the system can identify a digital content based on the first merchant and the first client profile. In various aspects, the system can cause the digital content to be provided to the client device.

20 Claims, 26 Drawing Sheets

(51) Int. Cl.

| | |
|---|---|
| *G06Q 20/40* | (2012.01) |
| *G06Q 30/0226* | (2023.01) |
| *G06Q 30/0241* | (2023.01) |
| *G06Q 30/0601* | (2023.01) |
| *H04L 67/306* | (2022.01) |

(52) U.S. Cl.
CPC ..... *G06Q 30/0226* (2013.01); *G06Q 30/0241* (2013.01); *G06Q 30/0631* (2013.01); *H04L 67/306* (2013.01)

(58) Field of Classification Search
CPC .......... G06Q 30/0226; G06Q 30/0241; G06Q 30/0631; H04L 67/306
USPC ......................... 235/492, 487, 462.09, 462.1
See application file for complete search history.

(56) References Cited

U.S. PATENT DOCUMENTS

| | | | |
|---|---|---|---|
| 2014/0279474 A1* | 9/2014 | Evans .................... | G06Q 20/40 705/41 |
| 2015/0019444 A1* | 1/2015 | Purves .............. | G06Q 20/3821 705/76 |
| 2016/0164958 A1 | 6/2016 | Sharan | |
| 2016/0253127 A1* | 9/2016 | Panda ............. | G06K 19/06112 358/1.15 |
| 2016/0253651 A1* | 9/2016 | Park ....................... | G06Q 20/34 705/39 |
| 2018/0198615 A1* | 7/2018 | Neumann ........... | H04L 63/0853 |
| 2023/0214478 A1* | 7/2023 | Ballew ................ | G06K 7/1417 726/19 |

* cited by examiner

400
MERCHANT REPOSITORY 302
406
404
402
MERCHANT 1.1 • • • MERCHANT 1.*M*
MERCHANT *N.1* • • • MERCHANT *N.M*
LOCATION INDICATOR 1.1 • • • LOCATION INDICATOR 1.*M*
LOCATION INDICATOR *N.1* • • • LOCATION INDICATOR *N.M*
QR CODE 1 • • • QR CODE *N*
FIG. 4

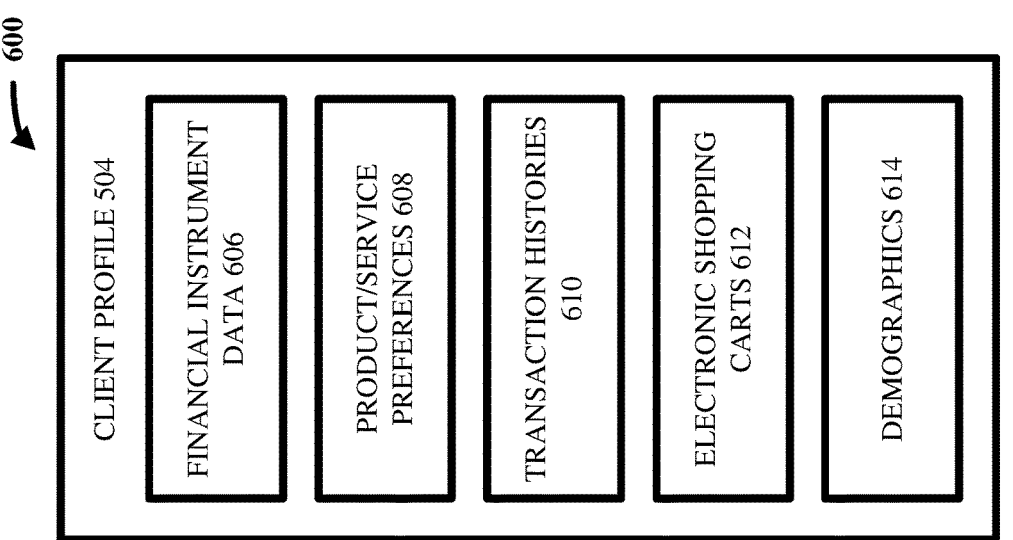
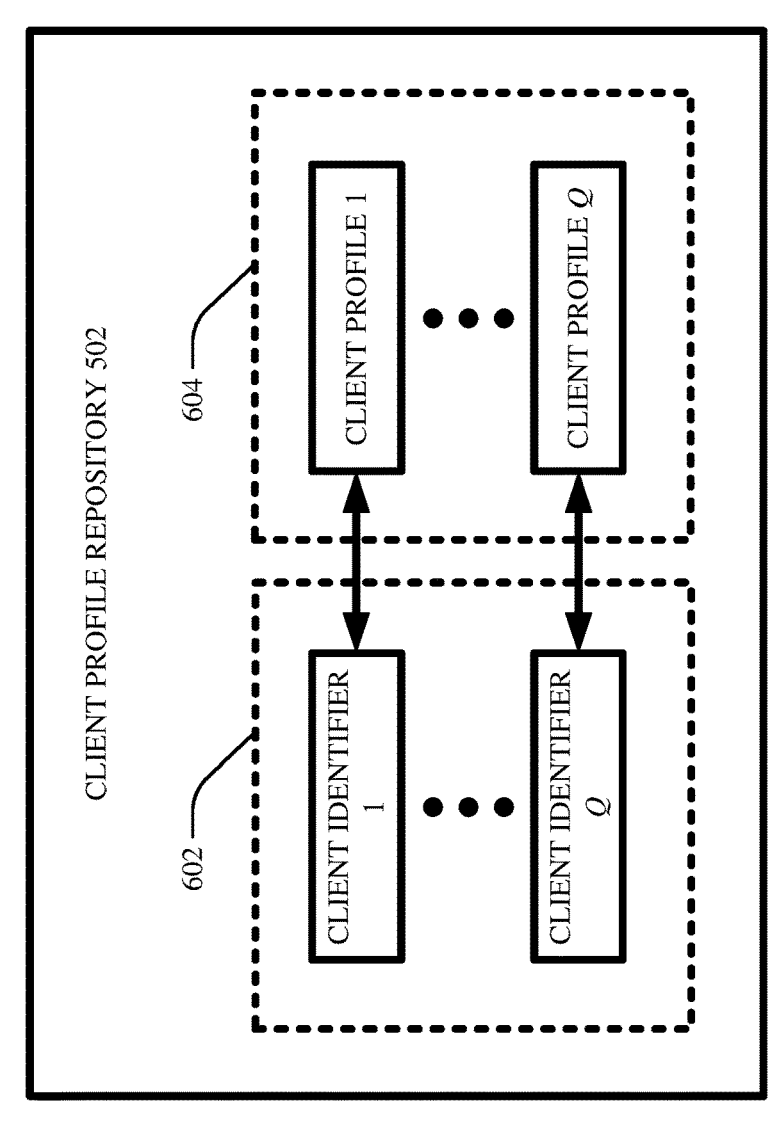
FIG. 6

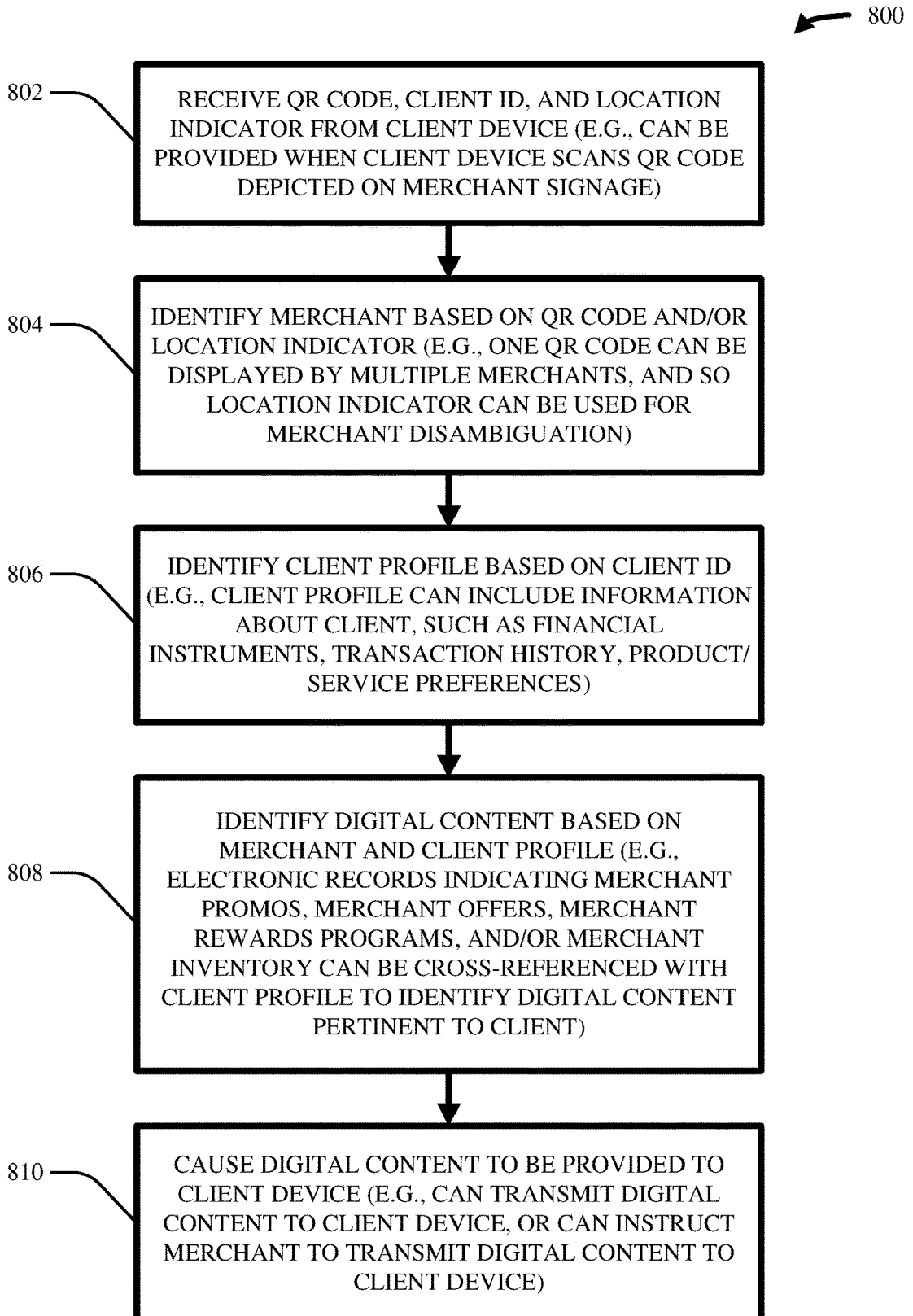

800

802 — RECEIVE QR CODE, CLIENT ID, AND LOCATION INDICATOR FROM CLIENT DEVICE (E.G., CAN BE PROVIDED WHEN CLIENT DEVICE SCANS QR CODE DEPICTED ON MERCHANT SIGNAGE)

804 — IDENTIFY MERCHANT BASED ON QR CODE AND/OR LOCATION INDICATOR (E.G., ONE QR CODE CAN BE DISPLAYED BY MULTIPLE MERCHANTS, AND SO LOCATION INDICATOR CAN BE USED FOR MERCHANT DISAMBIGUATION)

806 — IDENTIFY CLIENT PROFILE BASED ON CLIENT ID (E.G., CLIENT PROFILE CAN INCLUDE INFORMATION ABOUT CLIENT, SUCH AS FINANCIAL INSTRUMENTS, TRANSACTION HISTORY, PRODUCT/ SERVICE PREFERENCES)

808 — IDENTIFY DIGITAL CONTENT BASED ON MERCHANT AND CLIENT PROFILE (E.G., ELECTRONIC RECORDS INDICATING MERCHANT PROMOS, MERCHANT OFFERS, MERCHANT REWARDS PROGRAMS, AND/OR MERCHANT INVENTORY CAN BE CROSS-REFERENCED WITH CLIENT PROFILE TO IDENTIFY DIGITAL CONTENT PERTINENT TO CLIENT)

810 — CAUSE DIGITAL CONTENT TO BE PROVIDED TO CLIENT DEVICE (E.G., CAN TRANSMIT DIGITAL CONTENT TO CLIENT DEVICE, OR CAN INSTRUCT MERCHANT TO TRANSMIT DIGITAL CONTENT TO CLIENT DEVICE)

MERCHANT
DEVICE 1002

ADAPTABLE QR
CODE SYSTEM 102

CLIENT DEVICE
104

MERCHANT
SIGNAGE 106

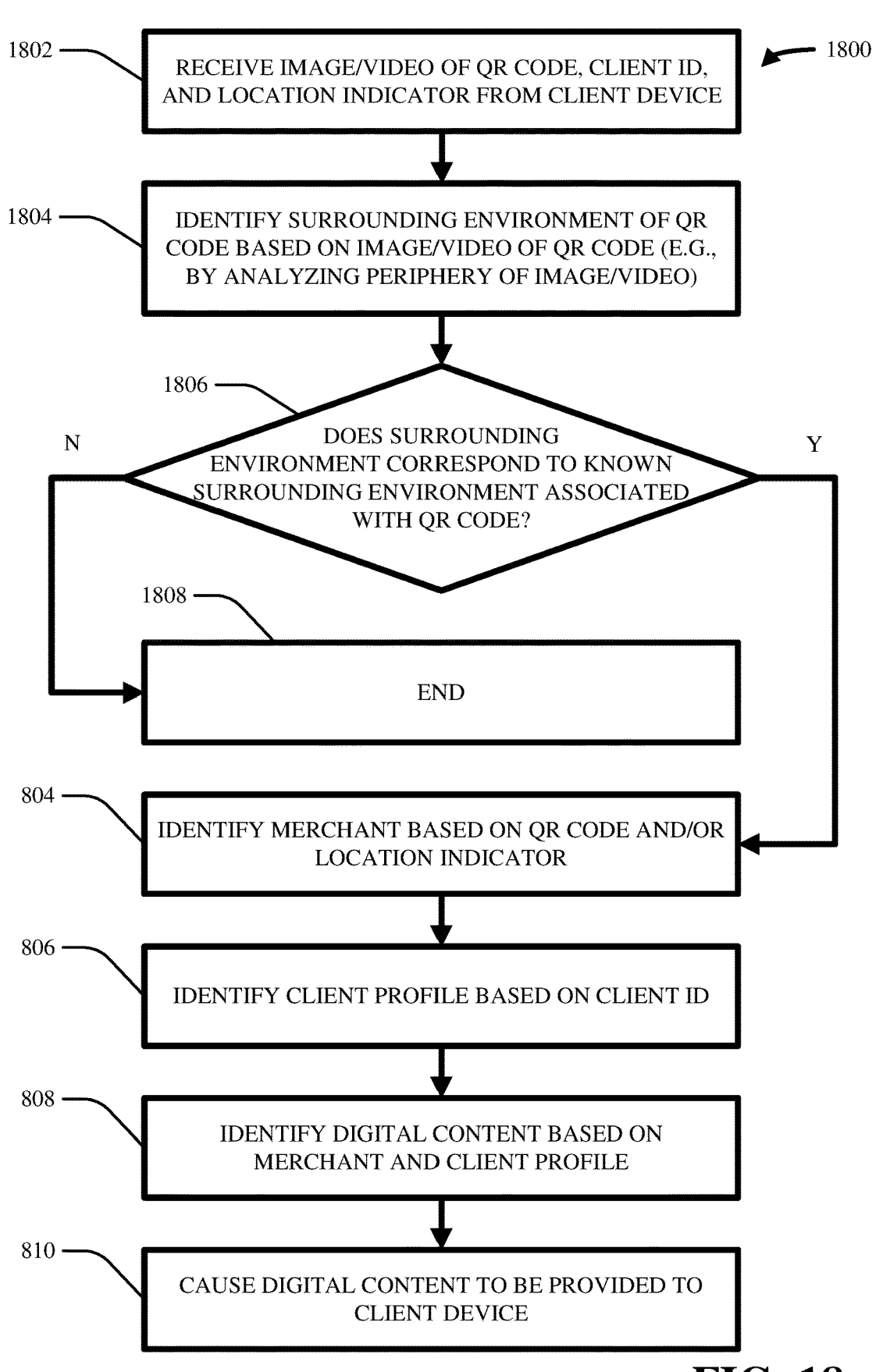

1800

1802 — RECEIVE IMAGE/VIDEO OF QR CODE, CLIENT ID, AND LOCATION INDICATOR FROM CLIENT DEVICE

1804 — IDENTIFY SURROUNDING ENVIRONMENT OF QR CODE BASED ON IMAGE/VIDEO OF QR CODE (E.G., BY ANALYZING PERIPHERY OF IMAGE/VIDEO)

1806 — DOES SURROUNDING ENVIRONMENT CORRESPOND TO KNOWN SURROUNDING ENVIRONMENT ASSOCIATED WITH QR CODE?

N       Y

1808 — END

804 — IDENTIFY MERCHANT BASED ON QR CODE AND/OR LOCATION INDICATOR

806 — IDENTIFY CLIENT PROFILE BASED ON CLIENT ID

808 — IDENTIFY DIGITAL CONTENT BASED ON MERCHANT AND CLIENT PROFILE

810 — CAUSE DIGITAL CONTENT TO BE PROVIDED TO CLIENT DEVICE

FIG. 18

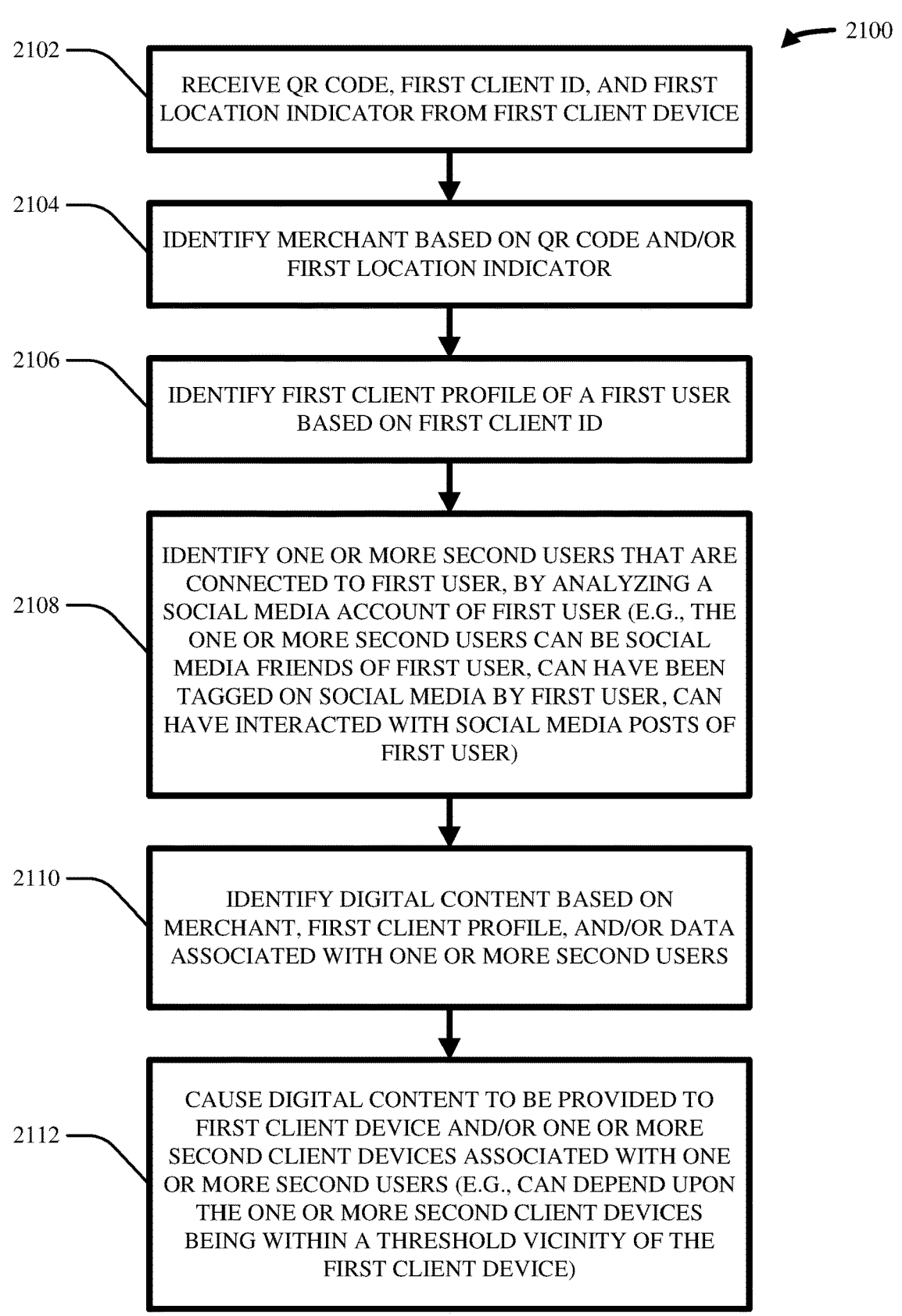

2100

2102 — RECEIVE QR CODE, FIRST CLIENT ID, AND FIRST LOCATION INDICATOR FROM FIRST CLIENT DEVICE

2104 — IDENTIFY MERCHANT BASED ON QR CODE AND/OR FIRST LOCATION INDICATOR

2106 — IDENTIFY FIRST CLIENT PROFILE OF A FIRST USER BASED ON FIRST CLIENT ID

2108 — IDENTIFY ONE OR MORE SECOND USERS THAT ARE CONNECTED TO FIRST USER, BY ANALYZING A SOCIAL MEDIA ACCOUNT OF FIRST USER (E.G., THE ONE OR MORE SECOND USERS CAN BE SOCIAL MEDIA FRIENDS OF FIRST USER, CAN HAVE BEEN TAGGED ON SOCIAL MEDIA BY FIRST USER, CAN HAVE INTERACTED WITH SOCIAL MEDIA POSTS OF FIRST USER)

2110 — IDENTIFY DIGITAL CONTENT BASED ON MERCHANT, FIRST CLIENT PROFILE, AND/OR DATA ASSOCIATED WITH ONE OR MORE SECOND USERS

2112 — CAUSE DIGITAL CONTENT TO BE PROVIDED TO FIRST CLIENT DEVICE AND/OR ONE OR MORE SECOND CLIENT DEVICES ASSOCIATED WITH ONE OR MORE SECOND USERS (E.G., CAN DEPEND UPON THE ONE OR MORE SECOND CLIENT DEVICES BEING WITHIN A THRESHOLD VICINITY OF THE FIRST CLIENT DEVICE)

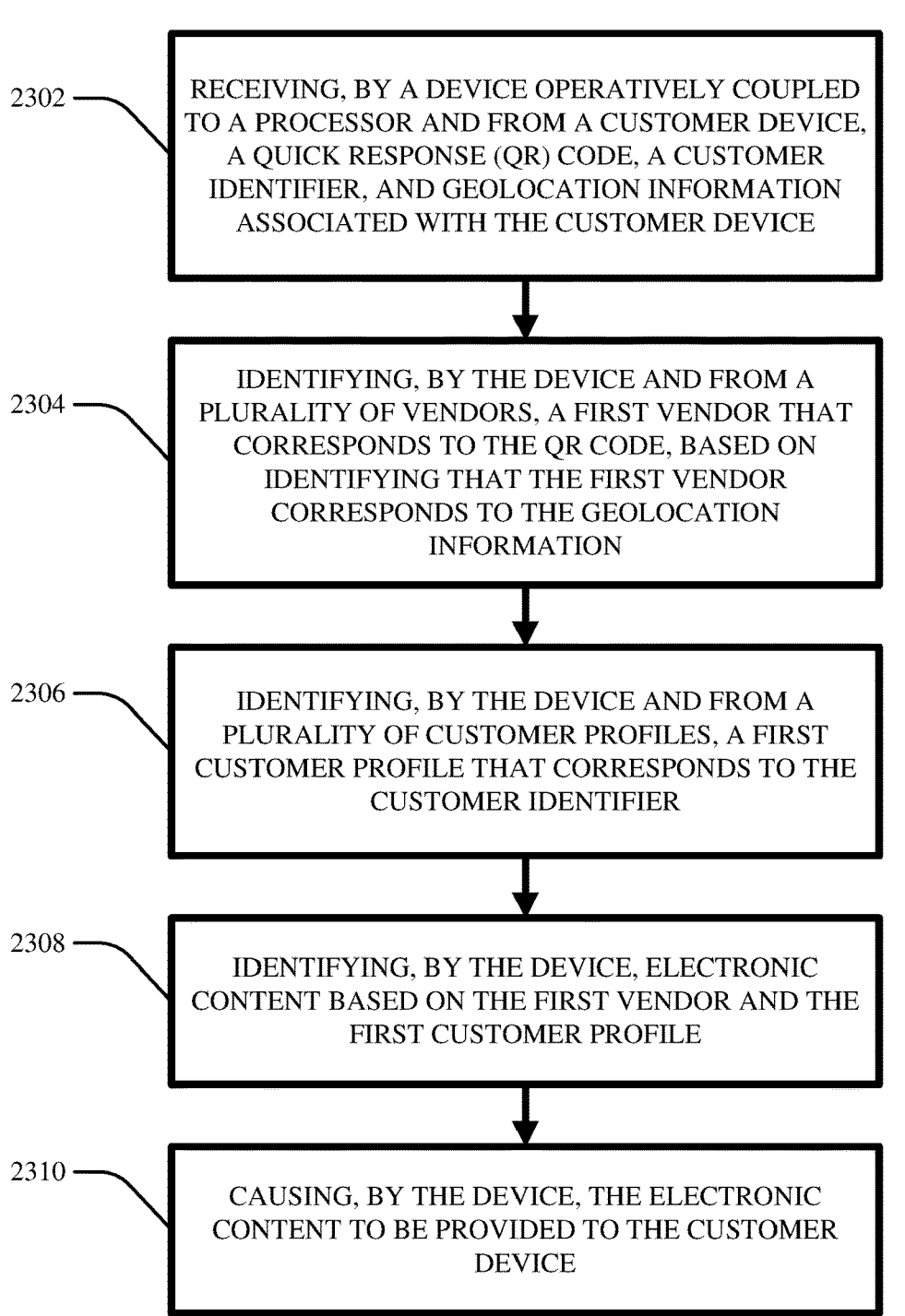

2302 — RECEIVING, BY A DEVICE OPERATIVELY COUPLED TO A PROCESSOR AND FROM A CUSTOMER DEVICE, A QUICK RESPONSE (QR) CODE, A CUSTOMER IDENTIFIER, AND GEOLOCATION INFORMATION ASSOCIATED WITH THE CUSTOMER DEVICE

2304 — IDENTIFYING, BY THE DEVICE AND FROM A PLURALITY OF VENDORS, A FIRST VENDOR THAT CORRESPONDS TO THE QR CODE, BASED ON IDENTIFYING THAT THE FIRST VENDOR CORRESPONDS TO THE GEOLOCATION INFORMATION

2306 — IDENTIFYING, BY THE DEVICE AND FROM A PLURALITY OF CUSTOMER PROFILES, A FIRST CUSTOMER PROFILE THAT CORRESPONDS TO THE CUSTOMER IDENTIFIER

2308 — IDENTIFYING, BY THE DEVICE, ELECTRONIC CONTENT BASED ON THE FIRST VENDOR AND THE FIRST CUSTOMER PROFILE

2310 — CAUSING, BY THE DEVICE, THE ELECTRONIC CONTENT TO BE PROVIDED TO THE CUSTOMER DEVICE

FIG. 23

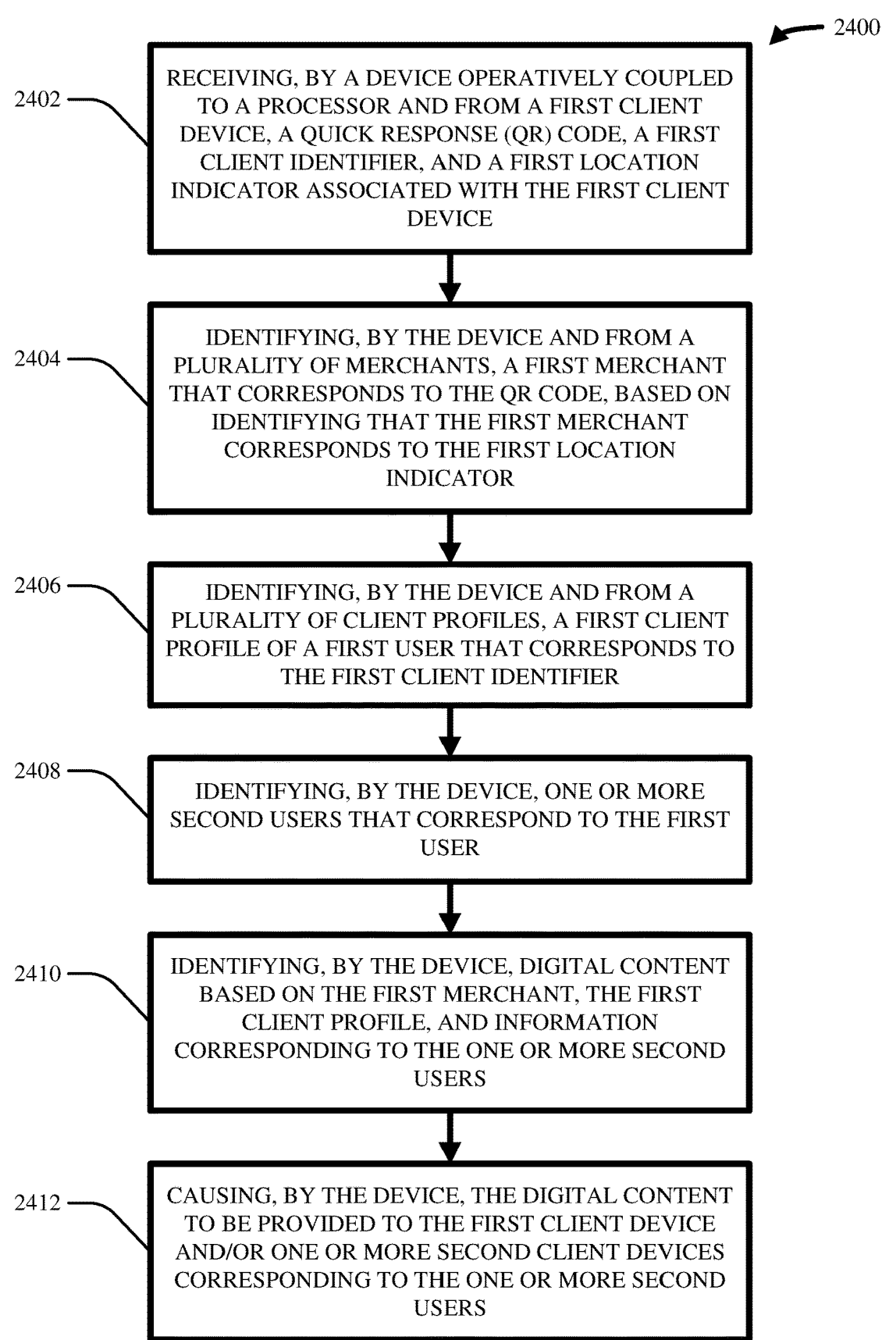

2400

2402 — RECEIVING, BY A DEVICE OPERATIVELY COUPLED TO A PROCESSOR AND FROM A FIRST CLIENT DEVICE, A QUICK RESPONSE (QR) CODE, A FIRST CLIENT IDENTIFIER, AND A FIRST LOCATION INDICATOR ASSOCIATED WITH THE FIRST CLIENT DEVICE

2404 — IDENTIFYING, BY THE DEVICE AND FROM A PLURALITY OF MERCHANTS, A FIRST MERCHANT THAT CORRESPONDS TO THE QR CODE, BASED ON IDENTIFYING THAT THE FIRST MERCHANT CORRESPONDS TO THE FIRST LOCATION INDICATOR

2406 — IDENTIFYING, BY THE DEVICE AND FROM A PLURALITY OF CLIENT PROFILES, A FIRST CLIENT PROFILE OF A FIRST USER THAT CORRESPONDS TO THE FIRST CLIENT IDENTIFIER

2408 — IDENTIFYING, BY THE DEVICE, ONE OR MORE SECOND USERS THAT CORRESPOND TO THE FIRST USER

2410 — IDENTIFYING, BY THE DEVICE, DIGITAL CONTENT BASED ON THE FIRST MERCHANT, THE FIRST CLIENT PROFILE, AND INFORMATION CORRESPONDING TO THE ONE OR MORE SECOND USERS

2412 — CAUSING, BY THE DEVICE, THE DIGITAL CONTENT TO BE PROVIDED TO THE FIRST CLIENT DEVICE AND/OR ONE OR MORE SECOND CLIENT DEVICES CORRESPONDING TO THE ONE OR MORE SECOND USERS

FIG. 24

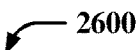
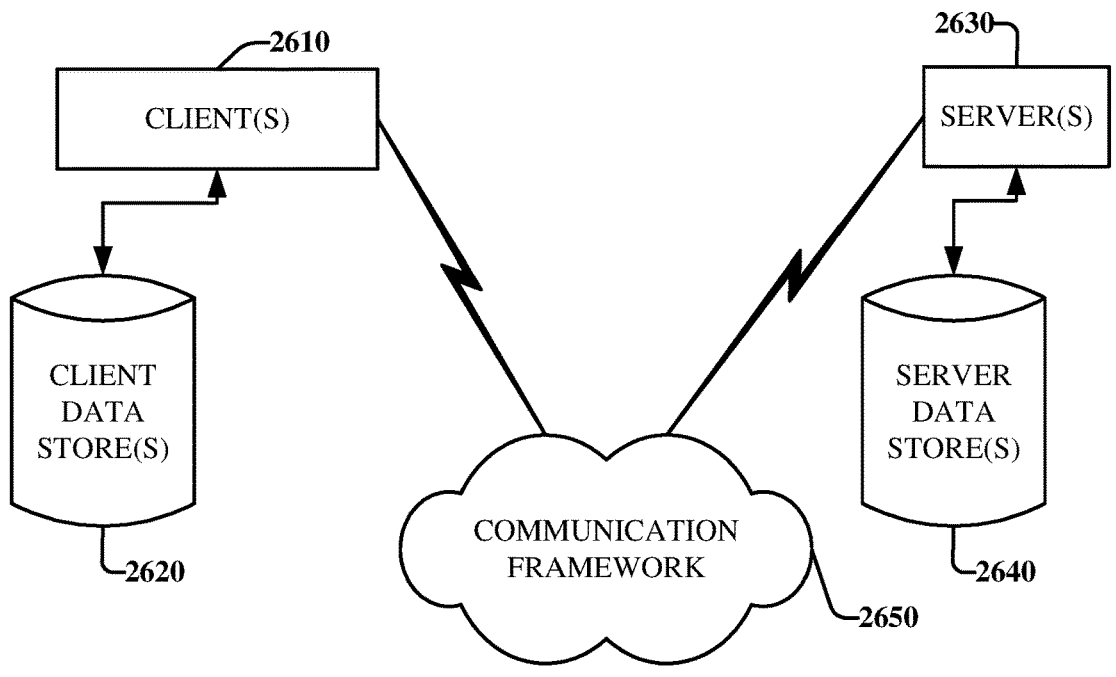
FIG. 26

ADAPTABLE QR CODES TO LAUNCH CUSTOMIZED EXPERIENCES

CROSS REFERENCE TO RELATED APPLICATIONS

This application is a national phase of application no. PCT/US2022/31397, which claims priority to U.S. Non-Provisional patent application Ser. No. 17/335,736 filed Jun. 1, 2021 and entitled "ADAPTABLE QR CODES TO LAUNCH CUSTOMIZED EXPERIENCES," the entireties of which are incorporated herein by reference.

TECHNICAL FIELD

The subject disclosure relates generally to quick response (QR) codes, and more specifically to computing devices that can facilitate adaptable QR codes to launch customized experiences.

BACKGROUND

Conventionally, a client device can scan a quick response (QR) code that is displayed on a merchant signage. Based on such scanning, the client device can be provided with digital content that corresponds to the QR code. Because such digital content is based only upon the QR code, such digital content is uniform across different client devices and thus across different customers. Additionally, because such digital content is based only upon the QR code, there is no reason for the client device to scan the QR code again in the future. In other words, implementation of conventional techniques results in un-customizable digital content and causes merchant signages to have reduced half-lives.

Systems and/or techniques that can ameliorate one or more of these issues are desirable.

BRIEF DESCRIPTION OF THE DRAWINGS

FIG. 4 illustrates a high-level block diagram of an example, non-limiting merchant repository in accordance with one or more embodiments described herein.

FIG. 6 illustrates a high-level block diagram of an example, non-limiting client profile repository in accordance with one or more embodiments described herein.

FIG. 8 illustrates a flow diagram of an example, non-limiting computer-implemented method that facilitates adaptable QR codes for customized experiences in accordance with one or more embodiments described herein.

FIGS. 9-10 illustrate communication diagrams of example, non-limiting workflows that facilitate adaptable QR codes for customized experiences in accordance with one or more embodiments described herein.

FIG. 18 illustrates a flow diagram of an example, non-limiting computer-implemented method that facilitates surrounding-based fraud prevention for adaptable QR codes that launch customized experiences in accordance with one or more embodiments described herein.

FIG. 21 illustrates a flow diagram of an example, non-limiting computer-implemented method that facilitates adaptable QR codes for customized experiences with connected users in accordance with one or more embodiments described herein.

FIGS. 23-24 illustrate flow diagrams of example, non-limiting computer-implemented methods that facilitate adaptable QR codes for customized experiences in accordance with one or more embodiments described herein.

FIG. 26 illustrates an example networking environment operable to execute various implementations described herein.

DETAILED DESCRIPTION

Figure 1:
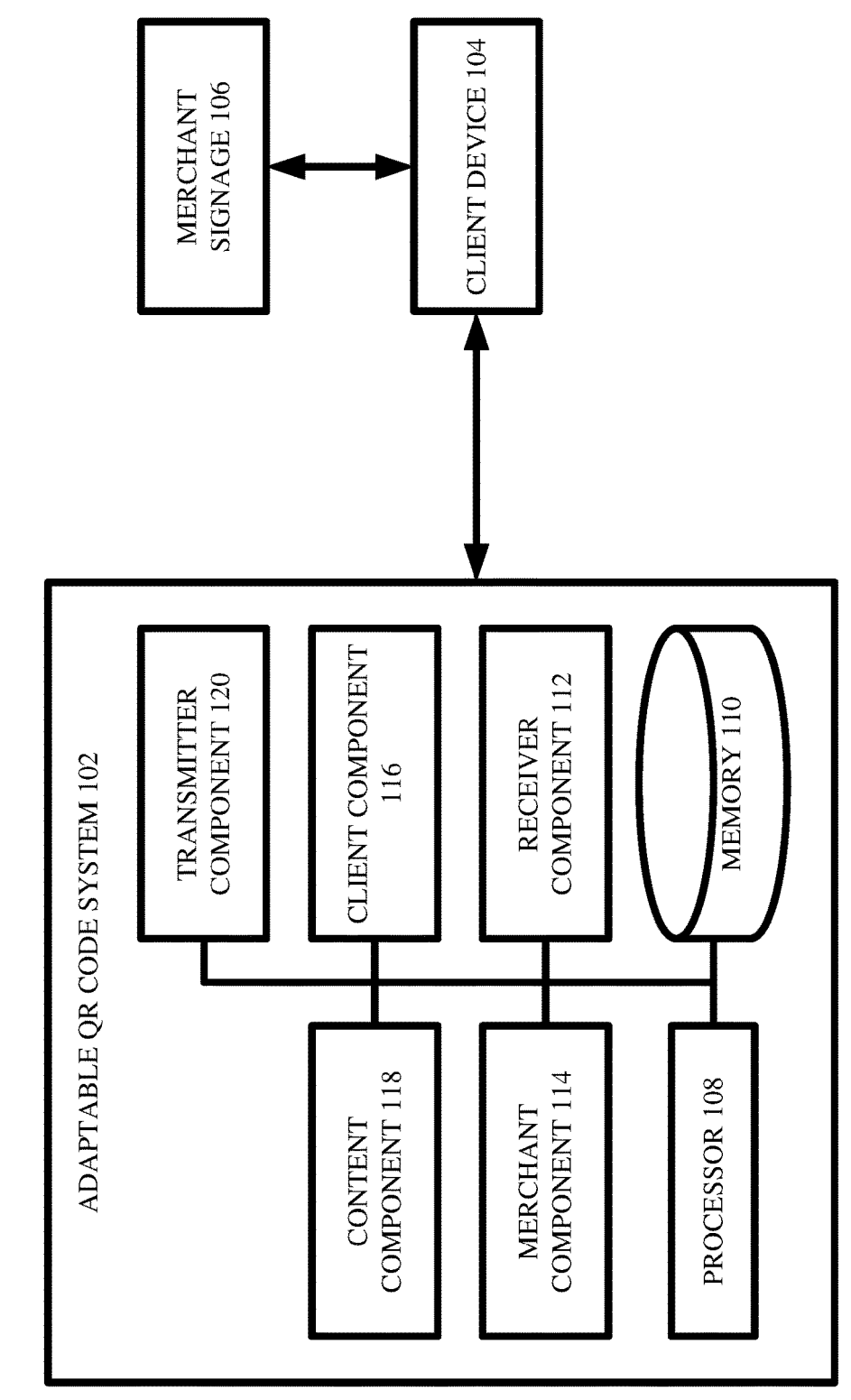
FIG. 1 illustrates a high-level block diagram of an example, non-limiting system that facilitates adaptable QR codes for customized experiences in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, when conventional techniques are implemented, a client device (e.g., a smart phone) can scan (e.g., via a camera of the smart phone) a QR code that is displayed on a merchant signage (e.g., that is printed in ink on an in-store paper sign, and/or that is electronically rendered on an in-store computer screen). Based on such scanning, the client device can be provided with digital content (e.g., advertisements, rewards) that corresponds to the QR code. For example, a QR code can be presented on a poster that is on display in a grocery store, and a customer who is shopping in the grocery store can scan the QR code with their smart phone. Such scanning can cause the smart phone to be provided with promotions and/or discounts associated with the grocery store. For instance, the smart phone can be provided with a 10%-off promo code that is redeemable at the grocery store.

Because the digital content is conventionally based only upon the QR code, the digital content is uniform across different client devices and thus across different customers. That is, the digital content is not based upon characteristics unique to any given customer, and thus is not conventionally customizable. Consider again the above example in which a QR code is displayed in a grocery store. Suppose that scanning the QR code yields a 5%-off promo code that is redeemable at the grocery store. Moreover, suppose that a customer A, who has never shopped at the grocery store, scans the QR code, thereby earning a 5%-off promo code. Furthermore, suppose that a customer B, who has regularly shopped at the grocery store for the past several years, scans the QR code, thereby also earning a 5%-off promo code. In such case, both the customer A and the customer B receive the same digital content (e.g., the 5%-off promo code), notwithstanding that the customer A and the customer B have significantly different transaction histories with the grocery store. As another example, suppose that scanning the QR code in the grocery store yields a 15%-off promo code that is redeemable for banana purchases at the grocery store. Furthermore, suppose that a customer C, who loves bananas, scans the QR code, thereby earning the 15%-off banana promo code. Further still, suppose that a customer D, who loathes bananas, scans the QR code, thereby also earning the 15%-off banana promo code. In such case, both the customer C and the customer D receive the same digital content (e.g., the 15%-off banana promo code), notwithstanding that the customer C and the customer D have significantly different banana preferences.

Additionally, because such digital content is conventionally based only upon the QR code, there is no reason for the client device to scan the QR code again in the future. That is, a customer who has already scanned a QR code, and thus who has already gotten the digital content associated with the QR code, would only receive duplicative and/or redundant copies of the digital content. Consider again the above example in which a QR code is displayed in a grocery store. Suppose that scanning of the QR code yields a 10%-off promo code that is redeemable at the grocery store. So, a customer who has scanned the QR code, and thus who has already received the 10%-off promo code, has no need to re-scan that particular QR code. Indeed, if the customer does rescan that particular QR code, the customer would simply receive a copy of the same 10%-off promo code. Because such promo codes usually cannot be redeemed more than once by a given customer, such copy of the same 10%-off promo code would be of no value to the customer. Therefore, the customer has no incentive to rescan that particular QR code. To avoid providing duplicative and/or redundant digital content to customers, the merchant signage that displays the QR code is routinely replaced with a different merchant signage that displays a different QR code (e.g., the different QR code can correspond to different digital content). However, this causes each iteration of merchant signage to have a reduced and/or shortened useful life.

Various embodiments of the subject innovation can address one or more of these technical problems. One or more embodiments described herein include systems, computer-implemented methods, apparatus, and/or computer-program products that can facilitate adaptable QR codes for customized experiences in electronic transaction settings. In other words, various embodiments described herein can include a computerized tool (e.g., any suitable combination of computer-executable hardware and/or computer-executable software) that can electronically receive a QR code scanned by a client device and that can electronically provide customized digital content to the client device in response to receiving the scanned QR code. As mentioned above, conventional techniques simply do not provide customized digital content in response to scanning of QR codes. Instead, the digital content of such conventional techniques depends only upon the QR code that is scanned and does not depend upon any unique characteristics of the client device and/or of the user that operates the client device. Accordingly, when conventional techniques are implemented, the provided digital content is un-customizable. Additionally, when conventional techniques are implemented, merchant signages that display such QR codes must be regularly replaced, which means that each merchant signage has a reduced useful lifespan. In stark contrast, the computerized tool described herein can, in various embodiments, allow for the provision of customized digital content that is not merely a function of the QR code that is scanned. Accordingly, digital content can be varied without constantly changing the merchant signages displaying the QR codes, which can thereby extend the useful lifespans of merchant signages.

In various embodiments, a computerized tool as described herein can comprise a receiver component, a merchant component, a client component, a content component, and/ or a transmitter component.

In various embodiments, a merchant signage can visually display a QR code. In some cases, the merchant signage can be a non-electronic in-store signage associated with a merchant. For example, the merchant signage can be a paper and/or cardboard poster that is affixed to a wall and/or shelf of a merchant's store and on which the QR code is printed in ink. In other cases, the merchant signage can be a non-electronic signage associated with a merchant but that is not located in the merchant's store. For instance, the merchant signage can be a pamphlet and/or newspaper on which the QR code is printed in ink and that has been mailed to a customer by the merchant. In some cases, the merchant signage can be an electronic in-store signage associated with a merchant. For example, the merchant signage can be a computerized screen/monitor of an electronic point-of-sale device in the merchant's store and on which the QR code is electronically rendered. In other cases, the merchant signage can be an electronic signage associated with a merchant but that is not located in the merchant's store. For instance, the merchant signage can be a website and/or webpage which contains the QR code and which is electronically accessible from any suitable computing device. In various aspects, the merchant signage can be any other suitable type of merchant signage (e.g., a television screen, a kiosk screen, a holographic/projected image).

In various instances, a client device can optically scan the QR code that is displayed by the merchant signage. In some cases, the client device can be any suitable type of smart device (e.g., a smart phone, a smart tablet, a smart watch, smart eyeglasses/goggles). In other cases, the client device can be any other suitable type of computing device. In various aspects, the client device can have a camera (and/or any other suitable optical scanner), and the client device can leverage the camera so as to optically scan and/or otherwise capture an image of the QR code as displayed by the merchant signage. For example, suppose that a user (e.g., a customer, a buyer) who owns and/or operates the client device comes across the merchant signage while browsing the merchant's store. In various cases, the user can use the client device to take a picture of the QR code that is depicted on the merchant signage. In such case, the client device can be considered as having scanned and/or captured the QR code.

In various embodiments, the receiver component of the computerized tool can electronically receive the QR code from the client device. That is, the receiver component can be electronically coupled to the client device via any suitable wired and/or wireless electronic connection, and the receiver component can accordingly electronically obtain the scanned/captured image of the QR code from the client device (e.g., the client device can electronically transfer the QR code to the receiver component).

In various embodiments, the receiver component can further electronically receive from the client device a location indicator. In various aspects, the location indicator can be any suitable data that identifies and/or otherwise indicates a geolocation of the client device. For example, the location indicator can indicate where the client device was geolocated when the client device scanned and/or captured the QR code. As another example, the location indicator can indicate where the client device was geolocated when the client device transmitted the QR code to the receiver component. In various aspects, the location indicator can have any suitable format and/or can be specified at any suitable level of granularity (e.g., can indicate country, state, city, address, latitude, longitude, elevation, and/or any suitable combination thereof).

In various instances, the client device can determine the location indicator by leveraging any suitable global positioning sensors that are integrated into the client device (e.g., the client device can include one or more GPS sensors, the one or more GPS sensors can determine the location indicator by electronically communicating with one or more GPS satellites, and the client device can transmit the location indicator to the receiver component). In various other instances, the client device can determine the location indicator by communicating with any suitable geolocation beacons that are physically within any suitable threshold vicinity of the client device (e.g., each geolocation beacon can be associated with a particular location, the client device can communicate with and/or otherwise identify the nearest geolocation beacon, the client device can determine the location indicator to be the location associated with the nearest geolocation beacon, and the client device can transmit the location indicator to the receiver component). In any case, the client device can electronically determine the location indicator and can electronically transmit the location indicator to the receiver component.

In various embodiments, the receiver component can further electronically receive from the client device a client identifier. In various aspects, the client identifier can be any suitable data that corresponds to the client device and/or to the user of the client device. In various cases, the client identifier can be any suitable combination of alphanumeric characters and/or symbols that identifies and/or otherwise indicates the identity of client device and/or of the user of the client device. In some cases, the client identifier can be electronically stored on the client device. In other cases, the client identifier can be electronically stored remotely from the client device but can be nevertheless electronically accessible to the client device. In any case, the client device can obtain the client identifier via any suitable data querying technique. Accordingly, the client device can electronically transmit the client identifier to the receiver component.

In some cases, the receiver component can electronically receive the QR code, the location indicator, and/or the client identifier from the client device. That is, the client device can electronically transmit the QR code, the location indicator, and/or the client identifier to the receiver component. In other cases, however, the client device can electronically transmit the QR code, the location indicator, and/or the client identifier to any suitable centralized and/or decentralized data structure (e.g., graph data structure, relational data structure, hybrid data structure), whether local to and/or remote from the client device and/or the receiver component, and the receiver component can electronically retrieve the QR code, the location indicator, and/or the client identifier from the data structure. In any case, the receiver component can electronically obtain in any suitable fashion the QR code, the location indicator, and/or the client identifier, so that other components of the computerized tool can electronically access and/or interact with the QR code, the location identifier, and/or the client identifier.

In various embodiments, the scanning/capturing of the QR code can trigger the client device to automatically transmit the QR code, the location indicator, and/or the client identifier to the receiver component (and/or to the data structure). For example, when the user of the client device comes across the QR code displayed on the merchant signage, the user of the client device can cause a program/ application (e.g., the PayPal® app, the Venmo® app) that is electronically stored on the client device to be launched. In various instances, once launched, the program/application can automatically cause the client device to activate its camera (and/or other optical scanning hardware). Accordingly, the user of the client device can scan/capture the QR code via the camera of the client device. In various cases, in response to the client device scanning/capturing the QR code, the program/application can automatically cause the client device to obtain the location indicator (e.g., by activating global positioning sensors of the client device and/or by communicating with geolocation beacons near the client device) and/or the client identifier (e.g., by executing any suitable data queries). In various instances, in response to the client device obtaining the location indicator and/or the client identifier, the program/application can automatically cause the client device to electronically transmit the QR code, the location indicator, and/or the client identifier to the receiver component (and/or to the data structure).

In various other embodiments, the scanning/capturing of the QR code can trigger the client device to automatically transmit the QR code, the location indicator, and/or the client identifier to any suitable computing device that is associated with the merchant who owns and/or operates the merchant signage, and the computing device associated with the merchant can automatically relay the QR code, the location indicator, and/or the client identifier to the receiver component. For example, when the user of the client device comes across the QR code displayed on the merchant signage, the user of the client device can cause a program/ application (e.g., the PayPal® app, the Venmo® app) that is electronically stored on the client device to be launched. In various instances, once launched, the program/application can automatically cause the client device to activate its camera (and/or other optical scanning hardware). Accordingly, the user of the client device can scan/capture the QR code via the camera of the client device. In various cases, in response to the client device scanning/capturing the QR code, the program/application can automatically cause the client device to obtain the location indicator (e.g., by activating global positioning sensors of the client device and/or by communicating with geolocation beacons near the client device) and/or the client identifier (e.g., by executing any suitable data queries). In various instances, in response to the client device obtaining the location indicator and/or the client identifier, the program/application can automatically cause the client device to electronically transmit the QR code, the location indicator, and/or the client identifier to the computing device associated with the merchant who owns and/or operates the merchant signage. Such computing device can be any suitable combination of computer-executable hardware and/or computer-executable software (e.g., the computing device associated with the merchant can be an electronic kiosk and/or point-of-sale device in the merchant's store). In various instances, the computing device associated with the merchant can electronically relay the QR code, the location indicator, and/or the client identifier to the receiver component.

In various embodiments, the merchant component of the computerized tool can electronically identify a merchant that corresponds to the location indicator and/or to the QR code by searching through a merchant repository. In various aspects, the merchant repository can be any suitable data structure, whether remote from and/or local to the merchant component, that electronically correlates a set of QR codes with a set of location indicators and/or with a set of merchants. In various instances, the merchant component can identify (e.g., via any suitable image recognition techniques) the scanned/captured QR code in the set of QR codes. In various cases, multiple merchants in the set of merchants can correspond to the scanned/captured QR code. In other words, the same QR code can be displayed on the signages of multiple different merchants. Accordingly, in various aspects, location can be utilized to distinguish among such multiple different merchants. That is, in various instances, the merchant component can identify the retrieved location indicator in the set of location indicators, and the merchant component can further identify, from the multiple merchants that correspond to the scanned/captured QR code, that merchant which corresponds to the retrieved location indicator. In various cases, the identified merchant can be considered as the merchant associated with the merchant signage that was scanned by the client device. In other words, the merchant component can electronically determine the identity of the merchant whose QR code was scanned/captured by the client device, based on the retrieved location indicator and/or the scanned/captured QR code.

As an example, suppose that the client device scans a particular QR code. Furthermore, suppose that the particular QR code is displayed on signages of a merchant E whose store is at location E, and suppose that the particular QR code is also displayed on signages of a merchant F whose store is at location F. Thus, the merchant repository can correlate the particular QR code with both the location E and with the location F, the merchant repository can correlate the location E with the merchant E, and the merchant repository can correlate the location F with the merchant F. Accordingly, the location indicator retrieved from the client device can be used for merchant disambiguation. That is, if the retrieved location indicator indicates the location E, the merchant component can determine that the client device scanned a merchant signage associated with the merchant E. On the other hand, if the location indicator instead indicates the location F, the merchant component can determine that the client device scanned a merchant signage associated with the merchant F. In this way, location can be used to distinguish among different merchants.

In various embodiments, the client component of the computerized tool can electronically identify a client profile that corresponds to the client identifier by searching through a client repository. In various aspects, the client repository can be any suitable data structure, whether remote from and/or local to the client component, that electronically correlates a set of client identifiers with a set of client profiles. In various instances, a client profile can be any suitable collection of data which corresponds to a particular client/customer (e.g., a particular buyer, a particular user of a particular client device). For example, in some cases, a client profile can indicate financial instrument information of a corresponding client/customer (e.g., credit card number of the client/customer, debit card number of the client/ customer, bank account number of the client/customer). In some aspects, a client profile can indicate one or more product and/or service preferences of a corresponding client/ customer (e.g., different levels of like and/or dislike of the client/customer with respect to different products/services). In various instances, a client profile can indicate one or more transaction histories of a corresponding client/customer (e.g., can include records/logs identifying when, where, for what products/services, and/or for how much money the client/customer has transacted in the past; can include records/logs indicating how many reward points have been accumulated by the client/customer at different merchants). In various cases, a client profile can indicate one or more electronic shopping carts of a corresponding client/customer (e.g., can indicate which products/services have been placed into online shopping carts of the client/customer, can indicate which products/services have been electronically browsed by the client/customer). In various aspects, a client profile can indicate one or more demographics of a corresponding client/customer (e.g., age of the client/customer, gender of the client/customer, ethnicity of the client/customer). In various instances, the client component can identify the retrieved client identifier in the set of client identifiers. Accordingly, the client component can identify, in the set of client profiles, that client profile which corresponds to the retrieved client identifier. In various cases, the identified client profile can be considered as a collection of data that describes the financial instruments, product/service preferences, transaction histories, electronic shopping carts, and/or demographics of the user of the client device. In other words, the client component can electronically determine the identity and/or characteristics of the user of the client device, based on the retrieved client identifier.

In various embodiments, the content component of the computerized tool can electronically identify digital content based on the identified merchant and/or based on the identified client profile. In various aspects, the content component can electronically access any suitable data structure and/or electronic records that contain information associated with the identified merchant, and the content component can electronically select any suitable subset of such information based on the identified client profile. In various cases, such selected subset of information can be considered as the digital content and can be considered as being customized and/or suited to the unique characteristics of the user of the client device. More specifically, in various embodiments, the content component can electronically communicate with a data structure and/or with electronic records, whether remote from and/or local to the content component, which indicate the identified merchant's currently available inventory, which indicate the identified merchant's currently available promotional offers, and/or which indicate the identified merchant's currently available reward plans. In various instances, the content component can cross-check such currently available inventory, such currently available promotional offers, and/or such currently available reward plans with the identified client profile. Because the identified client profile can indicate the financial instruments of the user of the client device, the products/services preferred by the user of the client device, the transaction histories of the user of the client device, the electronic shopping carts of the user of the client device, and/or the demographics of the user of the client device, such cross-checking can allow the content component to determine which subset of the currently available inventory, of the currently available promotional offers, and/or of the currently available reward plans is pertinent and/or applicable to the user of the client device.

In various cases, the content component can provide and/or initiate a customized flow of digital content to the client device, based on the identified merchant and/or the identified client profile. As mentioned above, the content component can access electronic records that contain information associated with the identified merchant, and the content component can filter such information based on the identified client profile. In various instances, it can be the case that the information associated with the identified merchant can change over time. For example, the currently-available inventory of the merchant, the currently-available promotional offers of the merchant, and/or the currently-available reward plans of the merchant can change from one moment in time to another moment in time. Accordingly, in various aspects, the content component can electronically monitor the electronic records that contain information associated with the identified merchant for changes in such information. In various cases, when the electronic records indicate that the information associated with the merchant has changed, the content component can filter such changed information based on the identified client profile, thereby yielding new digital content that is customized according to the identified client profile. In this way, the content component can identify a customized flow of digital content across any suitable time span, based on the identified merchant and/or the identified client profile.

As an example, suppose that the identified merchant has a reward plan that offers a first amount of reward points for first-time customers, a second amount of reward points for customers that have transacted with the merchant at least 10 times in the last three months, and a third amount of reward points for customers that have transacted with the merchant at least 50 times in the last three months (e.g., those having ordinary skill in the art will appreciate that these particular numbers are merely non-limiting examples). If the identified client profile indicates that the user of the client device has transacted with the merchant 20 times in the last three months, the content component can identify as the digital content the second amount of reward points (e.g., the content component can determine that the user of the client device qualifies for the second amount of reward points and not for the first amount or third amount of reward points).

As another example, suppose that the identified merchant has a currently available inventory that includes steak and salmon. If the identified client profile indicates that the user of the client device likes steak and dislikes salmon, the content component can identify as the digital content an advertisement for the identified merchant's steak. On the other hand, if the identified client profile indicates that the user of the client device likes salmon and dislikes steak, the content component can identify as the digital content an advertisement for the identified merchant's salmon. On still another hand, if the identified client profile indicates that the user of the client device likes both salmon and steak, the content component can identify as the digital content an advertisement for the identified merchant's salmon and an advertisement for the identified merchant's steak.

As yet another example, suppose that the identified merchant has a promotional offer pertaining to brownies. If the identified client profile indicates that an electronic shopping cart of the user of the client device does not already include brownies, the content component can identify as the digital content the brownies promotional offer. On the other hand, if the identified client profile indicates that the electronic shopping cart of the user of the client device already includes brownies, the content component can refrain from identifying as the digital content the brownies promotional offer.

In this way, the information associated with the identified merchant can be selectively filtered so as to be consistent with the preferences and/or characteristics of the user of the client device, which preferences and/or characteristics can be specified by the identified client profile.

In various embodiments, the transmitter component of the computerized tool can electronically cause the digital content identified by the content component to be provided to the client device. In some cases, the transmitter component can electronically transmit the digital content to the client device. In other cases, the transmitter component can electronically instruct a computing device associated with the identified merchant to transmit the digital content to the client device. In any case, the digital content can be provided to the client device by any suitable technique. In various instances, once the digital content is provided to the client device, the client device can electronically render the digital content on a computer screen/monitor of the client device.

In various embodiments, the computerized tool described herein can be implemented across any suitable number of programs/applications in any suitable multitenant fashion. As mentioned above, the scanning and/or transmitting of the QR code can be facilitated via a particular program/application that is electronically stored on the client device (e.g., via the PayPal® app, via the Venmo® app). In some cases, that particular program/application can also cause the client device to electronically render the digital content. For example, if the client device scans and/or transmits the QR code via the PayPal® app, the digital content can be provided to the client device and/or rendered on the client device via the PayPal® app. As another example, if the client device scans and/or transmits the QR code via the Venmo® app, the digital content can be provided to the client device and/or rendered on the client device via the Venmo® app. In other cases, however, a different program/application that is stored on the client device can cause the client device to electronically render the digital content. For example, if the client device scans and/or transmits the QR code via the PayPal® app, the digital content can be provided to the client device and/or rendered on the client device via the Venmo® app. As another example, if the client device scans and/or transmits the QR code via the Venmo® app, the digital content can be provided to the client device and/or rendered on the client device via the PayPal® app. In some instances, the different program/application can be a preferred program/application of the user of the client device (e.g., the identified client profile can, in some cases, specify which program/application the user of the client device prefers to render digital content).

In various aspects, there can exist different electronically-accessible databases that correspond to different programs/applications of the client device. For instance, the PayPal® app can be associated with and/or can have access to one or more first databases containing client and/or merchant information, and the Venmo® app can be associated with and/or can have access to one or more second databases containing client and/or merchant information (e.g., the one or more first databases can be different from the one or more second databases, the one or more first databases can contain different information than the one or more second databases, the one or more first databases can have different security clearances than the one or more second databases). Accordingly, in some cases, the client device can scan and/or transmit the QR code via a first program/application (e.g., PayPal® app), the digital content can be identified by leveraging one or more databases correlated with the first program/application (e.g., databases corresponding to the PayPal® app), and the digital content can be provided to and/or rendered on the client device via the first program/application (e.g., PayPal® app). In other cases, however, the client device can scan and/or transmit the QR code via a first program/application (e.g., Venmo® app), the digital content can be identified by leveraging one or more databases correlated with a second program/application (e.g., databases corresponding to the PayPal® app), and the digital content can be provided to and/or rendered on the client device via the first program/application (e.g., Venmo® app).

In various embodiments, the identified merchant can specify that the scanned/captured QR code is, at any given time, in one of a plurality of activation states. For example, the identified merchant can, in some cases, specify that the QR code is in an active state, and the identified merchant can, in other cases, specify that the QR code is in an inactive state. In various aspects, the computerized tool can leverage such an activation status of the QR code to determine whether or not to identify the digital content and/or to determine whether or not to cause the digital content to be provided to the client device. For example, once the merchant component identifies the identified merchant based on the location indicator and/or the QR code, the merchant component can determine the current activation status of the QR code as specified by the identified merchant. That is, the merchant component can electronically query any suitable data structure and/or electronic records that indicate the current activation status of the QR code as specified by the identified merchant. If the data structure and/or electronic records indicate that the identified merchant has set the current activation status of the QR code to an active state, the computerized tool can proceed to identify the digital content and/or to cause the digital content to be provided to the client device. On the other hand, if the data structure and/or electronic records instead indicate that the identified merchant has set the current activation status of the QR code to an inactive state, the computerized tool can refrain from identifying the digital content and/or from causing the digital content to be provided to the client device. In such case, the transmitter component can transmit an electronic message to a computing device associated with the merchant, where the electronic message prompts and/or requests the identified merchant to activate the QR code.

For example, suppose that a particular QR code is depicted on signages of a merchant G associated with a location G and a merchant H associated with a location H. Moreover, suppose that the merchant G has specified that the QR code is in an active state, while the merchant H has specified that the QR code is in an inactive state. In various cases, if the receiver component obtains the particular QR code and a location indicator that indicates the location G, the merchant component can identify the merchant G. Because the merchant G has specified that the particular QR code is in an active state, the client component can identify the client profile, the content component can identify the digital content, and/or the transmitter component can cause the digital content to be provided to the client device. In contrast, if the receiver component instead obtains the particular QR code and a location indicator that indicates the location H, the merchant component can identify the merchant H. Because the merchant H has specified that the particular QR code is in an inactive state, the client component can refrain from identifying the client profile, the content component can refrain from identifying the digital content, and/or the transmitter component can refrain from causing the digital content to be provided to the client device. Instead, the transmitter component can transmit an electronic message to a computing device owned and/or operated by the merchant H, asking the merchant H to activate the particular QR code. Accordingly, activation statuses of QR codes can be used to control whether digital content is provided to client devices.

In various embodiments, the computerized tool can further comprise a fraud component. In various aspects, the fraud component can electronically maintain and/or store authentication data which can be used to authenticate the scanned/captured QR code. That is, such authentication data can be leveraged by the computerized tool to differentiate between authentic versions/copies of the scanned/captured QR code and fraudulent versions/copies of the scanned/captured QR code. For example, an authentic version/copy of the scanned/captured QR code can be yielded by scanning the merchant signage that displays the QR code (e.g., by scanning a newspaper/poster that depicts the QR code, by scanning a merchant kiosk and/or point-of-sale device that electronically renders the QR code). On the other hand, a fraudulent version/copy of the QR code can be yielded by scanning some non-merchant signage that displays the QR code (e.g., by scanning an unauthorized photo-edited image of the QR code, by scanning an unauthorized screenshot of the QR code).

In various aspects, the authentication data can include a sound signature that corresponds to the QR code and/or to the identified merchant. In such cases, it can be the case that the merchant signage is configured to generate an ambient sound that conforms to the sound signature while the merchant signage displays the QR code. For example, the merchant signage can be an electronic kiosk and/or point-of-sale device that renders the QR code on a computer screen, and such kiosk and/or point-of-sale device can emit the ambient sound from an electronic speaker while the computer screen depicts the QR code. In various aspects, the client device can capture, via any suitable microphone sensors, the ambient sound at the time of scanning of the QR code and/or at the time of transmitting the QR code to the receiver component. In various instances, the receiver component can thus obtain the ambient sound (e.g., can obtain data indicating the ambient sound, such as timeseries pressure data). In various aspects, the fraud component can compare the ambient sound to the sound signature known to correspond to the QR code and/or to the identified merchant. If the fraud component determines that the ambient sound matches and/or is consistent with the sound signature, the fraud component can conclude that the QR code is authentic (e.g., can conclude that the client device permissibly obtained the QR code by scanning the merchant signage, because the ambient sound matches a sound known to be emitted from an authentic merchant signage). Accordingly, the computerized tool can identify the digital content and/or cause the digital content to be provided to the client device. On the other hand, if the fraud component determines that the ambient sound does not match and/or is not consistent with the sound signature, the fraud component can conclude that the QR code is not authentic (e.g., can conclude that the client device impermissibly obtained the QR code by scanning some non-merchant signage, because the ambient sound does not match a sound known to be emitted from an authentic merchant signage). Accordingly, the computerized tool can refrain from identifying the digital content and/or from causing the digital content to be provided to the client device.

In some instances, it can be the case that the merchant signage does not emit an ambient sound while displaying the QR code. In such cases, the merchant signage can include and/or otherwise be associated with any suitable microphone sensor which can capture ambient sounds that occur around and/or near the merchant signage. Because the sounds that occur around and/or near the merchant signage can vary over time, the microphone sensor associated with the merchant signage can capture different ambient sounds at different times. In various instances, the microphone sensor associated with the merchant signage can electronically transmit such different ambient sounds to the receiver component. As mentioned above, the client device can be configured to capture ambient sounds that occur around and/or near the client device at the time of scanning/transmitting the QR code, and the client device can electronically transmit such captured ambient sounds to the receiver component. Accordingly, the fraud component can compare the ambient sounds captured by the client device to the different ambient sounds captured by the microphone sensor associated with the merchant signage, in order to detect fraud. For example, if the client device scans/transmits the QR code at a particular time (e.g., in a particular time interval), the fraud component can compare the ambient sound captured by the client device at the particular time to an ambient sound captured by the microphone sensor associated with the merchant signage at that same particular time. If the fraud component determines that the ambient sound captured by the client device at the particular time corresponds to and/or is consistent with the ambient sound captured by the microphone sensor associated with the merchant signage at that same particular time, the fraud component can conclude that the QR code is authentic (e.g., can conclude that the client device permissibly obtained the QR code by scanning the merchant signage, because the ambient sound captured by the client device matches the ambient sound captured by the microphone sensor associated with the merchant signage). Accordingly, the computerized tool can identify the digital content and/or cause the digital content to be provided to the client device. On the other hand, if the fraud component determines that the ambient sound captured by the client device at the particular time does not correspond to and/or is inconsistent with the ambient sound captured by the microphone sensor associated with the merchant signage at that same particular time, the fraud component can conclude that the QR code is not authentic (e.g., can conclude that the client device impermissibly obtained the QR code by scanning some non-merchant signage, because the ambient sound captured by the client device does not match the ambient sound captured by the microphone sensor associated with the merchant signage). Accordingly, the computerized tool can refrain from identifying the digital content and/or causing the digital content to be provided to the client device.

In various instances, the authentication data can include a time frame that corresponds to the QR code and/or to the identified merchant. In such cases, it can be the case that the merchant signage is configured to depict/render the QR code at a time that conforms to the time frame. For example, the merchant signage can be an electronic kiosk and/or point-of-sale device that renders a different QR code on a computer screen at different times (e.g., at different minutes, different hours, different days, different weeks, different months, and/or different years). In some cases, rendition of such a different QR code at different times can be considered as rendition of a constantly-morphing QR code. In various aspects, the client device can capture, via any suitable electronic clock, a timestamp indicating the time of scanning of the QR code and/or the time of transmitting the QR code to the receiver component. In various instances, the receiver component can thus obtain the timestamp. In various aspects, the fraud component can compare the timestamp to the time frame known to correspond to the QR code and/or to the identified merchant. If the fraud component determines that the timestamp is consistent with the time frame, the fraud component can conclude that the QR code is authentic (e.g., can conclude that the client device permissibly obtained the QR code by scanning the merchant signage, because an authentic merchant signage is known to display the QR code at the time indicated by the timestamp).

Accordingly, the computerized tool can identify the digital content and/or cause the digital content to be provided to the client device. On the other hand, if the fraud component determines that the time stamp is not consistent with the time frame, the fraud component can conclude that the QR code is not authentic (e.g., can conclude that the client device impermissibly obtained the QR code by scanning some non-merchant signage, because an authentic merchant signage is known to not display the QR code at the time indicated by the timestamp). Accordingly, the computerized tool can refrain from identifying the digital content and/or causing the digital content to be provided to the client device.

In various aspects, the time frame can be provided by the merchant signage and/or by any suitable computing device associated with the merchant signage (e.g., an electronic kiosk, a point-of-sale device, a merchant beacon). That is, the merchant signage and/or the computing device associated with the merchant signage can keep track of which QR codes are displayed/rendered by the merchant signage during which time intervals. In various aspects, the merchant signage and/or the computing device associated with the merchant signage can electronically transmit such time intervals to the receiver component. As mentioned above, the client device can capture a timestamp indicating the time of scanning and/or transmitting of the QR code. Accordingly, the fraud component can compare the timestamp captured by the client device to the different time intervals indicated by the merchant signage, in order to detect fraud. For example, if the client device scans/captures a particular QR code, the fraud component can compare the timestamp captured by the client device to a time interval during which the merchant signage (and/or during which the computing device associated with the merchant signage) indicates that the particular QR code was rendered/displayed. If the fraud component determines that the timestamp is within the time interval indicated by the merchant signage, the fraud component can conclude that the QR code is authentic (e.g., can conclude that the client device permissibly obtained the QR code by scanning the merchant signage). Accordingly, the computerized tool can identify the digital content and/or cause the digital content to be provided to the client device. On the other hand, if the fraud component determines that the timestamp is outside of the time interval indicated by the merchant signage, the fraud component can conclude that the QR code is not authentic (e.g., can conclude that the client device impermissibly obtained the QR code by scanning the merchant signage). Accordingly, the computerized tool can refrain from identifying the digital content and/or causing the digital content to be provided to the client device.

In various cases, the authentication data can include a surrounding environment that corresponds to the QR code and/or to the identified merchant. In such cases, it can be the case that the merchant signage is configured to display the QR code in conjunction with some predetermined border, periphery, and/or symbol. For example, the merchant signage can be a poster on which the QR code is printed in ink, and the poster can be affixed to a distinctive wall and/or shelf of the merchant. Accordingly, it can be expected that a scanned/captured image of the QR code also depicts the distinctive wall and/or shelf. As another example, the merchant signage can be a kiosk and/or point-of-sale device that renders the QR code on a computer screen, and the computer screen can have a distinctive bezel. Accordingly, it can be expected that a scanned/captured image of the QR code also depicts the distinctive bezel. In various aspects, the client device can capture an image and/or video of the QR code. In various instances, the receiver component can thus obtain the image and/or video of the QR code and can identify, via any suitable image recognition techniques, a surrounding environment of the QR code as depicted in the image and/or video. In other words, the computerized tool can analyze a periphery of the image and/or video to determine what objects and/or symbols are depicted around the QR code. In various aspects, the fraud component can compare the surrounding environment to the known surrounding environment that corresponds to the QR code and/or to the identified merchant. If the fraud component determines that the surrounding environment is consistent with the known surrounding environment, the fraud component can conclude that the QR code is authentic (e.g., can conclude that the client device permissibly obtained the QR code by scanning the merchant signage, because the surrounding environment is known to be present at an authentic merchant signage). Accordingly, the computerized tool can identify the digital content and/or cause the digital content to be provided to the client device. On the other hand, if the fraud component determines that the surrounding environment is not consistent with the known surrounding environment, the fraud component can conclude that the QR code is not authentic (e.g., can conclude that the client device impermissibly obtained the QR code by scanning some non-merchant signage, because the surrounding environment is known to not be present at an authentic merchant signage). Accordingly, the computerized tool can refrain from identifying the digital content and/or causing the digital content to be provided to the client device.

In various embodiments, the computerized tool can cause the digital content to be provided to devices other than the client device. Specifically, in various aspects, the computerized tool can identify one or more other users that are connected to, linked to, and/or otherwise associated with the user of the client device, and the computerized tool can accordingly cause the digital content to be provided to one or more computing devices that respectively correspond to the one or more other users. As mentioned above, the client component can electronically identify the client profile of the user of the of client device, based on the client identifier obtained by the receiver component. In various instances, the client component can electronically access and/or otherwise electronically interact with another profile of the user of the client device, where the another profile can be associated with a different platform than the client profile. That is, the client profile can be associated with a first platform (e.g., the PayPal® app), and the another profile can be associated with a second platform (e.g., some program/application that is different from the PayPal® app). For example, the second platform can be a social media platform (e.g., Facebook®, Twitter®, Instagram®), and the another profile can be a social media account maintained on the social media platform (e.g., a Facebook® account, a Twitter® account, an Instagram® account).

In various aspects, the client component can electronically analyze, via any suitable techniques, the another profile of the user of the client device, so as to identify the one or more other users. For instance, if the another profile is a social media account of the user of the client device, the client component can identify one or more other social media accounts that are connected to, linked to, and/or otherwise associated with the social media account of the user of the client device, and the operators of those one or more other social media accounts can be considered as the one or more other users. As a non-limiting example, the social media account of the user of the client device can be social media friends with the one or more other social media accounts (e.g., the user of the client device can be social media friends with the one or more other users). As another non-limiting example, the social media account of the user of the client device can have recently tagged and/or messaged the one or more other social media accounts (e.g., the user of the client device can have recently tagged/messaged the one or more other users). As yet another example, the one or more other social media accounts can have recently interacted with a social media post made by the social media account of the user of the client device (e.g., the one or more other users can have recently "liked" and/or "shared" a social media post of the user of the client device).

Accordingly, in various cases, the client component can identify the one or more other users based on the another profile of the user of the client device. In various other cases, the client profile itself can indicate the identities of the one or more other users.

In various aspects, once the client component identifies the one or more other users, the transmitter component can cause the digital content to be provided to the one or more computing devices of the one or more other users. That is, the user of the client device can scan the QR code, the computerized tool described herein can identify the digital content accordingly, and the computerized tool can cause the digital content to be provided to the one or more other users that correspond to the user of the client device. In some cases, the content component can identify the digital content based on information associated with the one or more other users (e.g., financial instrument data of the one or more other users, product/service preferences of the one or more other users, transaction histories of the one or more other users, electronic shopping carts of the one or more other users, demographics of the one or more other users). In such cases, the digital content can be customized to suit the one or more other users in addition to the user of the client device.

In various aspects, the one or more other users can be granted access to some and/or all of the data contained in the client profile of the user of the client device. For instance, the one or more other users can, in some cases, be permitted to access and/or make charges to the financial instrument data of the user of the client device. As another example, the one or more other users can see which products/services have been placed into an electronic shopping cart of the user of the client device. As yet another example, one or more electronic shopping carts of the one or more other users can be combined with an electronic shopping cart of the user of the client device, thereby allowing the one or more other users to complete a transaction simultaneously with the user of the client device.

In various embodiments, the transmitter component can cause the digital content to be provided to the one or more computing devices of the one or more other users, based on a determination that the one or more computing devices are physically near the client device. In various instances, as explained above, the receiver component can electronically obtain the location indicator, which can specify and/or indicate the geolocation of the client device at the time at which the client device scans and/or transmits the QR code. In various cases, the receiver component can also electronically obtain one or more other location indicators, which can respectively specify and/or indicate the geolocations of the one or more computing devices of the one or more other users (e.g., the one or more computing devices can transmit their respective location indicators to the receiver component, and/or the receiver component can retrieve their respective location indicators from any suitable data structures that are electronically accessible to the receiver component). Accordingly, in various aspects, the receiver component can compare the location indicator with the one or more other location indicators. If the one or more other location indicators are within any suitable threshold distance of the location indicator (e.g., if the one or more computing devices are physically near enough to the client device), the computerized tool can proceed to identify the digital content and/or to cause the digital content to be provided to the one or more computing devices. On the other hand, if the one or more other location indicators are not within the threshold distance of the location indicator (e.g., if the one or more computing devices are not physically near enough to the client device), the computerized tool can refrain from identifying the digital content and/or from causing the digital content to be provided to the one or more computing devices.

Various embodiments of the subject innovation can be employed to use hardware and/or software to solve problems that are highly technical in nature (e.g., to facilitate adaptable QR codes for customized experiences), that are not abstract and that cannot be performed as a set of mental acts by a human. Further, some of the processes performed can be performed by a specialized computer (e.g., QR code scanners/readers, merchant repositories, client profile repositories) for carrying out defined tasks related to adaptable QR codes to launch customized experiences. Some of such processes can include: receiving, by a device operatively coupled to a processor and from a customer device, a quick response (QR) code, a customer identifier, and geolocation information associated with the customer device; identifying, by the device and from a plurality of vendors, a first vendor that corresponds to the QR code, based on identifying that the first vendor corresponds to the geolocation information; identifying, by the device and from a plurality of customer profiles, a first customer profile that corresponds to the customer identifier; identifying, by the device, electronic content based on the first vendor and the first customer profile; and causing, by the device, the electronic content to be provided to the customer device. Such defined tasks are not conventionally performed manually by humans. Moreover, neither the human mind nor a human with pen and paper can electronically receive a scanned/captured image of a QR code, electronically receive a client identifier, electronically receive geolocation data, electronically search through a vendor repository to identify a vendor that corresponds to the QR code and/or the geolocation data, electronically search through a customer profile repository to identify a customer profile that corresponds to the customer identifier, electronically identify customized digital content by cross-checking electronic records of the vendor with the customer profile, and/or electronically cause the customized digital content to be transmitted to the customer device. Instead, various embodiments of the subject innovation are inherently and inextricably tied to computer technology and cannot be implemented outside of a computing environment (e.g., only computing devices with scanning/optical sensors can scan/read QR codes, only computing devices can automatically search through and/or filter electronic records).

In various instances, embodiments of the subject innovation can integrate into a practical application the disclosed teachings regarding adaptable QR codes for customized experiences. Indeed, in various embodiments, the disclosed teachings can provide a computerized system that can electronically receive a scanned/captured QR code from a client device, a location indicator from the client device, and a client identifier from the client device. In various aspects, the computerized system can electronically identify a merchant that corresponds to the location indicator and/or the QR code. In various instances, the computerized system can electronically identify a client profile that corresponds to the client identifier. In various cases, the computerized system can electronically identify digital content based on the merchant and the client profile. In various aspects, the computerized system can then provide the digital content to the client device. In various cases, the digital content can be considered as a subset of electronic data pertaining to the merchant, which subset is customized and/or suited to the client profile. For example, the digital content can include advertisements of the merchant, promotions of the merchant, current inventory of the merchant, and/or reward points earned from the merchant, based on product/service preferences specified in the client profile, transaction histories specified in the client profile, electronic shopping carts specified in the client profile, and/or demographics specified in the client profile. As explained above, conventional techniques do not provide such customized digital content in response to the scanning of a QR code. Moreover, such conventional techniques can further require the regular replacement of merchant signages. In contrast, embodiments of the subject innovation can facilitate the provision of customized digital content to customers in response to the scanning of a QR code, and such customized digital content can eliminate a need for regular replacement of merchant signages. Thus, various embodiments of the subject innovation clearly constitute a useful and practical application of computers.

It should be appreciated that the herein figures are exemplary and non-limiting.

FIG. 1 illustrates a high-level block diagram of an example, non-limiting system 100 that can facilitate adaptable QR codes for customized experiences in accordance with one or more embodiments described herein.

As shown, an adaptable QR code system 102 can be electronically integrated, via any suitable wired and/or wireless electronic connection, with a client device 104. In various aspects, the client device 104 can be any suitable smart device, such as a smart phone, a smart tablet, and/or a smart watch. In various other aspects, the client device 104 can be any other suitable computing device (e.g., any other suitable combination of computer-executable hardware and/or computer-executable software). In various instances, the client device 104 can comprise a camera and/or any other suitable optical scanning hardware. In various cases, the client device 104 can further comprise a computer screen/monitor and/or any other suitable electronic rendering hardware. In various aspects, the client device 104 can be owned and/or operated by a user (e.g., a client, a customer, a buyer).

In various embodiments, a merchant signage 106 can be provided. In various instances, the merchant signage 106 can be any suitable type of signage that is owned by, operated by, and/or otherwise associated with a merchant (e.g., a vendor, a seller), and that visually displays a QR code (not shown). In various cases, the merchant signage 106 can be an electronic signage. For example, the merchant signage 106 can be an electronic kiosk and/or an electronic point-of-sale device that comprises a computer screen/monitor, where the QR code can be electronically rendered on the computer screen/monitor. In various other cases, the merchant signage 106 can be a non-electronic signage. For example, the merchant signage 106 can be a paper/cardboard poster on which the QR code is printed in ink. In various instances, the merchant signage 106 can be an in-store signage. That is, the merchant signage 106 can be physically located within a store of the merchant (e.g., can be a paper/cardboard poster that is affixed to a wall and/or shelf of the merchant's store; can be an electronic kiosk and/or point-of-sale device that is located within the merchant's store). In various other instances, the merchant signage 106 can be an out-of-store signage. That is, the merchant signage 106 can be not physically located within a store of the merchant (e.g., can be a newspaper advertisement and/or postal letter which has been mailed to a customer and on which the QR code is printed in ink; can be a webpage that is accessible from any suitable computing device and which contains/displays the QR code).

In various aspects, the client device 104 can scan and/or capture, via the camera and/or other optical scanning hardware of the client device 104, the QR code as the QR code is displayed by the merchant signage 106. In other words, the client device 104 can, in various cases, capture an image of the QR code that is displayed by the merchant signage 106. As explained herein, the adaptable QR code system 102 can electronically determine customized digital content in response to the client device 104 scanning the QR code displayed by the merchant signage 106, and the adaptable QR code system 102 can further electronically cause such customized digital content to be provided to the client device 104.

In various embodiments, the adaptable QR code system 102 can comprise a processor 108 (e.g., computer processing unit, microprocessor) and a computer-readable memory 110 that is operably and/or operatively and/or communicatively connected/coupled to the processor 108. The memory 110 can store computer-executable instructions which, upon execution by the processor 108, can cause the processor 108 and/or other components of the adaptable QR code system 102 (e.g., receiver component 112, merchant component 114, client component 116, content component 118, transmitter component 120) to perform one or more acts. In various embodiments, the memory 110 can store computer-executable components (e.g., receiver component 112, merchant component 114, client component 116, content component 118, transmitter component 120), and the processor 108 can execute the computer-executable components.

In various embodiments, the adaptable QR code system 102 can comprise a receiver component 112. As explained herein, the receiver component 112 can electronically obtain the QR code that is scanned/captured by the client device 104. In various cases, the client device 104 can electronically transmit the QR code (e.g., the scanned/captured image of the QR code) to the receiver component 112, and the receiver component 112 can accordingly electronically receive the QR code from the client device 104. In various other cases, the client device 104 can electronically transmit the QR code (e.g., the scanned/captured image of the QR code) to any other suitable third-party computing device (not shown) that is electronically accessible to the receiver component 112, and the receiver component 112 can accordingly electronically retrieve the QR code from the third-party computing device.

In various aspects, the receiver component 112 can electronically obtain a location indicator, which specifies a geolocation of the client device 104. In various instances, the location indicator can specify where the client device 104 was physically geolocated when the client device 104 scanned/captured the QR code displayed by the merchant signage 106. In various other instances, the location indicator can specify where the client device 104 was physically geolocated when the client device 104 transmitted the QR code to the receiver component 112 (and/or to the third-party computing device). In various cases, the location indicator can be formatted at any suitable level of granularity. For example, the location indicator can specify a country, a state, a city, an address, a latitude, a longitude, an elevation, any other suitable location designation, and/or any suitable combination thereof. In various instances, the client device 104 can comprise a global positioning sensor, which can electronically generate and/or determine the location indicator. In various other instances, the client device 104 can electronically communicate with a geolocation beacon (not shown) that is associated with and/or physically near the merchant signage 106, which can convey the location indicator to the client device 104. In various cases, any other suitable technique can be implemented to obtain the location indicator. Just as with the QR code, the client device 104 can, in some cases, transmit the location indicator to the receiver component 112. In other cases, the client device 104 can transmit the location indicator to any suitable third-party computing device, and the receiver component 112 can retrieve the location indicator from the third-party computing device.

In various aspects, the receiver component 112 can electronically obtain a client identifier, which corresponds to a user of the client device 104. In various instances, the client identifier can be any suitable combination of alphanumeric characters and/or symbols which can indicate an identity of the user of the client device 104. Just as with the location indicator and/or the QR code, the client device 104 can, in some cases, transmit the client identifier to the receiver component 112. In other cases, the client device 104 can transmit the client identifier to any suitable third-party computing device, and the receiver component 112 can retrieve the client identifier from the third-party computing device.

In any case, the receiver component 112 can electronically obtain the QR code, the location indicator, and/or the client identifier, such that other components of the adaptable QR code system 102 can electronically access and/or interact with the QR code, the location indicator, and/or the client identifier.

In various embodiments, the adaptable QR code system 102 can comprise a merchant component 114. As explained herein, the merchant component 114 can electronically maintain and/or otherwise have electronic access to a merchant repository. In various instances, the merchant repository can be any suitable data structure that correlates a set of QR codes with a set of location indicators and/or with a set of merchants. In various cases, the merchant component can leverage the merchant repository, the QR code, and/or the location indicator to identify, from the set of merchants, the specific merchant that is associated with the merchant signage 106. In various aspects, it can be the case that only one merchant displays a given QR code on its signage. Accordingly, the merchant repository can correlate the given QR code to only that one merchant. In various other aspects, however, it can be the case that multiple merchants display a given QR code on their respective signages. Accordingly, the merchant repository can correlate the given QR with all of such multiple merchants. In such cases, the location indicator can be used to distinguish between such multiple merchants. That is, even though the multiple merchants can each display the given QR code on their respective signages, each of the multiple merchants, and thus each of their respective signages, can be correlated with a different and/or unique location indicator. In any case, the merchant component 114 can electronically identify a merchant from the set of merchants maintained by the merchant repository, based on the location indicator and/or QR code received by the receiver component 112. In various instances, the identified merchant can be considered as the merchant that owns, operates, and/or is otherwise associated with the merchant signage 106.

In various embodiments, the adaptable QR code system 102 can comprise a client component 116. As explained herein, the client component 116 can electronically maintain and/or otherwise have electronic access to a client profile repository. In various instances, the client profile repository can be any suitable data structure that correlates a set of client identifiers with a set of client profiles. In various cases, a client profile can include any suitable data that pertains to a client/customer, such as financial instrument information of the client/customer, product/service preferences of the client/customer, transaction histories of the client/customer, electronic shopping carts of the client/customer, demographics of the client/customer, and/or any other suitable information pertaining to the client/customer. In various aspects, a particular client profile can be identified from the set of client profiles, based on that particular client profile corresponding to the client identifier received by the receiver component 112. In various instances, the identified client profile can be considered as specifying various characteristics and/or information of the user of the client device 104 (e.g., financial instrument data of the user of the client device 104, product/service preferences of the user of the client device 104, transaction histories of the user of the client device 104, electronic shopping carts of the user of the client device 104, demographics of the user of the client device 104).

In various embodiments, the adaptable QR code system 102 can comprise a content component 118. As explained herein, the content component 118 can electronically identify and/or determine a digital content, based on the identified merchant and/or the identified client profile. More specifically, in various instances, the content component 118 can have electronic access to any suitable electronic records (not shown) that are associated with the identified merchant. Such electronic records can specify current inventories of the identified merchant, current advertisements of the identified merchant, current promotional offers of the identified merchant, current reward plans of the identified merchant, and/or any other suitable information pertaining to the identified merchant. In various cases, the content component 118 can identify as the digital content any suitable subset of the information specified by such electronic records, based on the identified client profile. In other words, the content component 118 can filter, sort, and/or prune the information specified by such electronic records, such that the subset of the information is consistent with the financial instruments, the product/service preferences, the transaction histories, the electronic shopping carts, and/or the demographics specified in the identified client profile. Since the identified client profile can correspond to the user of the client device 104, the digital content identified and/or determined by the content component 118 can be considered as being customized for the user of the client device 104.

In various embodiments, the adaptable QR code system 102 can comprise a transmitter component 120. As explained herein, the transmitter component 120 can electronically cause the digital content identified by the content component 118 to be provided to the client device 104. In various cases, the transmitter component 120 can electronically transmit the digital content to the client device 104. In various other cases, the transmitter component 120 can electronically transmit an instruction to any suitable computing device of the identified merchant, which instruction prompts the computing device of the identified merchant to transmit the digital content to the client device 104. In any case, the digital content can be electronically transmitted to the client device 104, and the client device 104 can electronically render the digital content on the computer screen/monitor of the client device 104, such that the digital content is visible to the user of the client device 104.

Figure 2:
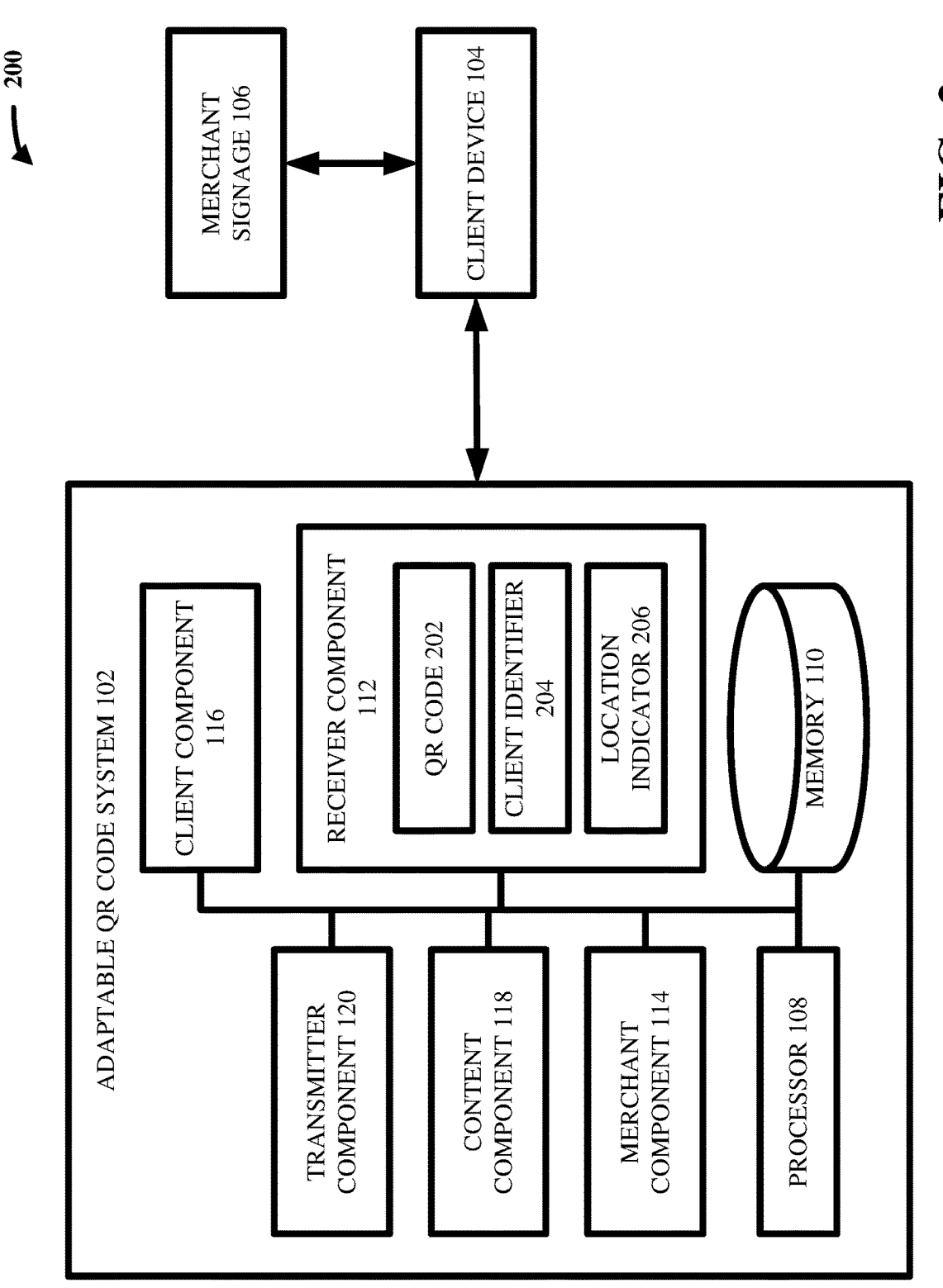
FIG. 2 illustrates a high-level block diagram of an example, non-limiting system including a QR code, a client identifier, and a location indicator that facilitates adaptable QR codes for customized experiences in accordance with one or more embodiments described herein.

FIG. 2 illustrates a high-level block diagram of an example, non-limiting system 200 including a QR code, a client identifier, and a location indicator that can facilitate adaptable QR codes for customized experiences in accordance with one or more embodiments described herein. As shown, the system 200 can, in some cases, comprise the same components as the system 100, and can further comprise a QR code 202, a client identifier 204, and a location indicator 206.

In various aspects, the QR code 202 can be any suitable quick response code. For instance, the QR code 202 can visually appear to be a two-dimensional matrix and/or rectilinear grid of black and/or white squares, where the particular arrangement and/or pattern of the black and/or white squares in the matrix/grid can represent, indicate, and/or correspond to stored, encrypted, encoded, and/or embedded information. Although the QR code 202 can be a two-dimensional matrix and/or rectilinear grid of black and/or white squares, this is a non-limiting example. In some cases, the QR code 202 can exhibit any suitable dimensionality (e.g., can be a one-dimensional barcode), can exhibit any suitable shape (e.g., can be circular, polygonal, slanted, irregular, and/or not necessarily rectilinear), and/or can exhibit any suitable colors and/or combinations of colors.

In various embodiments, the merchant signage 106 can visually display the QR code 202. As mentioned above, the merchant signage 106 can, in some cases, be non-electronic signage (e.g., a poster, a sticker, a paper) on which the QR code 202 is printed in ink. As also mentioned above, the merchant signage 106 can, in some cases, be electronic signage (e.g., an electronic kiosk, a point-of-sale device, a television, a computer) which electronically renders the QR code 202 on a computer screen/monitor. In any case, the merchant signage 106 can visibly display, depict, and/or present the QR code 202.

In various embodiments, the client device 104 can electronically scan and/or capture the QR code 202 as displayed by the merchant signage 106. As mentioned above, the client device 104 can include a camera and/or any other suitable optical scanning equipment. In various instances, the client device 104 can utilize such camera and/or optical scanning equipment so as to capture an image of the merchant signage 106 as the merchant signage 106 displays the QR code 202. By capturing an image of the merchant signage 106 while the merchant signage 106 is displaying the QR code 202, the client device 104 can be considered as having scanned and/or captured the QR code 202. Once the client device 104 has scanned and/or captured the QR code 202, the client device 104 can, in various aspects, electronically transmit the QR code 202 to the receiver component 112. In various other aspects, once the client device 104 has scanned and/or captured the QR code 202, the client device 104 can electronically transmit the QR code 202 to any other suitable computing device (not shown) that is electronically accessible to the receiver component 112, and the receiver component 112 can electronically retrieve the QR code 202 from such computing device. In any case, the receiver component 112 can electronically obtain the QR code 202.

In various embodiments, the client identifier 204 can be any suitable piece of data that is correlated with the client device 104 and/or with the user of the client device 104. In other words, the client identifier 204 can indicate an identity of the client device 104 and/or of the user of the client device 104. In various instances, the client identifier 204 can comprise any suitable combination of alphanumeric characters (e.g., letters, numbers) and/or symbols (e.g., punctuation marks, hashtags, ampersands, asterisks). In various aspects, the client identifier 204 can be electronically stored and/or maintained by the client device 104. In such case, the client device 104 can electronically transmit the client identifier 204 to the receiver component 112. In various other aspects, the client device 104 can electronically transmit the client identifier 204 to any other suitable computing device (not shown) that is electronically accessible to the receiver component 112, and the receiver component 112 can electronically retrieve the client identifier 204 from such computing device. In any case, the receiver component 112 can electronically obtain the client identifier 204.

In various embodiments, the location indicator 206 can be any suitable piece of data that specifies a geolocation of the client device 104. In some cases, the location indicator 206 can specify a geolocation at which the client device 104 scanned and/or captured the QR code 202 as the QR code 202 was being displayed by the merchant signage 106. In other cases, the location indicator 206 can specify a geolocation at which the client device 104 transmitted the QR code 202 to the receiver component 112 (and/or to any other computing device). In various aspects, the location indicator 206 can specify the geolocation of the client device 104 at any suitable level of granularity and/or in any suitable format. For example, in some cases, the location indicator 206 can specify a city in which the client device 104 scanned, captured, and/or transmitted the QR code 202. As another example, in some cases, the location indicator 206 can specify a building address (e.g., street name and/or number) at which the client device 104 scanned, captured, and/or transmitted the QR code 202. As yet another example, the location indicator 206 can specify a sub-building designation (e.g., which floor of a building, which room of a building, which aisle in a store, which end of which aisle in a store) at which the client device 104 scanned, captured, and/or transmitted the QR code 202. As still another example, the location indicator 206 can specify a latitude, longitude, and/or elevation at which the client device 104 scanned, captured, and/or transmitted the QR code 202.

In various instances, the client device 104 can comprise any suitable global positioning sensors (not shown). In such case, the client device 104 can utilize the global positioning sensors to determine the location indicator 206. In various other instances, the client device 104 can be in electronic communication with any suitable geolocation beacons (not shown) that are within any suitable physical vicinity of the client device 104. In such case, the client device 104 can communicate with the geolocation beacons to determine the location indicator 206. In various aspects, once the client device 104 has determined the location indicator 206, the client device 104 can electronically transmit the location indicator 206 to the receiver component 112. In various other aspects, once the client device 104 has determined the location indicator 206, the client device 104 can electronically transmit the location indicator 206 to any other suitable computing device (not shown) that is electronically accessible to the receiver component 112, and the receiver component 112 can electronically retrieve the location indicator 206 from such computing device. In any case, the receiver component 112 can electronically obtain the location indicator 206.

Figure 3:
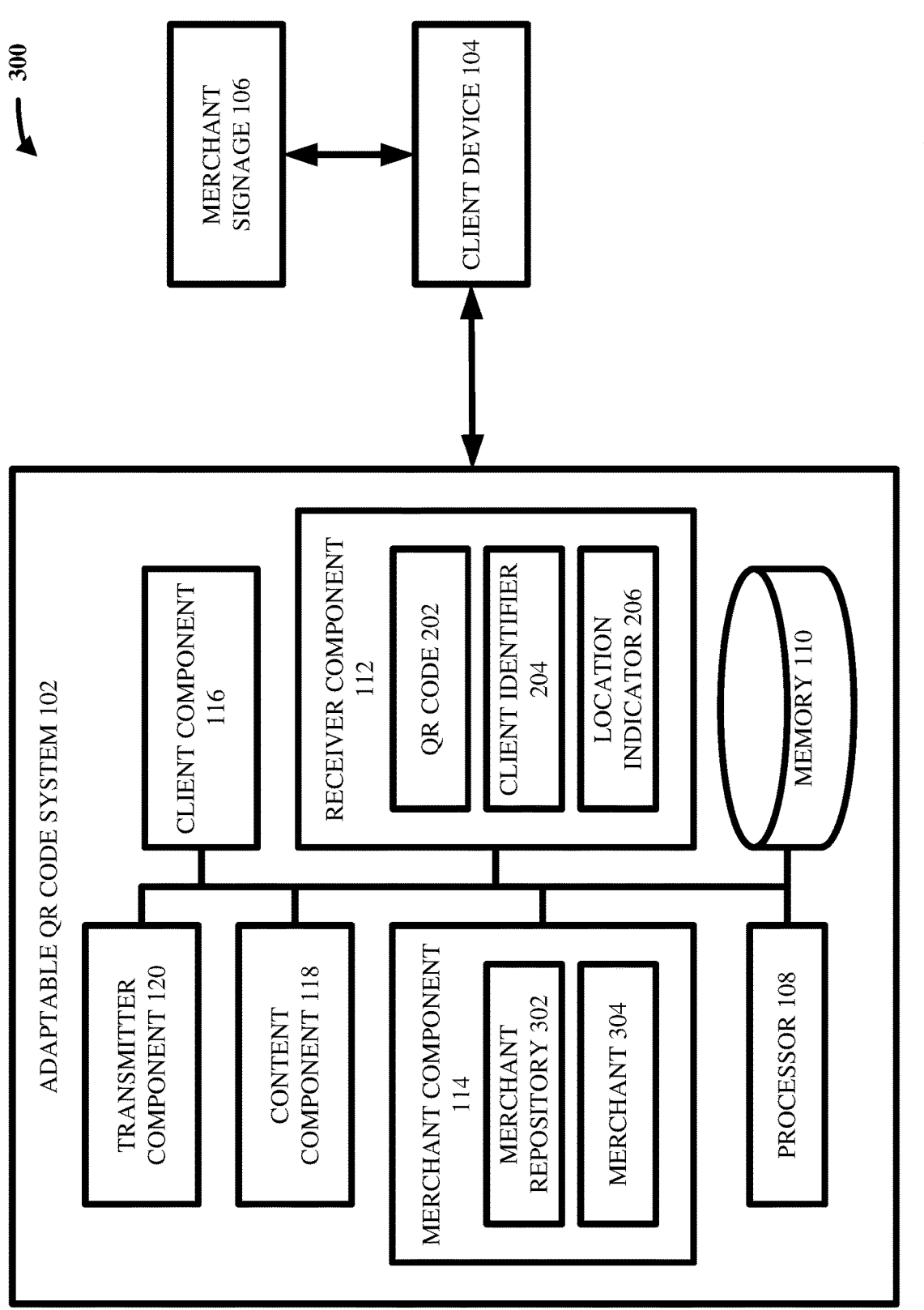
FIG. 3 illustrates a high-level block diagram of an example, non-limiting system including a merchant repository that facilitates adaptable QR codes for customized experiences in accordance with one or more embodiments described herein.

FIG. 3 illustrates a high-level block diagram of an example, non-limiting system 300 including a merchant repository that can facilitate adaptable QR codes for customized experiences in accordance with one or more embodiments described herein. As shown, the system 300 can, in some cases, comprise the same components as the system 200, and can further comprise a merchant repository 302 and/or a merchant 304.

In various aspects, the merchant component 114 can electronically store and/or maintain the merchant repository 302. In various other aspects, the merchant repository 302 can be electronically stored and/or maintained remotely from the merchant component 114, but the merchant repository 302 can nevertheless be electronically accessible to the merchant component 114. In various instances, the merchant repository 302 can be any suitable data structure that correlates a set of QR codes with a set of location indicators and/or with a set of merchants. In other words, the merchant repository 302 can be considered as specifying which QR codes are being displayed in which locations by which merchants. Accordingly, for a given QR code from the set of QR codes and for a given location indicator from the set of location indicators, a particular merchant from the set of merchants can be identified, such that the particular merchant corresponds to the given QR code and/or to the given location indicator. The particular merchant can be considered as owning, operating, and/or otherwise being associated with a merchant signage that displays the given QR code at a location specified by the given location indicator.

In various aspects, the merchant component 114 can identify the QR code 202 in the set of QR codes that are stored in the merchant repository 302. Moreover, in various instances, the merchant component 114 can identify the location indicator 206 in the set of location indicators that are stored in the merchant repository 302. Thus, in various cases, the merchant component 114 can identify the merchant 304 in the set of merchants that are stored in the merchant repository 302, where the merchant 304 can correspond to both the QR code 202 and the location indicator 206. This is explained in more detail with respect to FIG. 4.

FIG. 4 illustrates a high-level block diagram of an example, non-limiting merchant repository in accordance with one or more embodiments described herein. In other words, FIG. 4 depicts a non-limiting example embodiment of the merchant repository 302.

As shown, the merchant repository 302 can correlate a set of QR codes 402 with a set of location indicators 404 and/or with a set of merchants 406. In various cases, the set of QR codes 402 can include any suitable number of QR codes (e.g., QR code 1 to QR code n, for any suitable positive integer n). In various instances, more than one location indicator can be correlated with a QR code in the set of QR codes 402. For example, as shown, the QR code 1 can be correlated with a subset of the set of location indicators 404. More specifically, the QR code 1 can be correlated with a location indicator 1.1 to a location indicator 1.m, for any suitable positive integer m. Similarly, the QR code n can be correlated with a subset of the set of location indicators 404. More specifically, the QR code n can be correlated with a location indicator n.1 to a location indicator n.m. In various aspects, each location indicator in the set of location indicators 404 can be correlated with a merchant in the set of merchants 406. For example, as shown, the location indicator 1.1 can correspond to a merchant 1.1, the location indicator 1.m can correspond to a merchant 1.m, the location indicator n.1 can correspond to a merchant n.1, and the location indicator n.m can correspond to a merchant n.m.

In various aspects, the merchant repository 302 can be interpreted in the following way. Since the QR code 1 corresponds to the location indicator 1.1 which corresponds to the merchant 1.1, it can be inferred and/or determined that the merchant 1.1 owns, operates, and/or is otherwise associated with a merchant signage that displays the QR code 1 at a location specified by the location indicator 1.1. Similarly, since the QR code 1 corresponds to the location indicator 1.m which corresponds to the merchant 1.m, it can be inferred and/or determined that the merchant 1.m owns, operates, and/or is otherwise associated with a merchant signage that displays the QR code 1 at a location specified by the location indicator 1.m. Likewise, since the QR code n corresponds to the location indicator n.1 which corresponds to the merchant n.1, it can be inferred and/or determined that the merchant n.1 owns, operates, and/or is otherwise associated with a merchant signage that displays the QR code n at a location specified by the location indicator n.1. Similarly, since the QR code n corresponds to the location indicator n.m which corresponds to the merchant n.m, it can be inferred and/or determined that the merchant n.m owns, operates, and/or is otherwise associated with a merchant signage that displays the QR code n at a location specified by the location indicator n.m.

In various cases, the merchant component 114 can identify the QR code 202 in the set of QR codes 402, and the merchant component 114 can also identify the location indicator 206 in the set of location indicators 404. Accordingly, the merchant component 114 can identify, in the set of merchants 406, the particular merchant that corresponds to both the QR code 202 and the location indicator 206. In various cases, that particular merchant can be the merchant 304 (e.g., can be the merchant that owns, operates, and/or is otherwise associated with the merchant signage 106 that displays the QR code 202 at a location specified by the location indicator 206).

Although FIG. 4 shows that each QR code in the set of QR codes 402 is correlated to m location indicators, this is a mere non-limiting example for ease of illustration. Those having ordinary skill in the art will appreciate that different QR codes in the set of QR codes 402 can correspond to different numbers of location indicators in the set of location indicators 404 (e.g., a first QR code can correspond to s location indicators for any suitable positive integer s; a second QR code can correspond to t location indicators for any suitable positive integer t where $t \neq s$). Moreover, although FIG. 4 shows that each QR code corresponds to a different set of location indicators, and although FIG. 4 shows that each location indicator corresponds to a different merchant, this is a mere non-limiting example for ease of illustration. Those having ordinary skill in the art will appreciate that any suitable number of QR codes can be displayed by any suitable number of merchants in any suitable number of locations (e.g., a given merchant can display more than one QR code at a given location; a given merchant can display one QR code at multiple locations).

Figure 5:
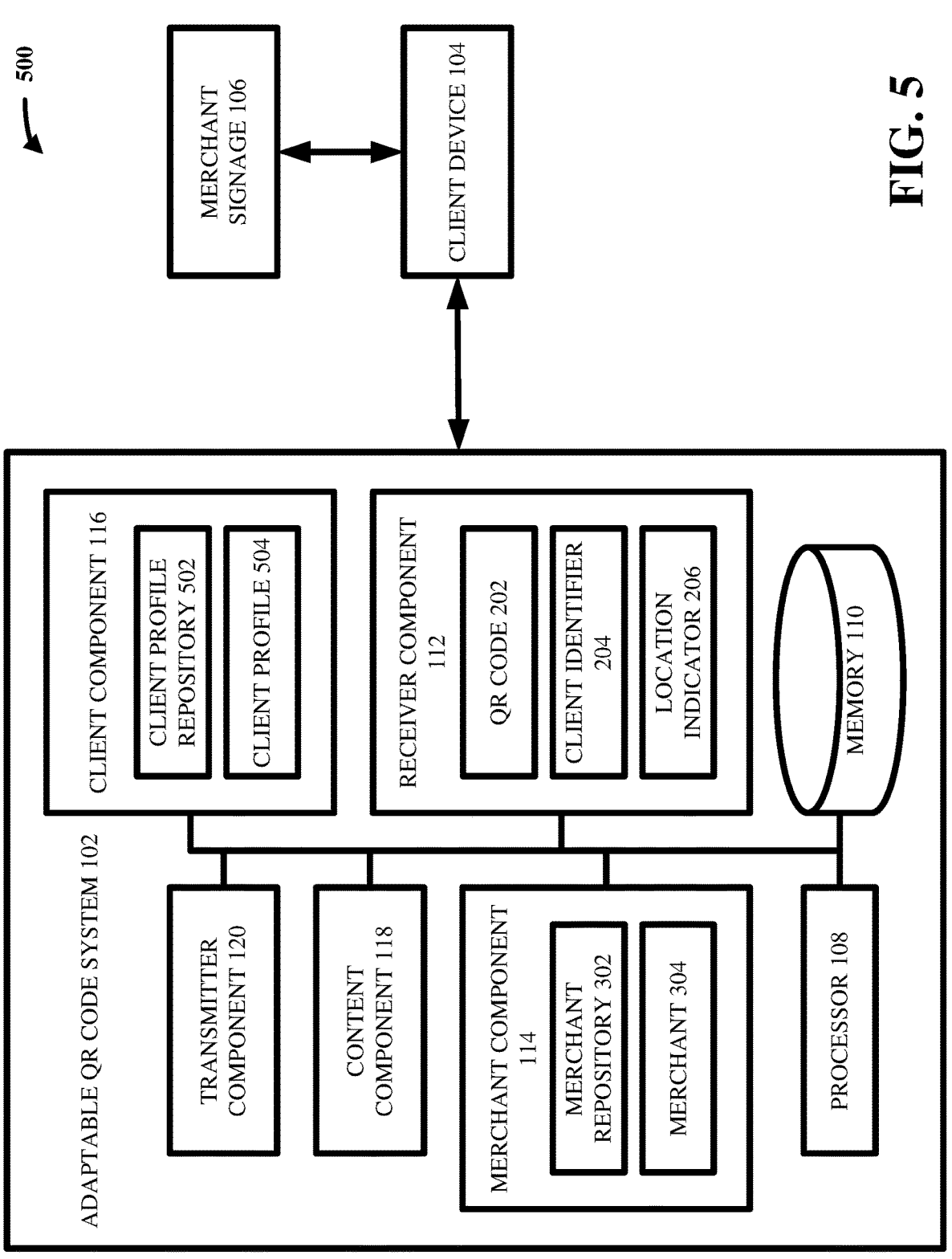
FIG. 5 illustrates a high-level block diagram of an example, non-limiting system including a client profile repository that facilitates adaptable QR codes for customized experiences in accordance with one or more embodiments described herein.

FIG. 5 illustrates a high-level block diagram of an example, non-limiting system 500 including a client profile repository that can facilitate adaptable QR codes for customized experiences in accordance with one or more embodiments described herein. As shown, the system 500 can, in some cases, comprise the same components as the system 300, and can further comprise a client profile repository 502 and/or a client profile 504.

In various aspects, the client component 116 can electronically store and/or maintain the client profile repository 502. In various other aspects, the client profile repository 502 can be electronically stored and/or maintained remotely from the client component 116, but the client profile repository 502 can nevertheless be electronically accessible to the client component 116. In various instances, the client profile repository 502 can be any suitable data structure that correlates a set of client identifiers with a set of client profiles, where a client profile can be any suitable collection of electronic data that specifies any suitable attributes of a customer/client. Accordingly, for a given client identifier from the set of client identifiers, a particular client profile from the set of client profiles can be identified, such that the particular client profile corresponds to the given client identifier.

In various aspects, the client component 116 can identify the client identifier 204 in the set of client identifiers that are stored in the client profile repository 502. Thus, in various cases, the client component 116 can identify the client profile 504 in the set of client profiles that are stored in the client profile repository 502, where the client profile 504 can correspond to the client identifier 204. This is explained in more detail with respect to FIG. 6.

FIG. 6 illustrates a high-level block diagram of an example, non-limiting client profile repository in accordance with one or more embodiments described herein. In other words, FIG. 6 depicts a non-limiting example embodiment of the client profile repository 502.

As shown, the client profile repository 502 can correlate a set of client identifiers 602 with a set of client profiles 604. In various cases, the set of client identifiers 602 can include any suitable number of client identifiers (e.g., client identifier 1 to client identifier q, for any suitable positive integer q). In various instances, each client identifier in the set of client identifiers 602 can be respectively correlated with a client profile in the set of client profiles 604. For example, as shown, the client identifier 1 can be correlated with a client profile 1. Similarly, the client identifier q can be correlated with a client profile q.

In various aspects, the client profile repository 502 can be interpreted in the following way. Since the client identifier 1 corresponds to the client profile 1, it can be inferred and/or determined that, when a client device provides the client identifier 1 to the receiver component 112, attributes of a user of the client device can be specified by the client profile 1. Likewise, since the client identifier q corresponds to the client profile q, it can be inferred and/or determined that, when a client device provides the client identifier q to the receiver component 112, attributes of a user of the client device can be specified by the client profile q.

In various cases, the client component 116 can identify the client identifier 204 in the set of client identifiers 602. Accordingly, the client component 116 can identify, in the set of client profiles 604, the particular client profile that corresponds to the client identifier 204. In various cases, that particular client profile can be the client profile 504.

In various aspects, the client profile 504 can specify any suitable attributes of the user of the client device 104. As shown, such attributes can, in various embodiments, include financial instrument data 606. In various cases, the financial instrument data 606 can indicate financial instruments (e.g., credit card numbers, debit card numbers, bank account numbers) that are owned by, operated by, and/or otherwise associated with the user of the client device 104. As shown, the attributes can, in various aspects, include product/service preferences 608. In various cases, the product/service preferences 608 can indicate whether the user of the client device 104 likes and/or dislikes various products and/or services (e.g., likes bananas, dislikes yogurt, strongly likes action movies, strongly dislikes comedic movies, neither likes nor dislikes documentaries). In some cases, the product/service preferences 608 can be framed on an absolute scale (e.g., likes apples, dislikes peaches, neutral toward cucumbers) and/or a relative scale (e.g., prefers apples to cucumbers, prefers cucumbers to peaches). As shown, the attributes can, in various instances, include transaction histories 610. In various cases, the transaction histories 610 can be records and/or logs that specify past transactions participated in by the user of the client device 104 (e.g., can specify when the user of the client device 104 purchased and/or rented which products/services from which merchants at what prices). In some cases, the transaction histories 610 can further specify reward points that the user of the client device 104 has accumulated at various merchants due to such past transactions. In various cases, the transaction histories 610 can include online browsing histories of the user of the client device 104 (e.g., can indicate which products/services the user of the client device 104 has browsed online). As shown, the attributes can, in various aspects, include electronic shopping carts 612. In various cases, the electronic shopping carts 612 can indicate products and/or services that have been placed into one or more online shopping carts and/or one or more online shopping bags of the user of the client device 104. As shown, the attributes can, in various instances, include demographics 614. In various cases, the demographics 614 can indicate any suitable information about the user of the client device 104 (e.g., age, height, weight, gender, profession/occupation, ethnicity, religion, political affiliation). Although not shown in FIG. 6, the client profile 504 can specify any other suitable type of data that describes and/or characterizes the user of the client device 104.

Figure 7:
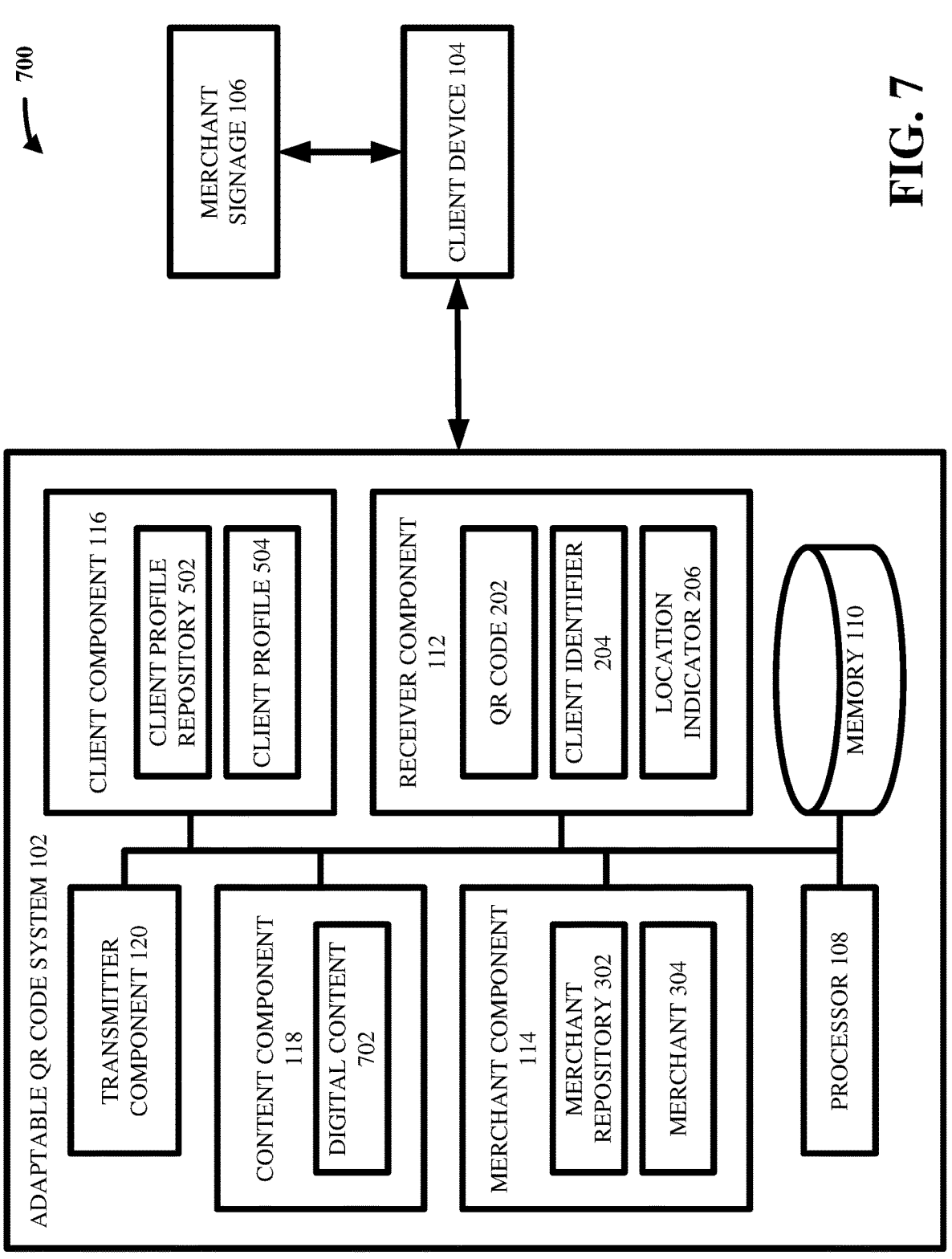
FIG. 7 illustrates a high-level block diagram of an example, non-limiting system including a digital content that facilitates adaptable QR codes for customized experiences in accordance with one or more embodiments described herein.

FIG. 7 illustrates a high-level block diagram of an example, non-limiting system 700 including a digital content that can facilitate adaptable QR codes for customized experiences in accordance with one or more embodiments described herein. As shown, the system 700 can, in some cases, comprise the same components as the system 500, and can further comprise digital content 702.

In various embodiments, the content component 118 can electronically identify the digital content 702, based on the merchant 304 and/or based on the client profile 504. More specifically, in various aspects, the content component 118 can electronically access any suitable electronic records (not shown), which can be electronically stored and/or maintained remotely from and/or locally to the content component 118, and which can be associated with the merchant 304. That is, in various instances, such electronic records can specify any suitable information pertaining to the merchant 304. For example, such electronic records can specify a currently available inventory of the merchant 304 (e.g., can indicate which products and/or services are currently being offered by the merchant 304). As another example, such electronic records can specify currently available promotions of the merchant 304 (e.g., can indicate which coupons and/or discounts are currently being offered by the merchant 304, and/or can identify any prerequisites of such coupons and/or discounts). As yet another example, such electronic records can specify currently available reward plans of the merchant 304 (e.g., can indicate which loyalty programs are currently being offered by the merchant 304, and/or can identify any prerequisites of such loyalty programs).

In various aspects, the content component 118 can filter and/or sort through such electronic records based on the client profile 504, so as to yield information that is both associated with the merchant 304 and that is pertinent to the user of the client device 104. The result of such filtering and/or sorting can be considered as the digital content 702.

For instance, the content component 118 can identify products/services that are both in the currently available inventory of the merchant 304 and that are indicated in the client profile 504 as being preferred/liked by the user of the client device 104. The content component 118 can accordingly include advertisements for such products/services in the digital content 702 (e.g., such products/services are being offered by the merchant 304 and are liked by the user of the client device 104, and so providing an advertisement for such products/services to the client device 104 can be effective). Conversely, the content component 118 can identify products/services that are both in the currently available inventory of the merchant 304 and that are indicated in the client profile 504 as being disliked by the user of the client device 104. Accordingly, the content component 118 can refrain from including advertisements for such products/ services in the digital content 702 (e.g., although such products/services are being offered by the merchant 304, the user of the client device 104 does not like such products/ services, and so providing an advertisement for such products/services to the client device 104 can be ineffective).

As another example, the content component 118 can identify products/services that are in the currently available inventory of the merchant 304, that are indicated in the client profile 504 as being preferred/liked by the user of the client device 104, and that are indicated in the client profile 504 as not already being in an electronic shopping cart of the user of the client device 104. The content component 118 can accordingly include advertisements for such products/services in the digital content 702 (e.g., such products/services are being offered by the merchant 304, are liked by the user of the client device 104, and are not yet in an electronic shopping cart of the user of the client device 104, meaning that providing an advertisement for such products/services to the client device 104 can be effective). Conversely, the content component 118 can identify products/services that are in the currently available inventory of the merchant 304, that are indicated in the client profile 504 as being preferred/ liked by the user of the client device 104, and that are indicated in the client profile 504 as already being in an electronic shopping cart of the user of the client device 104. The content component 118 can accordingly refrain from including advertisements for such products/services in the digital content 702 (e.g., although such products/services are being offered by the merchant 304 and are liked by the user of the client device 104, such products/services are already in an electronic shopping cart of the user of the client device 104, meaning that the user of the client device 104 has already resolved to purchase them; thus, providing an advertisement for such products/services to the client device 104 can be ineffective).

As yet another example, the content component 118 can identify coupons, discounts, and/or reward points that are being offered by the merchant 304, the prerequisites of which are satisfied by the financial instruments of the user of the client device 104 (e.g., in some cases, a coupon, a discount, and/or an amount of reward points can be earned by a customer if the customer pays for a transaction with a particular credit card). The content component 118 can accordingly include advertisements for such coupons, discounts, and/or reward points in the digital content 702 (e.g., if the client profile indicates that the user of the client device 104 has a financial instrument that qualifies for a coupon, discount, and/or reward, providing an advertisement for such coupon, discount, and/or reward to the client device 104 can be effective). Conversely, the content component 118 can identify coupons, discounts, and/or reward points that are being offered by the merchant 304, the prerequisites of which are not satisfied by the financial instruments of the user of the client device 104. Accordingly, the content component 118 can refrain from including advertisements for such coupons, discounts, and/or reward points in the digital content 702 (e.g., if the client profile 504 indicates that the user of the client device 104 lacks all financial instruments that qualify for a coupon, discount, and/or reward, providing an advertisement for such coupon, discount, and/or reward to the client device 104 can be ineffective).

As still another example, the content component 118 can identify coupons, discounts, and/or reward points that are being offered by the merchant 304, the prerequisites of which are satisfied by the transaction histories of the user of the client device 104 (e.g., in some cases, a coupon, a discount, and/or an amount of reward points can be earned by a customer if the customer has transacted with a particular merchant at least a threshold amount of times within a predetermined time period). The content component 118 can accordingly include such coupons, discounts, and/or reward points in the digital content 702 (e.g., if the client profile indicates that the user of the client device 104 has transacted with a merchant enough times to qualify for a coupon, discount, and/or reward, such coupon, discount, and/or reward should be provided to the client device 104). Conversely, the content component 118 can identify coupons, discounts, and/or reward points that are being offered by the merchant 304, the prerequisites of which are not satisfied by the transaction histories of the user of the client device 104. Accordingly, the content component 118 can refrain from including such coupons, discounts, and/or reward points in the digital content 702 (e.g., if the client profile indicates that the user of the client device 104 has not yet transacted with a merchant enough times to qualify for a coupon, discount, and/or reward, such coupon, discount, and/or reward should not be provided to the client device 104).

Therefore, the digital content 702 can be considered as a subset of information associated with the merchant 304, which subset is customized to comply and/or be consistent with the client profile 504 (e.g., is customized to suit the attributes of the user of the client device 104).

In various embodiments, the digital content 702 can include scavenger hunt data. In some cases, the merchant 304 can facilitate and/or otherwise sanction a scavenger hunt, in which participants are tasked with finding and scanning a plurality of QR codes that are hidden throughout one or more stores of the merchant 304. In various aspects, the merchant 304 can offer particular coupons, discounts, and/or rewards to customers who complete (and/or partially complete) the scavenger hunt. In various aspects, the electronic records associated with the merchant 304 can include data that describes and/or characterizes such a scavenger hunt (e.g., that stipulates the rules and/or objectives of such a scavenger hunt). In various instances, the client profile 504 can include data that indicates a level of scavenger hunt progress that has been achieved by the user of the client device 104 (e.g., such progress can be incrementally increased with each QR code of the merchant 304 that is scanned by the client device 104). Accordingly, the content component 118 can, in some cases, include in the digital content 702 information regarding such a scavenger hunt (e.g., such information can indicate a new level of scavenger hunt progress achieved by the user of the client device 104 due to scanning the QR code 202).

In various embodiments, as mentioned above, the transmitter component 120 can electronically cause the digital content 702 to be provided to the client device 104. In various cases, the transmitter component 120 can electronically transmit the digital content 702 to the client device 104. In other cases, the transmitter component 120 can electronically instruct a computing device associated with the merchant 304 to transmit the digital content 702 to the client device 104. In any case, the client device 104 can obtain the digital content 702. In various instances, the client device 104 can electronically render the digital content 702, so that it is visible to and/or viewable by the user of the client device 104.

FIG. 8 illustrates a flow diagram of an example, non-limiting computer-implemented method 800 that can facilitate adaptable QR codes for customized experiences in accordance with one or more embodiments described herein. In various cases, the computer-implemented method 800 can be facilitated by the adaptable QR code system 102.

In various embodiments, act 802 can include receiving, by a device (e.g., 112) operatively coupled to a processor, a QR code (e.g., 202), a client ID (e.g., 204), and/or a location indicator (e.g., 206) from a client device (e.g., 104). In various cases, the QR code, the client ID, and/or the location indicator can be provided when the client device scans the QR code as the QR code is displayed by a merchant signage (e.g., 106).

In various aspects, act 804 can include identifying, by the device (e.g., 114), a merchant (e.g., 304) based on the location indicator and/or on the QR code. In some cases, one QR code can be displayed by multiple merchants at multiple different locations. Accordingly, the location indicator can be leveraged for merchant disambiguation.

In various instances, act 806 can include identifying, by the device (e.g., 116), a client profile (e.g., 504) based on the client ID. In various cases, the client profile can include information about a user of the client device, such as financial instruments of the user, transaction history of the user, and/or product/service preferences of the user.

In various aspects, act 808 can include identifying, by the device (e.g., 118), digital content (e.g., 702) based on the merchant and the client profile. In various cases, electronic records which indicate merchant promotions, merchant offers, merchant reward programs, and/or merchant inventory can be cross-referenced with the client profile to identify the digital content that is pertinent to the user of the client device.

In various instances, act 810 can include causing, by the device (e.g., 120), the digital content to be provided to the client device. In some cases, the device can transmit the digital content to the client device. In other cases, the device can instruct a computing device of the merchant to transmit the digital content to the client device.

Figure 9:
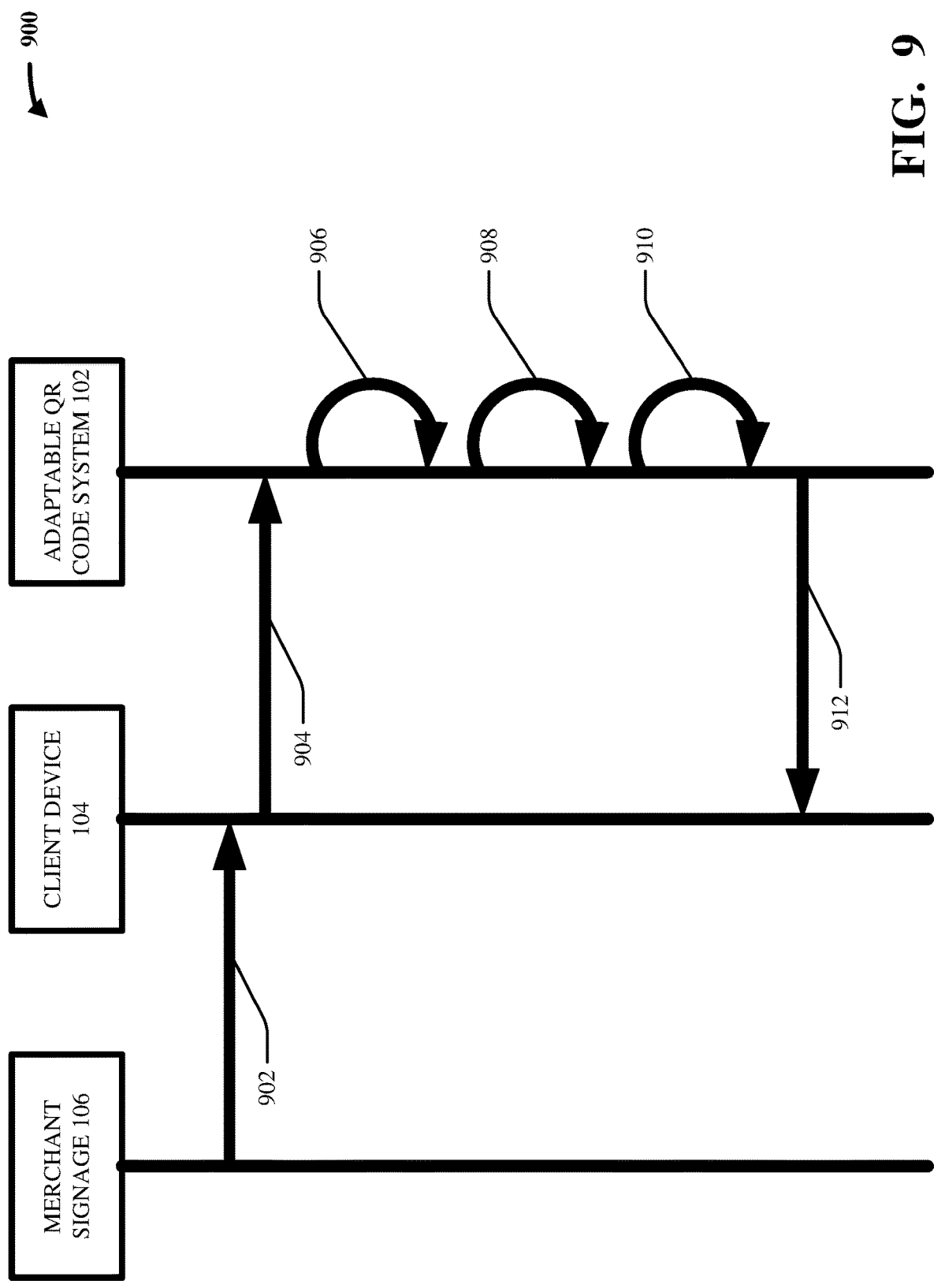
Figure 10:
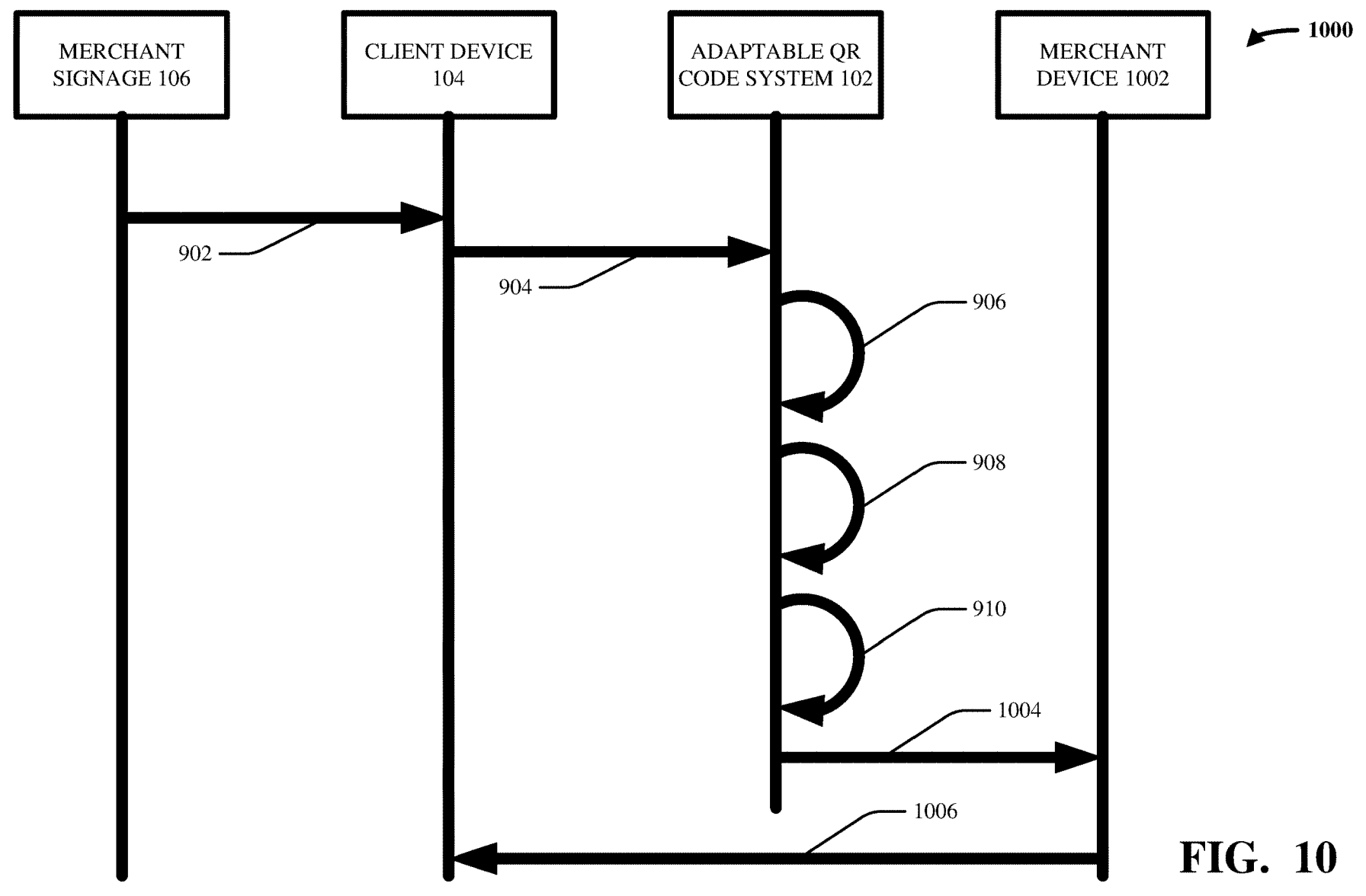

FIGS. 9-10 illustrate communication diagrams of example, non-limiting workflows 900-1000 that can facilitate adaptable QR codes for customized experiences in accordance with one or more embodiments described herein.

First consider the workflow 900. In various embodiments, the merchant signage 106 can visually display the QR code

202 to the client device 104. Accordingly, at act 902, the client device 104 can electronically scan and/or capture the QR code 202.

In various instances, the client device 104 can, at act 904, electronically transmit the QR code 202 to the adaptable QR code system 102. In various cases, the client device 104 can also, at act 904, determine and electronically transmit the client identifier 204 and the location indicator 206 to the adaptable QR code system 102.

In various aspects, the adaptable QR code system 102 can, at act 906, electronically identify the merchant 304 based on the location indicator 206 and/or the QR code 202 (e.g., by leveraging the merchant repository 302).

In various instances, the adaptable QR code system 102 can, at act 908, electronically identify the client profile 504 based on the client identifier 204 (e.g., by leveraging the client profile repository 502).

In various aspects, the adaptable QR code system 102 can, at act 910, electronically identify the digital content 702 based on the merchant 304 and/or the client profile 504 (e.g., by using the client profile 504 to filer and/or sort through electronic records that specify the inventory, promotions, and/or reward plans of the merchant 304). As explained herein, the digital content 702 can be considered as being customized to the user of the client device 104 (e.g., a different user of a different client device that scans the QR code 202 can be provided with different digital content).

In various instances, the adaptable QR code system 102 can, at act 912, electronically transmit the digital content 702 to the client device 104.

Now, consider the workflow 1000. As shown, the acts 902-910 in the workflow 1000 can be as described above.

In various embodiments, rather that transmitting the digital content 702 directly to the client device 104, the adaptable QR code system 102 can, at act 1004, electronically transmit an instruction to a merchant device 1002. In various instances, the merchant device 1002 can be any suitable computing device that is owned by, operated by, and/or otherwise associated with the merchant 304. In various aspects, the instruction can command and/or prompt the merchant device 1002 to transmit the digital content 702 to the client device 104.

In various instances, in response to the instruction from the adaptable QR code system 102, the merchant device 1002 can, at act 1006, electronically transmit the digital content 702 to the client device 104.

In either the workflow 900 and/or the workflow 1000, the client device 104 can electronically obtain the digital content 702, and the client device 104 can accordingly render the digital content 702, such that it is viewable to the user of the client device 104.

In various aspects, embodiments of the subject innovation can employ any suitable multitenancy architecture as desired. For example, in various instances, the client device 104 can electronically store and/or maintain any suitable number of programs/applications. In various cases, a first program/application that is electronically stored and/or maintained on the client device 104 can cause the client device 104 to scan/capture the QR code 202, can cause the client device 104 to identify the client identifier 204, and/or can cause the client device 104 to identify the location indicator 206. That is, when the first program/application is launched/invoked by the user of the client device 104, the first program/application can activate the camera of the client device 104, the data querying capabilities of the client device 104, and/or the global positioning capabilities of the client device 104. As a non-limiting example, the first program/application can be the PayPal® app and/or the Venmo® app.

In some cases, the digital content 702 can be provided to and/or rendered by the first program/application of the client device 104. As an example, the PayPal® app of the client device 104 can cause the client device 104 to transmit the QR code 202, the client identifier 204 and/or the location indicator 206 to the receiver component 112, and the digital content 702 can be obtained and/or rendered by the PayPal® app of the client device 104. In other cases, however, the digital content 702 can be provided to and/or rendered by a second program/application that is electronically stored and/or maintained on the client device 104, where the second program/application is different from the first program/application. As an example, the PayPal® app of the client device 104 can cause the client device 104 to transmit the QR code 202, the client identifier 204 and/or the location indicator 206 to the receiver component 112, but the digital content 702 can be obtained and/or rendered by the Venmo® app of the client device 104. That is, one program/app of the client device 104 can be invoked to scan, capture, and/or transmit the QR code 202, and a different program/app of the client device 104 can be invoked to obtain and/or render the digital content 702. In some aspects, the client profile 504 can indicate that the second program/application is a preferred program/application (e.g., can indicate that the user of the client device 104 prefers to have digital content rendered via the second program/application, rather than via the first program/application).

In various embodiments, the electronic records (that are associated with the merchant 304 and that are leveraged by the content component 118 to identify the digital content 702) can correspond to a particular program/application that is electronically stored on the client device 104. For example, in some cases, the electronic records can be stored in a database that is associated with and/or accessible to the PayPal® app. As another example, the electronic records can be stored in a database that is associated with and/or accessible to the Venmo® app. In various instances, the client device 104 can scan and/or transmit the QR code 202 via a first program/application of the client device 104, the adaptable QR code system 102 can analyze electronic records of the merchant 304 that are stored in a database associated with the first program/application, and the digital content 702 can be provided to and/or rendered by the first program/application of the client device 104. In various other instances, however, the client device 104 can scan and/or transmit the QR code 202 via a first program/application of the client device 104, the adaptable QR code system 102 can analyze electronic records of the merchant 304 that are stored in a database associated with a second program/application, and the digital content 702 can be provided to and/or rendered by the first program/application of the client device 104. For example, in various cases, the client device 104 can utilize the Venmo® app to scan the QR code 202, to transmit the QR code 202, the client identifier 204, and/or the location indicator 206 to the receiver component 112, and/or to render the digital content 702. In such case, however, the adaptable QR code system 102 can utilize databases that are associated with and/or accessible to the PayPal® app, not the Venmo® app, to identify the digital content 702. Those having ordinary skill in the art will appreciate that any other suitable multitenant and/or cross-application architecture can be implemented in various embodiments.

Figure 11:
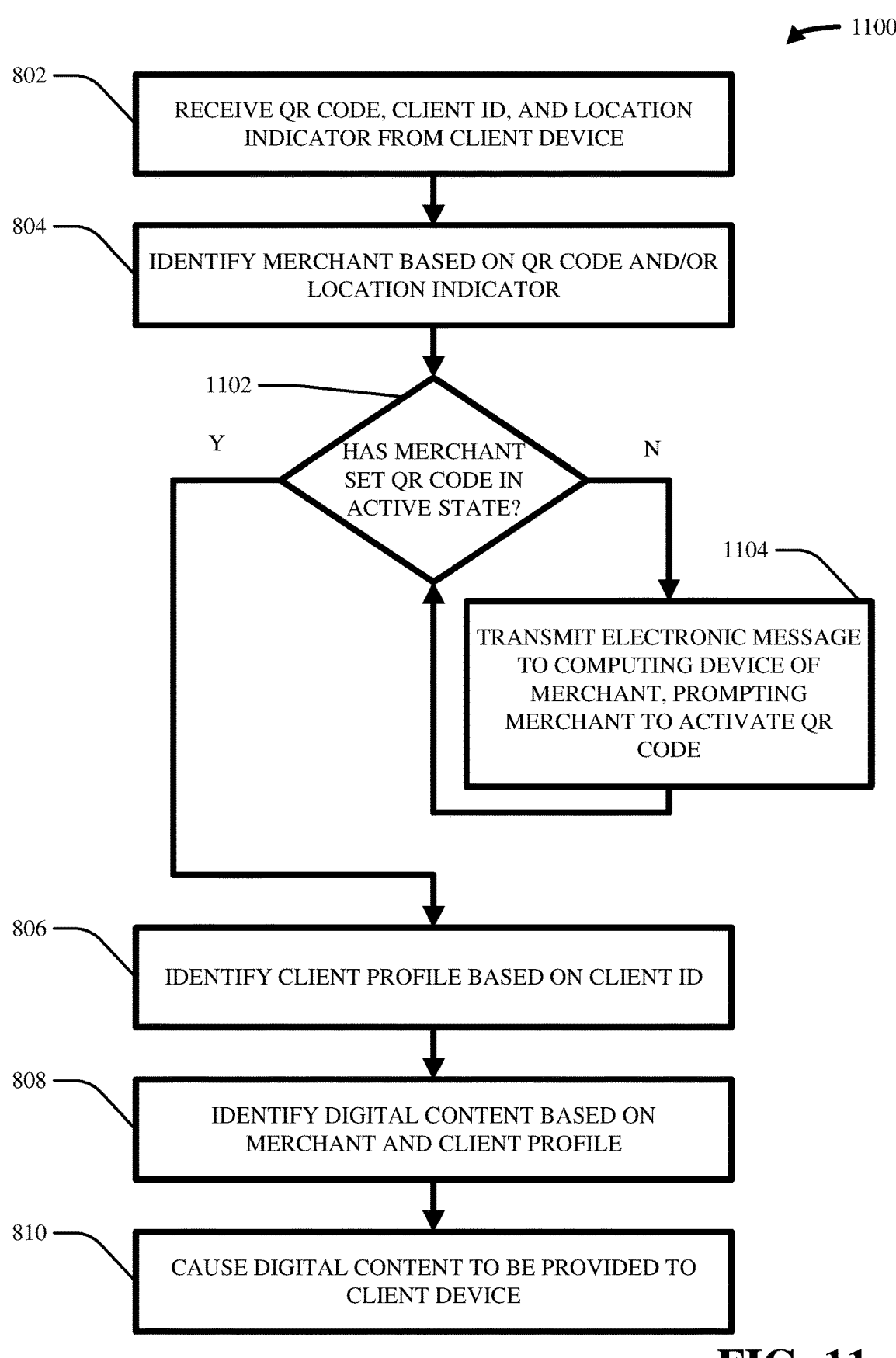
FIG. 11 illustrates a flow diagram of an example, non-limiting computer-implemented method including checking an activation status of a QR code in accordance with one or more embodiments described herein.

FIG. 11 illustrates a flow diagram of an example, non-limiting computer-implemented method 1100 including checking an activation status of a QR code in accordance with one or more embodiments described herein. In other words, FIG. 11 illustrates how the identification and/or provision of customized digital content to a client device can be controlled and/or gate-kept based on an activation status (e.g., active vs. inactive) of a QR code scanned by the client device.

In various embodiments, act 802 can include receiving, by a device (e.g., 112) operatively coupled to a processor, a QR code (e.g., 202), a client ID (e.g., 204), and/or a location indicator (e.g., 206) from a client device (e.g., 104).

In various aspects, act 804 can include identifying, by the device (e.g., 114), a merchant (e.g., 304) based on the location indicator and/or the QR code.

In various instances, act 1102 can include determining, by the device (e.g., 114), whether the merchant has set the QR code to an active state. In various cases, any suitable electronic records associated with the merchant can indicate an activation status established by the merchant for the QR code. Accordingly, the activation status of the QR code can be determined by querying such electronic records. If the merchant has specified that the QR code is currently in an active state, the computer-implemented method 1100 can proceed to act 806. On the other hand, if the merchant has specified that the QR code is currently in an inactive state, the computer-implemented method 1100 can proceed to act 1104.

In various embodiments, acts 806-810 can be as described above. That is, act 806 can include identifying, by the device (e.g., 116), a client profile (e.g., 504) based on the client ID; act 808 can include identifying, by the device (e.g., 118), digital content (e.g., 702) based on the merchant and the client profile; and act 810 can include causing, by the device (e.g., 120), the digital content to be provided to the client device.

In various instances, act 1104 can include transmitting, by the device (e.g., 120), an electronic message to a computing device (e.g., 1002) of the merchant, where the electronic message can prompt the merchant to activate the QR code. In various cases, the computer-implemented method 1100 can proceed back to act 1102.

In other words, the computer-implemented method 1100 illustrates that customized digital content can be identified and/or provided to a client device, if the merchant whose QR code was scanned by the client device has specified that the QR code is currently activated. Conversely, the customized digital content can be not identified and/or can be not provided to the client device, if the merchant whose QR code was scanned by the client device has specified that the QR code is currently not activated. In such case, the merchant can be prompted and/or requested to activate the QR code, so that customized digital content can thereafter be identified and/or provided.

Figure 12:
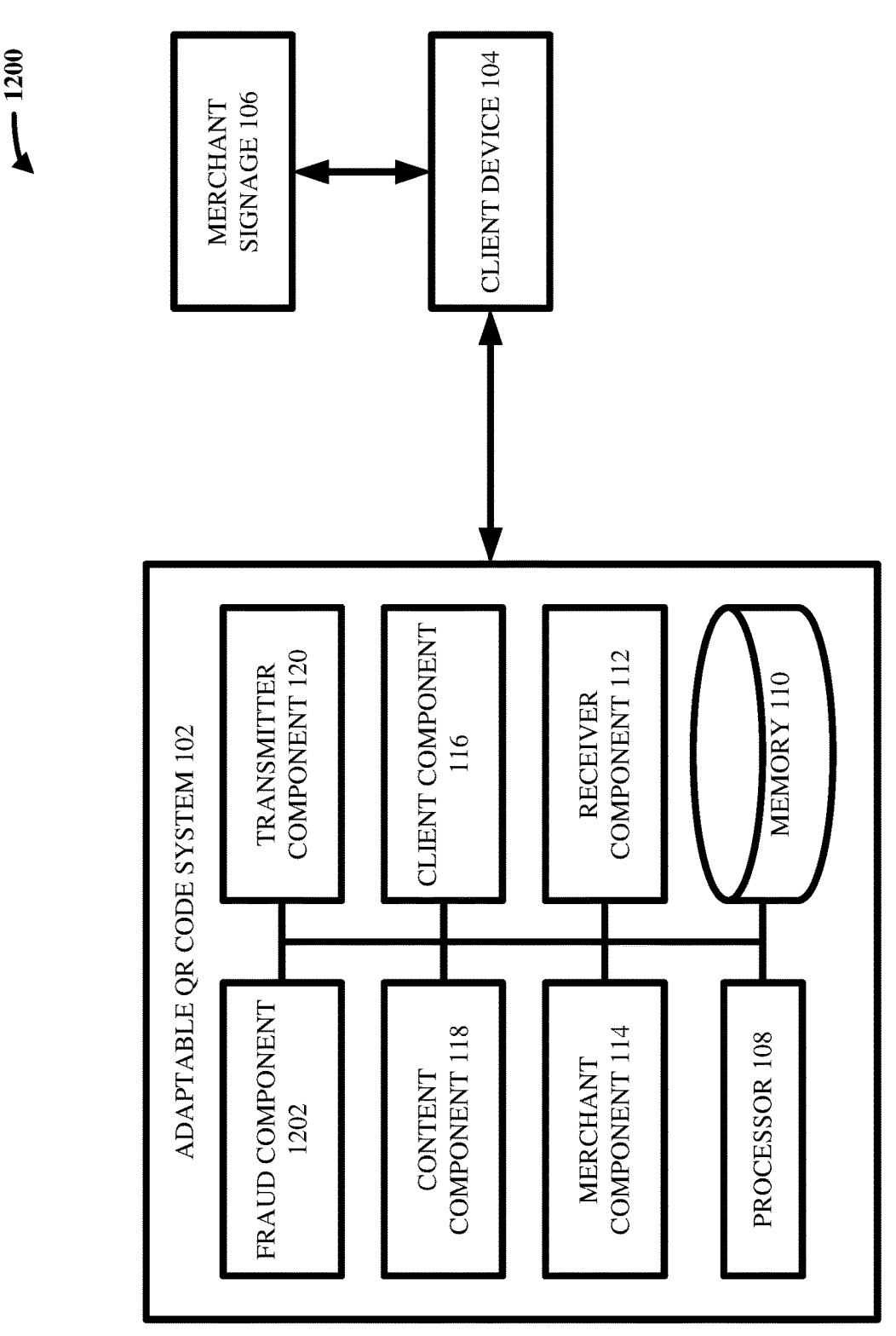
FIG. 12 illustrates a high-level block diagram of an example, non-limiting system including a fraud component that facilitates fraud prevention for adaptable QR codes that launch customized experiences in accordance with one or more embodiments described herein.

FIG. 12 illustrates a high-level block diagram of an example, non-limiting system 1200 including a fraud component that can facilitate fraud prevention for adaptable QR codes that launch customized experiences in accordance with one or more embodiments described herein. As shown, the system 1200 can, in some cases, comprise the same components as the system 700, and can further comprise a fraud component 1202. Note that, for sake of space, not all previously-discussed components and/or numerals are depicted in FIG. 12.

In various embodiments, the fraud component 1202 can electronically store and/or maintain authentication data, which authentication data can be leveraged to determine whether the QR code 202 was permissibly scanned/captured by the client device 104 and/or impermissibly scanned/captured by the client device 104. In some cases, such authentication data can include sound signature data, time frame data, and/or visible surround environment data. In any case, the receiver component 112 can electronically receive supplemental data from the client device 104, and the fraud component 1202 can electronically compare such supplemental data with the authentication data. If the supplemental data matches and/or corresponds to the authentication data, the fraud component 1202 can electronically determine and/or infer that the client device 104 permissibly scanned/captured the QR code 202 (e.g., scanned/captured an image of an authentic version of the merchant signage 106). On the other hand, if the supplement data does not match and/or correspond to the authentication data, the fraud component 1202 can electronically determine and/or infer that the client device 104 impermissibly scanned/captured the QR code 202 (e.g., scanned/captured an image of a non-authentic version of the merchant signage 106).

Figure 13:
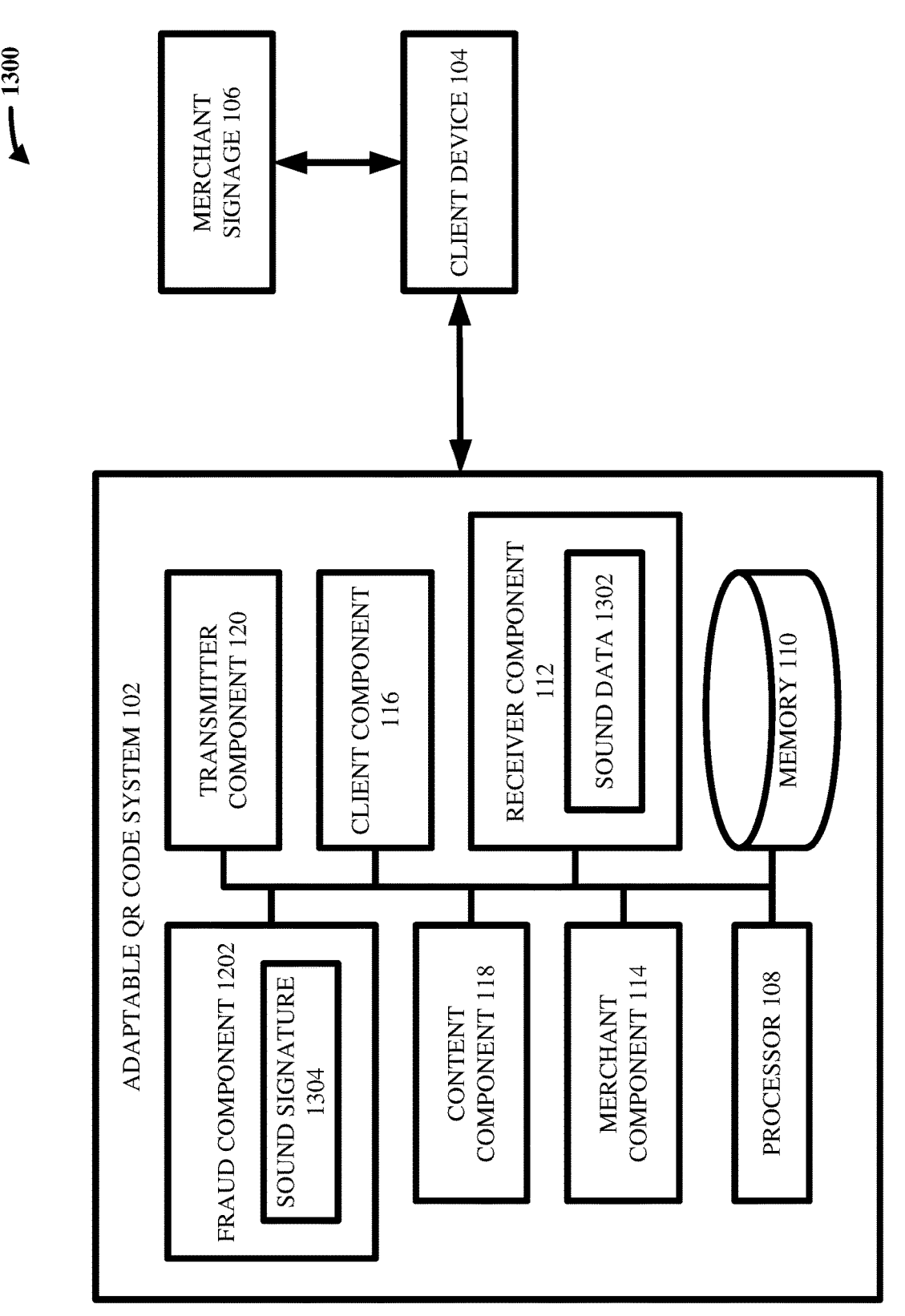
FIG. 13 illustrates a high-level block diagram of an example, non-limiting system including sound data and a sound signature that facilitates fraud prevention for adaptable QR codes that launch customized experiences in accordance with one or more embodiments described herein.

FIG. 13 illustrates a high-level block diagram of an example, non-limiting system 1300 including sound data and a sound signature that facilitates fraud prevention for adaptable QR codes that launch customized experiences in accordance with one or more embodiments described herein. As shown, the system 1300 can, in some cases, comprise the same components as the system 1200, and can further comprise sound data 1302 and/or a sound signature 1304.

In various instances, the merchant signage 106 can be configured to emit, from an electronic speaker, an audible and/or inaudible sound in conjunction with visually displaying the QR code 202. In various aspects, such audible and/or inaudible sound can be considered as and/or can be described by the sound signature 1304. That is, the sound signature 1304 can be any suitable data that indicates a sound emitted by the merchant signage 106.

In various embodiments, the client device 104 can comprise a microphone sensor and/or any other suitable sound-capturing equipment. In various cases, the client device 104 can thus capture sound data 1302. In various aspects, the sound data 1302 can be any suitable data that indicates an ambient sound that is and/or was detectable by the client device 104 when the client device 104 scanned the QR code 202 and/or when the client device 104 transmitted the QR code 202.

In other words, the sound signature 1304 can represent a sound that is expected to be captured by the client device 104, and the sound data 1302 can represent a sound that is actually captured by the client device 104.

In various cases, the fraud component 1202 can compare the sound data 1302 with the sound signature 1304. If the sound data 1302 matches, is consistent with, corresponds to, and/or is otherwise within any suitable threshold margin of error of the sound signature 1304, the fraud component 1202 can determine and/or infer that the client device 104 permissibly scanned the QR code 202. In such case, the content component 118 can identify the digital content 702 and/or the transmitter component 120 can provide the digital content 702 to the client device 104. On the other hand, if the sound data 1302 does not match, is not consistent with, does not correspond to, and/or is otherwise outside of any suitable threshold margin of error of the sound signature 1304, the fraud component 1202 can determine and/or infer that the client device 104 impermissibly scanned the QR code 202. In such case, the content component 118 can refrain from identifying the digital content 702 and/or the transmitter component 120 can refrain from providing the digital content 702 to the client device 104.

To help illustrate this, suppose that the merchant signage 106 is authentic and/or non-fraudulent. In such case, the merchant signage 106 can emit a sound that corresponds to the sound signature 1304, simultaneously as the merchant signage 106 displays the QR code 202. In various instances, the client device 104 can scan/capture the QR code 202. At the time that the client device 104 scans/captures the QR code 202, the client device 104 can also record/capture the sound emitted by the merchant signage 106. Such recorded/captured sound can be considered as the sound data 1302. Because the merchant signage 106 is this example is authentic and/or non-fraudulent, the sound data 1302 can match and/or be consistent with the sound signature 1304. Accordingly, the fraud component 1202 can determine/infer that the client device 104 permissibly scanned the QR code 202. In contrast, suppose that the merchant signage 106 is inauthentic and/or fraudulent. In such case, the merchant signage 106 can fail to emit a sound that corresponds to the sound signature 1304, simultaneously as the merchant signage 106 displays the QR code 202. In various instances, the client device 104 can scan/capture the QR code 202. At the time that the client device 104 scans/captures the QR code 202, the client device 104 can also record/capture ambient sounds that are detectable by the client device 104. Such recorded/captured ambient sounds can be considered as the sound data 1302. Because the merchant signage 106 is this example is inauthentic and/or fraudulent, the sound data 1302 can fail to match and/or be consistent with the sound signature 1304. Accordingly, the fraud component 1202 can determine/infer that the client device 104 impermissibly scanned the QR code 202. In this way, the sound data 1302 and/or the sound signature 1304 can be leveraged to ferret out fraudulently-scanned QR codes.

In some embodiments, the merchant signage 106 can be not configured to emit an audible and/or inaudible sound in conjunction with visually displaying the QR code 202. Instead, the merchant signage 106 can include and/or can otherwise be associated with any suitable microphone sensor (not shown) that can capture ambient sounds that occur around and/or near the merchant signage 106 at the time at which the client device 104 scans and/or transmits the QR code 202. In such case, the ambient sound captured by the microphone sensor associated with the merchant signage 106 can be considered as the sound signature 1304.

Figure 14:
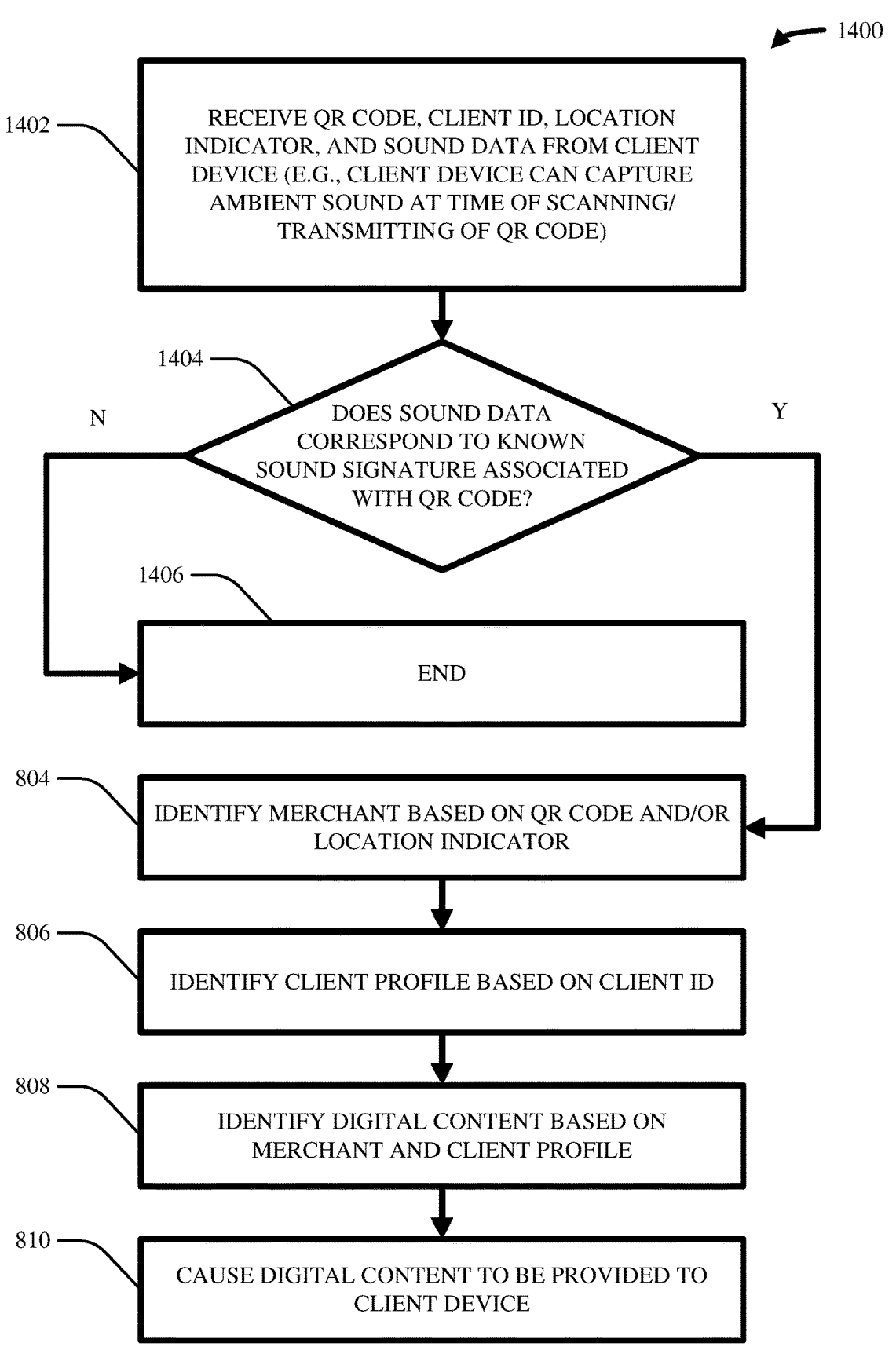
FIG. 14 illustrates a flow diagram of an example, non-limiting computer-implemented method that facilitates sound-based fraud prevention for adaptable QR codes that launch customized experiences in accordance with one or more embodiments described herein.

FIG. 14 illustrates a flow diagram of an example, non-limiting computer-implemented method 1400 that can facilitate sound-based fraud prevention for adaptable QR codes that launch customized experiences in accordance with one or more embodiments described herein. In various cases, the computer-implemented method 1400 can be facilitated by the adaptable QR code system 102.

In various embodiments, act 1402 can include receiving, by a device (e.g., 112) operatively coupled to a processor, a QR code (e.g., 202), a client ID (e.g., 204), a location indicator (e.g., 206), and/or sound data (e.g., 1302) from a client device (e.g., 104). In various cases, as explained herein, the client device can capture and/or record an ambient sound at the time of scanning and/or transmitting of the QR code, and such ambient sound can be used to determine whether the QR code was permissibly and/or impermissibly scanned.

In various aspects, act 1404 can include determining, by the device (e.g., 1202), whether the sound data corresponds to (e.g., is within any suitable threshold margin of) a known sound signature (e.g., 1304) associated with the QR code. If not, the computer-implemented method 1400 can proceed to act 1406. If so, the computer-implemented method 1400 can proceed to act 804.

In various instances, act 1406 can include ending the computer-implemented method 1400.

In various aspects, acts 804-810 can be as described above. That is, act 804 can include identifying, by the device (e.g., 114), a merchant (e.g., 304) based on the location indicator and/or the QR code; act 806 can include identifying, by the device (e.g., 116), a client profile (e.g., 504) based on the client ID; act 808 can include identifying, by the device (e.g., 118), digital content (e.g., 702) based on the merchant and the client profile; and act 810 can include causing, by the device (e.g., 120), the digital content to be provided to the client device.

Figure 15:
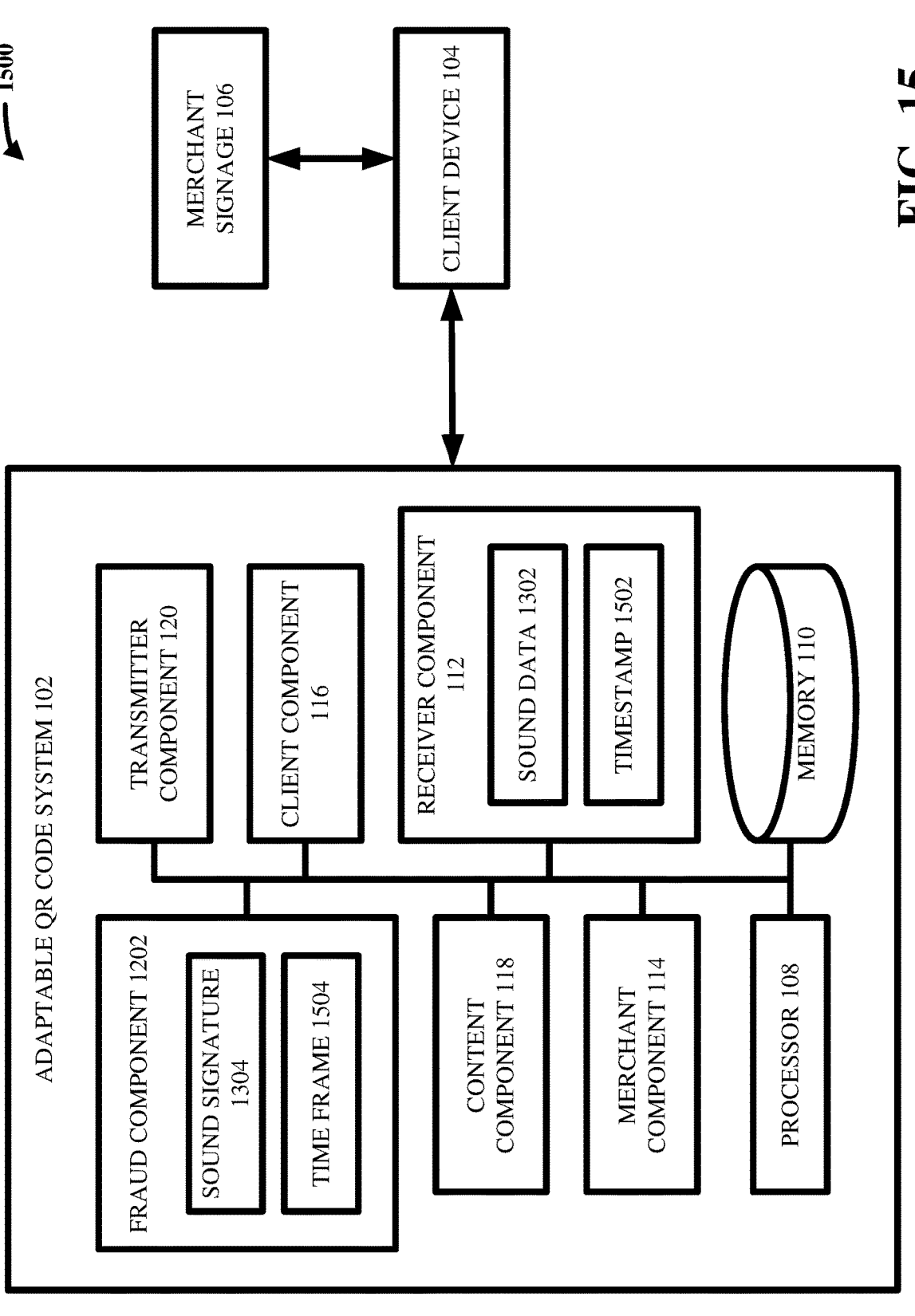
FIG. 15 illustrates a high-level block diagram of an example, non-limiting system including a timestamp and a time frame that facilitates fraud prevention for adaptable QR codes that launch customized experiences in accordance with one or more embodiments described herein.

FIG. 15 illustrates a high-level block diagram of an example, non-limiting system 1500 including a timestamp and a time frame that can facilitate fraud prevention for adaptable QR codes that launch customized experiences in accordance with one or more embodiments described herein. As shown, the system 1500 can, in some cases, comprise the same components as the system 1300, and can further comprise timestamp 1502 and/or a time frame 1504.

In various instances, the merchant signage 106 can be configured to display different QR codes at different times (e.g., a first QR code at a first time of day, a second QR code at a second time of day). Accordingly, the merchant signage 106 can be configured to display the QR code 202 only for a particular period of time. In various cases, such particular period of time can be the time frame 1504.

In various embodiments, the client device 104 can comprise an electronic clock and/or any other suitable time-keeping equipment. In various cases, the client device 104 can thus capture a timestamp 1502. In various aspects, the timestamp 1502 can be any suitable data that indicates a time at which the client device 104 scanned the QR code 202 and/or at which the client device 104 transmitted the QR code 202.

In other words, the time frame 1504 can represent a time interval in which the client device 104 is expected to scan/capture the QR code 202, and the timestamp 1502 can represent a time at which the QR code 202 is actually scanned/captured by the client device 104.

In various cases, the fraud component 1202 can compare the timestamp 1502 with the time frame 1504. If the timestamp 1502 is consistent with, corresponds to, and/or is otherwise within the time frame 1504, the fraud component 1202 can determine and/or infer that the client device 104 permissibly scanned the QR code 202. In such case, the content component 118 can identify the digital content 702 and/or the transmitter component 120 can provide the digital content 702 to the client device 104. On the other hand, if the timestamp 1502 is not consistent with, does not correspond to, and/or is otherwise outside of the time frame 1504, the fraud component 1202 can determine and/or infer that the client device 104 impermissibly scanned the QR code 202. In such case, the content component 118 can refrain from identifying the digital content 702 and/or the transmitter component 120 can refrain from providing the digital content 702 to the client device 104.

To help illustrate this, suppose that the merchant signage 106 is authentic and/or non-fraudulent. In such case, the merchant signage 106 can visually display the QR code 202 during the time frame 1504. In various instances, the client device 104 can scan/capture the QR code 202 as it is displayed by the merchant signage 106. At the time that the client device 104 scans/captures the QR code 202, the client device 104 can also record/capture the time at which such scanning/capturing occurs. Such recorded/captured time can be considered as the timestamp 1502. Because the merchant signage 106 is this example is authentic and/or non-fraudulent, the timestamp 1502 can be within and/or consistent with the time frame 1504. Accordingly, the fraud component 1202 can determine/infer that the client device 104 permissibly scanned the QR code 202. In contrast, suppose that the merchant signage 106 is inauthentic and/or fraudulent. In such case, the merchant signage 106 can visually display the QR code 202 outside of the time frame 1504. In various instances, the client device 104 can scan/capture the QR code 202 as it is displayed by the merchant signage 106. At the time that the client device 104 scans/captures the QR code 202, the client device 104 can also record/capture the time at which such scanning/capturing occurs. Such recorded/captured time can be considered as the timestamp 1502. Because the merchant signage 106 is this example is inauthentic and/or fraudulent, the timestamp 1502 can be outside of and/or not consistent with the time frame 1504. Accordingly, the fraud component 1202 can determine/infer that the client device 104 impermissibly scanned the QR code 202. In this way, the timestamp 1502 and/or the time frame 1504 can be leveraged to ferret out fraudulently-scanned QR codes.

In some embodiments, the time frame 1504 can be provided and/or identified by the merchant signage 106 and/or by any suitable computing device (not shown) that is associated with the merchant signage 106. For instance, the merchant signage 106 and/or the computing device associated with the merchant signage 106 can keep track of which QR codes are rendered/displayed by the merchant signage 106 during which time intervals. Accordingly, the merchant signage 106 and/or the computing device associated with the merchant signage 106 can provide, indicate, and/or otherwise identify a time interval during which the QR code 202 is rendered/displayed by the merchant signage 106. Such time interval can be considered as the time frame 1504.

Figure 16:
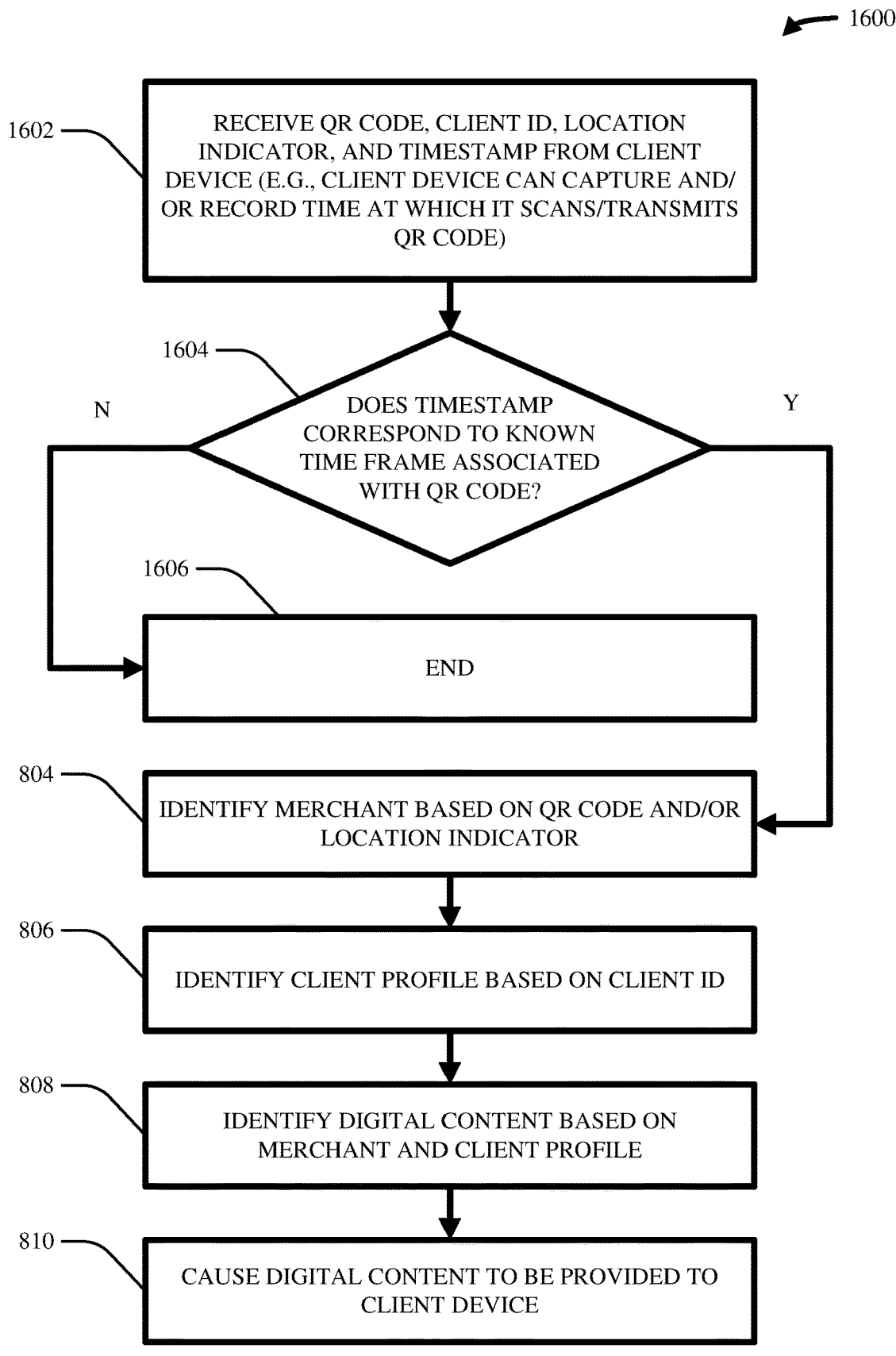
FIG. 16 illustrates a flow diagram of an example, non-limiting computer-implemented method that facilitates time-based fraud prevention for adaptable QR codes that launch customized experiences in accordance with one or more embodiments described herein.

FIG. 16 illustrates a flow diagram of an example, non-limiting computer-implemented method 1600 that can facilitate time-based fraud prevention for adaptable QR codes that launch customized experiences in accordance with one or more embodiments described herein. In various cases, the computer-implemented method 1600 can be facilitated by the adaptable QR code system 102.

In various embodiments, act 1602 can include receiving, by a device (e.g., 112) operatively coupled to a processor, a QR code (e.g., 202), a client ID (e.g., 204), a location indicator (e.g., 206), and/or a timestamp (e.g., 1502) from a client device (e.g., 104). In various cases, as explained herein, the client device can capture and/or record the time at which the client device scans and/or transmits the QR code, and such time can be used to determine whether the QR code was permissibly and/or impermissibly scanned.

In various aspects, act 1604 can include determining, by the device (e.g., 1202), whether the timestamp corresponds to (e.g., is within) a known time frame (e.g., 1504) associated with the QR code. If not, the computer-implemented method 1600 can proceed to act 1606. If so, the computer-implemented method 1600 can proceed to act 804.

In various instances, act 1606 can include ending the computer-implemented method 1600.

In various aspects, acts 804-810 can be as described above. That is, act 804 can include identifying, by the device (e.g., 114), a merchant (e.g., 304) based on the location indicator and/or the QR code; act 806 can include identifying, by the device (e.g., 116), a client profile (e.g., 504)

based on the client ID; act 808 can include identifying, by the device (e.g., 118), digital content (e.g., 702) based on the merchant and the client profile; and act 810 can include causing, by the device (e.g., 120), the digital content to be provided to the client device.

Figure 17:
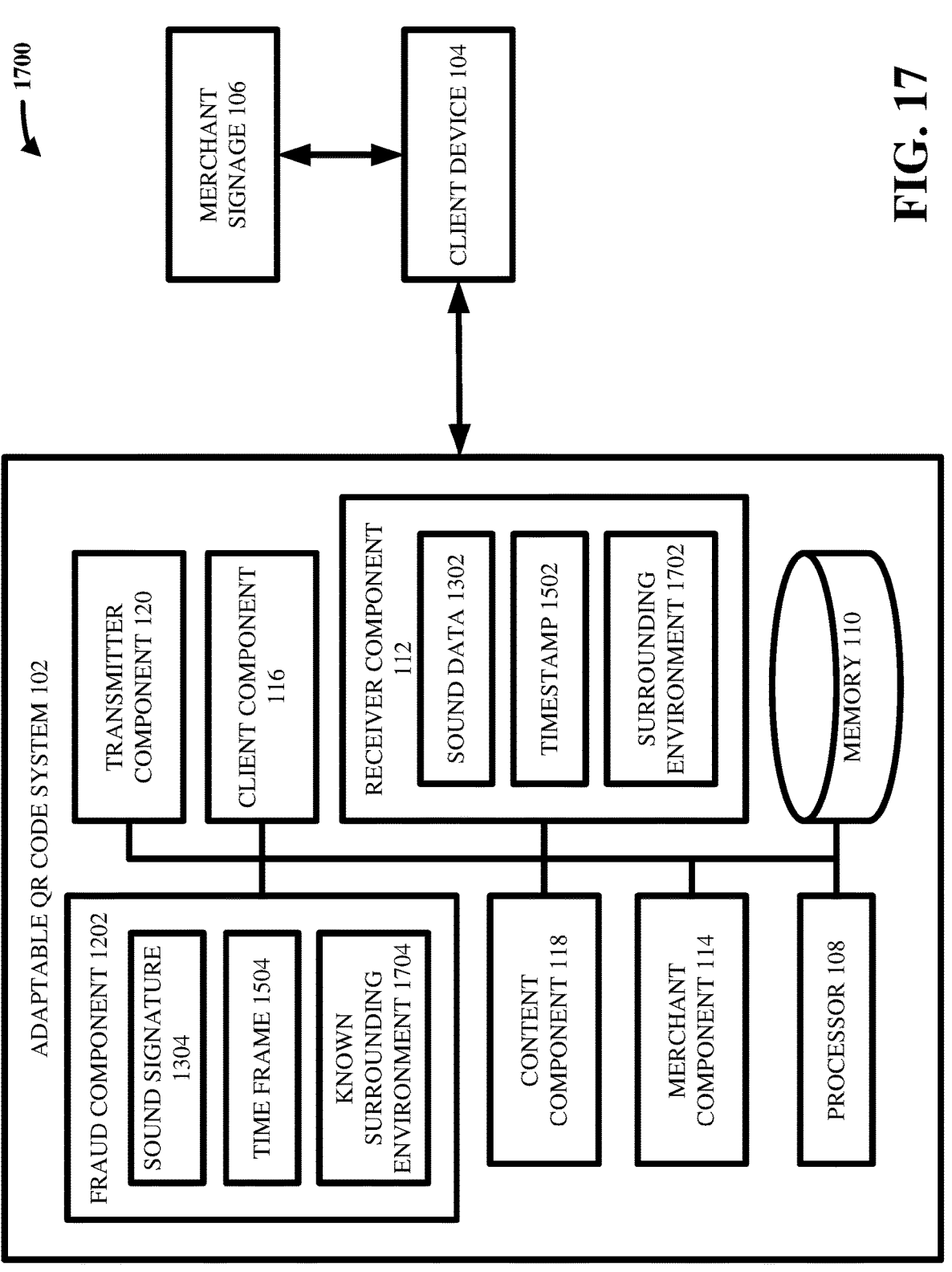
FIG. 17 illustrates a high-level block diagram of an example, non-limiting system including a surrounding environment and a known surrounding environment that facilitates fraud prevention for adaptable QR codes that launch customized experiences in accordance with one or more embodiments described herein.

FIG. 17 illustrates a high-level block diagram of an example, non-limiting system 1700 including a surrounding environment and a known surrounding environment that can facilitate fraud prevention for adaptable QR codes that launch customized experiences in accordance with one or more embodiments described herein. As shown, the system 1700 can, in some cases, comprise the same components as the system 1500, and can further comprise a surrounding environment 1702 and/or a known surrounding environment 1704.

In various instances, the merchant signage 106 can be configured to display the QR code 202 with a distinctive surrounding environment. For instance, the merchant signage 106 can include a distinctive symbol around and/or near the QR code, can include a distinctive bezel that circumscribes the QR code, and/or can be affixed and/or adjacent to a distinctive structure/object (e.g., distinctive wall and/or shelf). In various cases, the known surrounding environment 1704 can be any suitable data that indicates and/or describes the distinctive surrounding environment of the merchant signage 106.

In various embodiments, the client device 104 can scan and/or capture the QR code 202 by capturing an image and/or video of the merchant signage 106 as the merchant signage 106 displays the QR code 202. In various cases, the receiver component 112 can analyze, via any suitable machine vision techniques, a periphery of the image and/or video, so as to identify objects and/or structures that are depicted in the image and/or video as being physically around and/or near the QR code 202. In various cases, the surrounding environment 1702 can be any suitable data that indicates and/or describes such objects and/or structures.

In other words, the known surrounding environment 1704 can represent one or more objects/structures which the client device 104 is expected to scan/capture in conjunction with the QR code 202, and the surrounding environment 1702 can represent one or more objects/structures which the client device 104 actually scans/captures in conjunction with the QR code 202.

In various cases, the fraud component 1202 can compare the surrounding environment 1702 with the known surrounding environment 1704. If the surrounding environment 1702 is identical to, consistent with, corresponds to, and/or is otherwise within any suitable threshold margin of error of the known surrounding environment 1704, the fraud component 1202 can determine and/or infer that the client device 104 permissibly scanned the QR code 202. In such case, the content component 118 can identify the digital content 702 and/or the transmitter component 120 can provide the digital content 702 to the client device 104. On the other hand, if the surrounding environment 1702 is not identical to, not consistent with, does not correspond to, and/or is otherwise outside of any suitable threshold margin of error of the known surrounding environment 1704, the fraud component 1202 can determine and/or infer that the client device 104 impermissibly scanned the QR code 202. In such case, the content component 118 can refrain from identifying the digital content 702 and/or the transmitter component 120 can refrain from providing the digital content 702 to the client device 104.

To help illustrate this, suppose that the merchant signage 106 is authentic and/or non-fraudulent. In such case, the merchant signage 106 can visually display the QR code 202 with distinctive surrounding objects/structures that correspond to the known surrounding environment 1704. In various instances, the client device 104 can scan/capture the QR code 202 as it is displayed by the merchant signage 106. At the time that the client device 104 scans/captures the QR code 202, the client device 104 can also scan/capture any surrounding objects/structures that are near the QR code 202. Such surrounding objects/structures can be considered as the surrounding environment 1702. Because the merchant signage 106 is this example is authentic and/or non-fraudulent, the surrounding environment 1702 can match and/or correspond to the known surrounding environment 1704. Accordingly, the fraud component 1202 can determine/infer that the client device 104 permissibly scanned the QR code 202. In contrast, suppose that the merchant signage 106 is inauthentic and/or fraudulent. In such case, the merchant signage 106 can visually display the QR code 202 with surrounding objects/structures that do not correspond to the known surrounding environment 1704. In various instances, the client device 104 can scan/capture the QR code 202 as it is displayed by the merchant signage 106. At the time that the client device 104 scans/captures the QR code 202, the client device 104 can also scan/capture any surrounding objects/structures that are near the QR code 202. Such surrounding objects/structures can be considered as the surrounding environment 1702. Because the merchant signage 106 is this example is inauthentic and/or fraudulent, the surrounding environment 1702 can fail to match and/or fail to correspond to the known surrounding environment 1704. In this way, the surrounding environment 1702 and/or the known surrounding environment 1704 can be leveraged to ferret out fraudulently-scanned QR codes.

FIG. 18 illustrates a flow diagram of an example, non-limiting computer-implemented method 1800 that an facilitate surrounding-based fraud prevention for adaptable QR codes that launch customized experiences in accordance with one or more embodiments described herein. In various cases, the computer-implemented method 1800 can be facilitated by the adaptable QR code system 102.

In various embodiments, act 1802 can include receiving, by a device (e.g., 112) operatively coupled to a processor, an image and/or video of a QR code (e.g., 202), a client ID (e.g., 204), and/or a location indicator (e.g., 206) from a client device (e.g., 104).

In various instances, act 1804 can include identifying, by the device (e.g., 112), a surrounding environment (e.g., 1702) of the QR code based on the image and/or video of the QR code. In various cases, as explained herein, the periphery of the image and/or video can display one or more objects, symbols, and/or structures that are depicted as surrounding and/or otherwise being near the QR code, and such objects, symbols, and/or structures can be used to determine whether the QR code was permissibly and/or impermissibly scanned.

In various aspects, act 1806 can include determining, by the device (e.g., 1202), whether the surrounding environment corresponds to (e.g., matches) a known surrounding environment (e.g., 1704) associated with the QR code. If not, the computer-implemented method 1800 can proceed to act 1808. If so, the computer-implemented method 1800 can proceed to act 804.

In various instances, act 1806 can include ending the computer-implemented method 1800.

In various aspects, acts 804-810 can be as described above. That is, act 804 can include identifying, by the device (e.g., 114), a merchant (e.g., 304) based on the location indicator and/or the QR code; act 806 can include identifying, by the device (e.g., 116), a client profile (e.g., 504) based on the client ID; act 808 can include identifying, by the device (e.g., 118), digital content (e.g., 702) based on the merchant and the client profile; and act 810 can include causing, by the device (e.g., 120), the digital content to be provided to the client device.

Figure 19:
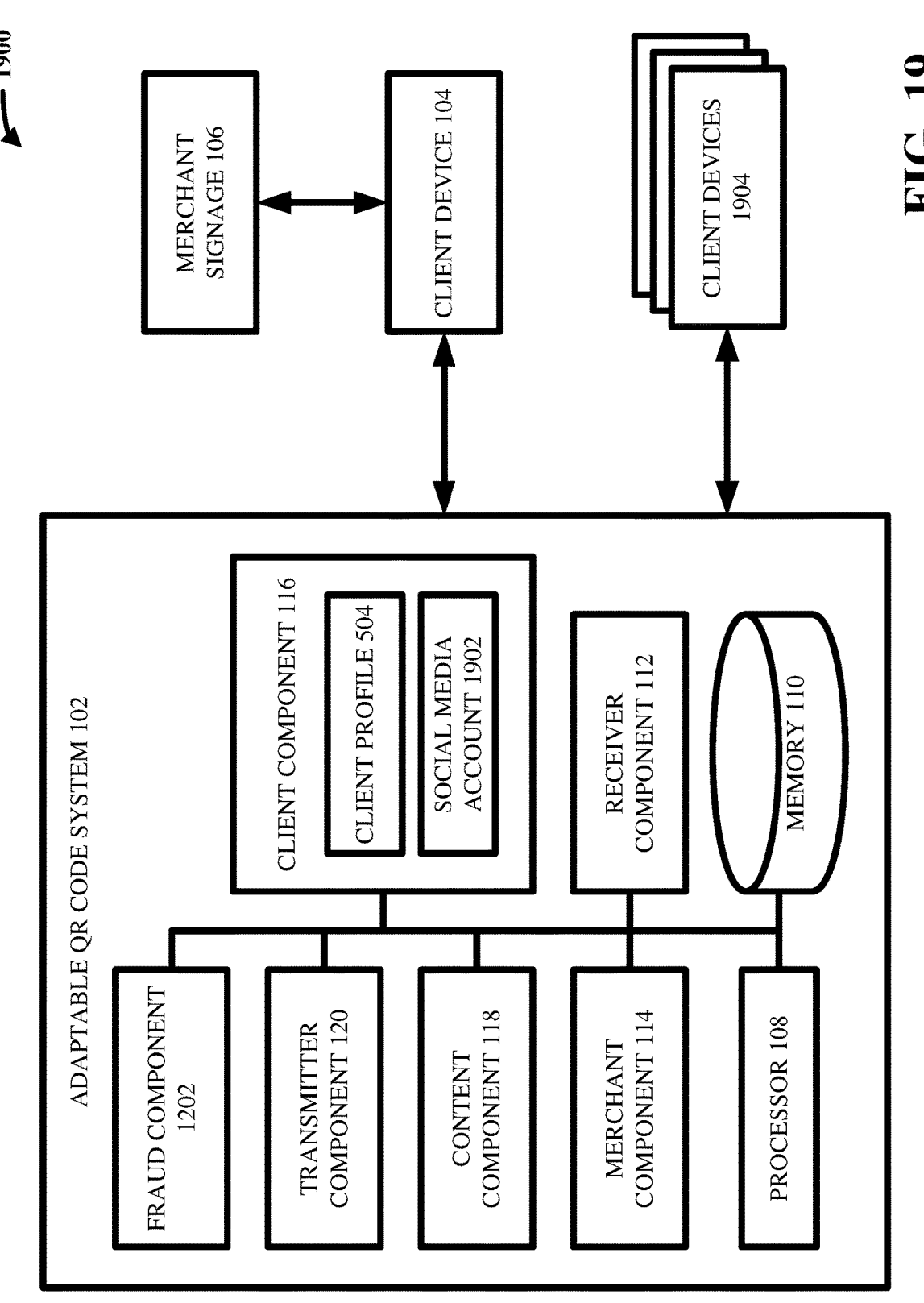
FIG. 19 illustrates a high-level block diagram of an example, non-limiting system including a social media account and additional client devices that facilitates adaptable QR codes for customized experiences with connected users in accordance with one or more embodiments described herein.

FIG. 19 illustrates a high-level block diagram of an example, non-limiting system 1900 including a social media account and additional client devices that can facilitate adaptable QR codes for customized experiences with connected users in accordance with one or more embodiments described herein.

As described herein, the client device 104 can scan the QR code 202 displayed by the merchant signage 106, and the adaptable QR code system 102 can provide the digital content 702 to the client device 104. In various other cases, however, the adaptable QR code system 102 can provide the digital content to one or more other client devices 1904.

In various embodiments, the client profile 504 can indicate and/or otherwise identify the one or more other client devices 1904. In various other embodiments, however, the client component 116 can electronically identify a social media account 1902 based on the client profile 504, and the client component 116 can electronically analyze the social media account 1902 so as to identify the one or more other client devices 1904. This is explained in more detail with respect to FIG. 20.

Figure 20:
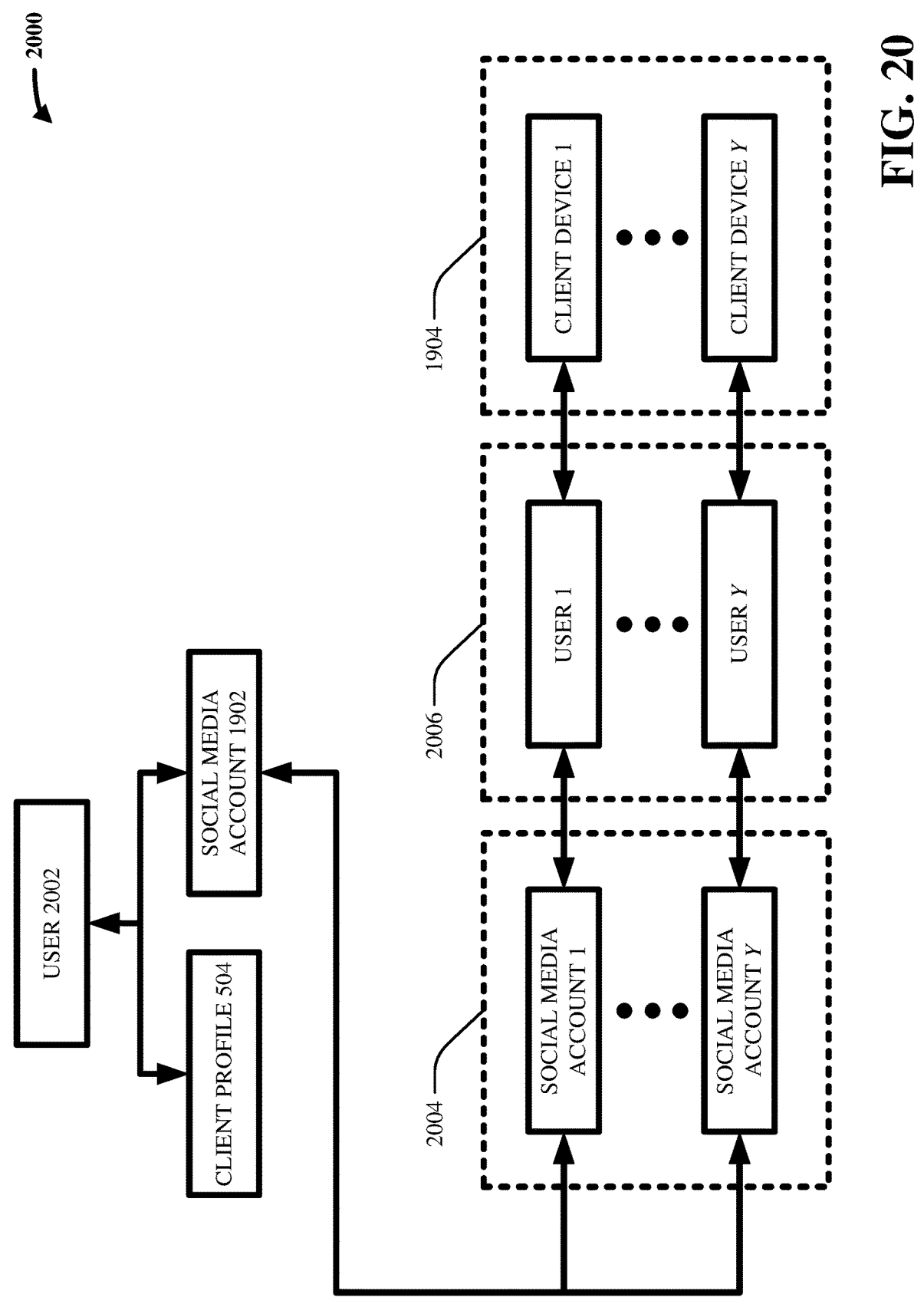
FIG. 20 illustrates a high-level block diagram showing how a social media account can be used to identify additional client devices in accordance with one or more embodiments described herein.

FIG. 20 illustrates a high-level block diagram showing how a social media account can be used to identify additional client devices in accordance with one or more embodiments described herein. That is, FIG. 20 depicts how the client component 116 can leverage the social media account 1902 to identify the one or more other client devices 1904.

In various aspects, as explained herein, the client profile 504 can indicate attributes and/or characteristics of the user of the client device 104. In various cases, the user of the client device 104 can be denoted as a user 2002. Thus, the client profile 504 (and/or the client identifier 204) can indicate the identity of the user 2002. In various cases, the user 2002 can own, operate, and/or otherwise be associated with the social media account 1902. For example, the social media account 1902 can be a Facebook® account, a Twitter® account, and/or an Instagram® account of the user 2002.

In various instances, the client component 116 can analyze the social media account 1902, via any suitable techniques, so as to identify one or more other social media accounts 2004 that are connected to, linked to, and/or otherwise correlated with the social media account 1902. In various cases, the one or more other social media accounts 2004 can include any suitable number of other social media accounts (e.g., social media account 1 to social media account y, for any suitable positive integer y). As shown, the one or more other social media accounts 2004 can be respectively correlated with one or more other users 2006 (e.g., the social media account 1 can be owned by, operated by, and/or otherwise associated with the user 1, and the social media account y can be owned by, operated by, and/or otherwise associated with the user y). As also shown, the one or more other users 2006 can respectively correlated with the one or more other client devices 1904 (e.g., the client device 1 can be owned by, operated by, and/or otherwise associated with the user 1, and the client device y can be owned by, operated by, and/or otherwise associated with the user y). Accordingly, if a given social media account from the one or more other social media accounts 2004 is identified, a user corresponding to that given social media account can likewise be identified, and a client device corresponding to that user can also be identified. In various cases, because the social media account 1902 can be considered as being correlated with the one or more other social media accounts 2004, the user 2002 can likewise be considered as being correlated with the one or more other users 2006.

In various aspects, the client component 116 can determine that the social media account 1902 is connected to, linked to, and/or otherwise correlated with the one or more other social media accounts 2004, if the social media account 1902 is listed as "social media friends" with the one or more other social media accounts 2004. For example, suppose that the user 2002 has a Facebook® account, and suppose that the user 2002 is Facebook® friends with a user J but not with a user K. Accordingly, the Facebook® account of the user 2002 can be considered as corresponding to the Facebook® account of the user J, and can be considered as not corresponding to the Facebook® account of the user K. Thus, the user 2002 can likewise be considered as corresponding to the user J and not corresponding to the user K.

In various instances, the client component 116 can determine that the social media account 1902 is connected to, linked to, and/or otherwise correlated with the one or more other social media accounts 2004, if the social media account 1902 has tagged and/or messaged the one or more other social media accounts 2004 within any suitable past period of time. For example, suppose that the user 2002 has a Facebook® account, and suppose that the user 2002 tagged, within the past week, a user L in a Facebook® post but did not tag, within the past week, a user M in a Facebook® post. Accordingly, the Facebook® account of the user 2002 can be considered as corresponding to the Facebook® account of the user L, and can be considered as not corresponding to the Facebook® account of the user M. Thus, the user 2002 can likewise be considered as corresponding to the user L and not corresponding to the user M.

In various cases, the client component 116 can determine that the social media account 1902 is connected to, linked to, and/or otherwise correlated with the one or more other social media accounts 2004, if the one or more other social media accounts 2004 have interacted with a post of the social media account 1902 within any suitable past period of time. For example, suppose that the user 2002 has a Facebook® account, and suppose that a user N has liked and/or shared, within the past 10 days, a Facebook® post made by the user 2002, while a user O has not liked and/or shared, within the past 10 days, a Facebook® post made by the user 2002. Accordingly, the Facebook® account of the user 2002 can be considered as corresponding to the Facebook® account of the user N, and can be considered as not corresponding to the Facebook® account of the user O. Thus, the user 2002 can likewise be considered as corresponding to the user N and not corresponding to the user O.

In various aspects, the client component 116 can identify the social media account 1902 based on the client profile 504 (e.g., the client profile 504 can indicate characteristics and/or an identify of the user 2002, and the user 2002 can own and/or operate the social media account 1902). Accordingly, the client component 116 can identify the one or more other social media accounts 2004 that are correlated in any suitable fashion with the social media account 1902 (e.g., the one or more other social media accounts 2004 can have interacted with and/or can be friends with the social media account 1902). Thus, the client component 116 can identify the one or more other users 2006 that respectively own/ operate the one or more other social media accounts 2004. Accordingly, the client component 116 can identify the one or more other client devices 1904 that are respectively owned and/or operated by the one or more other users 2006.

Although the herein discussion mainly describes that the client component 116 can identify the one or more other client devices 1904 based on the social media account 1902, this is a mere non-limiting example. In some cases, any other suitable profile/account that is associated with a different platform than the client profile 504 can be implemented, whether or not the any other suitable profile/account is a social media account. For example, in some cases, the client profile 504 can be a PayPal® profile, and the any other suitable profile/account can be a Facebook® account, a Twitter® account, an Instagram® account, a Venmo® account, a Slack® account, a Teams® account, a Skype® account, and/or a Zoom® account. In any case, as long as the any other suitable profile/account is hosted on a different platform than the client profile 504, the any other suitable profile/account can be analyzed as described above to iden- tify one or more other users (e.g., 2006) that are correlated with the user of the client device 104, and thus to identify the one or more other client devices 1904.

Once the one or more other users 2006 and/or the one or more other client devices 1904 are identified, the content component 118 can identify the digital content 702 based on any suitable information associated with the one or more other users 2006. For example, in some cases, the content component 118 can identify the digital content 702 based on financial instruments used by the one or more other users 2006, based on product/service preferences of the one or more other users 2006, based on transaction histories of the one or more other users 2006, based on electronic shopping carts of the one or more other users 2006, and/or based on demographics of the one or more other users 2006. More- over, in various instances, the transmitter component 120 can electronically cause the digital content 702 to be pro- vided to the one or more other client devices 1904. In various cases, the one or more other client devices 1904 can accordingly render the digital content 702, such that the digital content 702 is viewable by the one or more other users 2006. In other words, the client device 104 can scan the QR code 202, and any advertisements, coupons, dis- counts, and/or reward points that are identified by the content component 118 can be shared with the one or more other client devices 1904.

In some cases, the transmitter component 120 can trans- mit, as part of the digital content 702, any suitable subset of the client profile 504 to the one or more other client devices 1904. That is, in various aspects, the one or more other users 2006 can be granted access to the financial instruments of the user 2002, can be granted access to the product/service preferences of the user 2002, can be granted access to the transaction histories of the user 2002, and/or can be granted access to the electronic shopping carts of the user 2002. In various cases, the one or more other users 2006 can be allowed to utilize and/or charge the financial instruments of the user 2002. In various instances, the electronic shopping carts of the user 2002 can be combined with one or more electronic shopping carts of the one or more other users 2006.

In various embodiments, the transmitter component 120 can cause the digital content 702 to be provided to the one or more other client devices 1904, based on determining that the one or more other client devices 1904 are within any suitable threshold distance of the client device 104. In other words, just as the client device 104 can electronically transmit the location indicator 206 to the receiver compo- nent 112, the one or more other client devices 1904 can respectively transmit one or more other location indicators to the receiver component 112. In various aspects, the receiver component 112 can electronically compare the location indicator 206 with the one or more other location indicators. If the receiver component 112 determines that the one or more other location indicators are within any suitable threshold margin of the location indicator 206, the transmit- ter component 120 can cause the digital content 702 to be provided to the one or more other client devices 1904. In contrast, if the receiver component 112 determines that the one or more other location indicators are not within any suitable threshold margin of the location indicator 206, the transmitter component 120 can refrain from causing the digital content 702 to be provided to the one or more other client devices 1904. In such cases, the one or more other client devices 1904 can be provided with the digital content 702 only when the one or more other client devices 1904 are sufficiently physically near the client device 104.

In various other embodiments, the transmitter component 120 can cause the digital content 702 to be provided to the one or more other client devices 1904, based on determining that the one or more other client devices 1904 are within any suitable threshold distance of a location associated with the merchant 304. Again, just as the client device 104 can electronically transmit the location indicator 206 to the receiver component 112, the one or more other client devices 1904 can respectively transmit one or more other location indicators to the receiver component 112. In various aspects, the receiver component 112 can electronically compare the one or more other location indicators to a location that is known to be associated with the merchant 304 (e.g., a location at which the merchant 304 has a store, a location at which the merchant 304 otherwise does business, any other suitable location designated by the merchant 304). If the receiver component 112 determines that the one or more other location indicators are within any suitable threshold margin of the location that is known to be associated with the merchant 304, the transmitter component 120 can cause the digital content 702 to be provided to the one or more other client devices 1904. In contrast, if the receiver com- ponent 112 determines that the one or more other location indicators are not within any suitable threshold margin of the location that is known to be associated with the merchant 304, the transmitter component 120 can refrain from causing the digital content 702 to be provided to the one or more other client devices 1904. In such cases, the one or more other client devices 1904 can be provided with the digital content 702 only when the one or more other client devices 1904 are sufficiently physically near the location that is known to be associated with the merchant 304.

In still other embodiments, the transmitter component 120 can cause the digital content 702 to be provided to the one or more other client devices 1904, based on determining that the one or more other client devices 1904 have performed a specified computing action within a specified time period. In some cases, such specified computing action can include interacting with a webpage that is associated with the merchant 304. For example, the transmitter component 120 can cause the digital content 702 to be provided to the one or more other client devices 1904, based on determining that the one or more other client devices 1904 have electronically visited and/or browsed the webpage of the merchant 304 within any suitable time period. In other cases, such speci- fied computing action can include providing contact infor- mation to the merchant 304. For instance, the transmitter component 120 can cause the digital content 702 to be provided to the one or more other client devices 1904, based on determining that the one or more other client devices 1904 have electronically transmitted, to a computing device associated with the merchant 304, phone numbers and/or email addresses respectively corresponding to the one or more other users 2006 within any suitable time period. In still other cases, such specified computing action can include subscribing to receive emails from the merchant 304. For example, the transmitter component 120 can cause the digital content 702 to be provided to the one or more other client devices 1904, based on determining that the one or more other client devices 1904 have electronically transmitted indications of consent to receive email advertisements from a computing device associated with the merchant 304. In any case, if the adaptable QR code system 102 determines that the one or more other client devices 1904 have performed the specified computing action during the specified time period, the transmitter component 120 can cause the digital content 702 to be provided to the one or more other client devices 1904. In contrast, if the adaptable QR code system 102 determines that the one or more other client devices 1904 have not performed the specified computing action during the specified time period, the transmitter component 120 can refrain from causing the digital content 702 to be provided to the one or more other client devices 1904.

FIG. 21 illustrates a flow diagram of an example, non-limiting computer-implemented method 2100 that an facilitate adaptable QR codes for customized experiences with connected users in accordance with one or more embodiments described herein. In various cases, the computer-implemented method 2100 can be facilitated by the adaptable QR code system 102.

In various embodiments, act 2102 can include receiving, by a device (e.g., 112) operatively couple to a processor, a QR code (e.g., 202), a first client ID (e.g., 204), and/or a first location indicator (e.g., 206) from a first client device (e.g., 104).

In various aspects, act 2104 can include identifying, by the device (e.g., 114), a merchant (e.g., 304) based on the first location indicator and/or the QR code.

In various instances, act 2106 can include identifying, by the device (e.g., 116), a first client profile (e.g., 504) of a first user (e.g., 2002) based on the first client ID.

In various aspects, act 2108 can include identifying, by the device (e.g., 116), one or more second users (e.g., 2006) that are connected to the first user, by analyzing a social media account (e.g., 1902) of the first user. In various cases, the one or more second users can be social media friends with the first user, can have been tagged on social media by the first user, and/or can have interacted with social media posts made by the first user.

In various instances, act 2110 can include identifying, by the device (e.g., 118), digital content (e.g., 702) based on the merchant, the first client profile, and/or data associated with the one or more second users (e.g., product/service preferences of the one or more second users, transaction histories of the one or more second users).

In various aspects, act 2112 can include causing, by the device (e.g., 120), the digital content to be provided to the first client device and/or to one or more second client devices (e.g., 1904) that are associated with the one or more second users. In various cases, this can depend upon the one or more second client devices being within any suitable threshold vicinity of the first client device.

Figure 22:
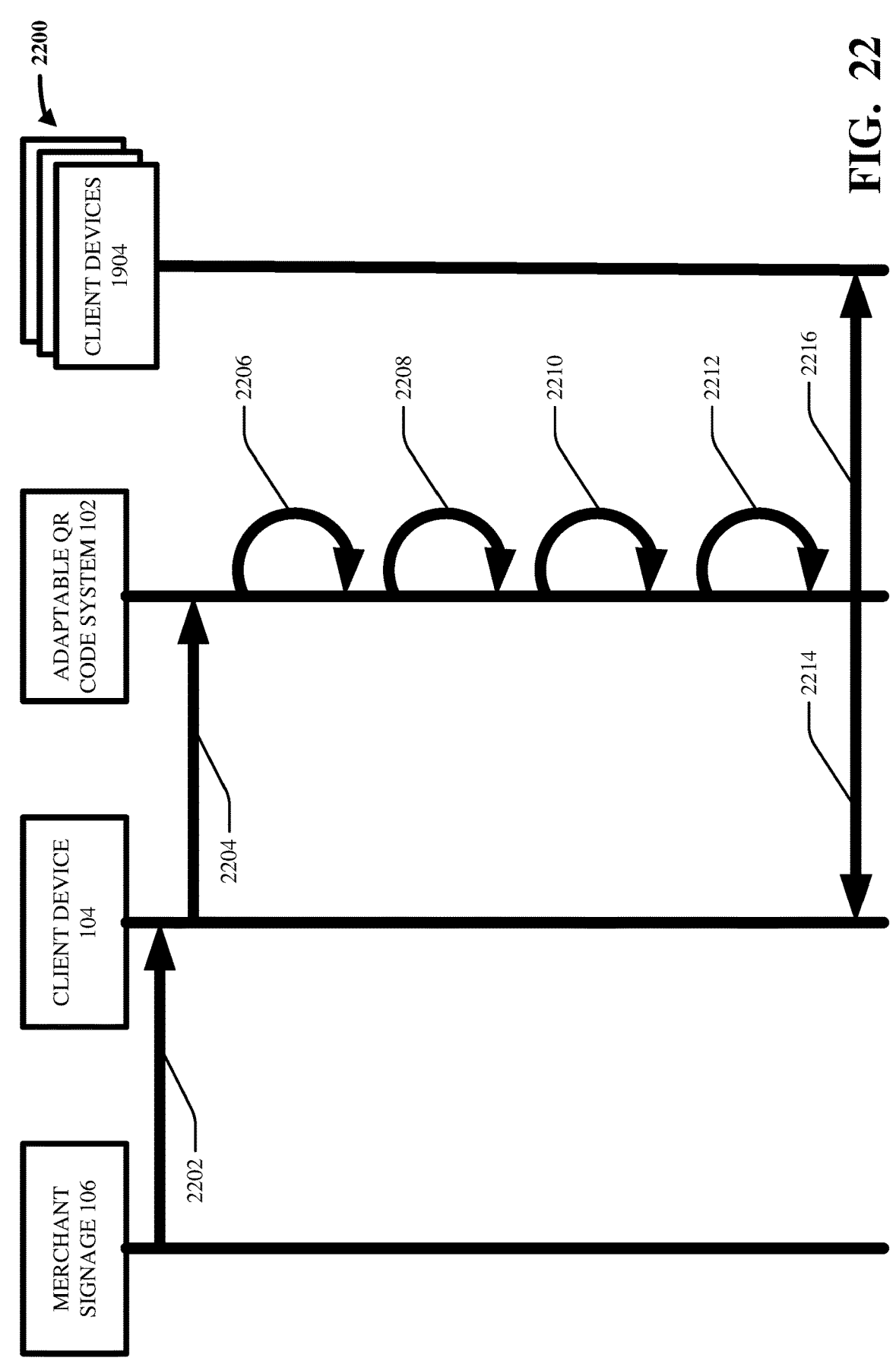
FIG. 22 illustrates a communication diagram of an example, non-limiting workflow that facilitates adaptable QR codes for customized experiences with connected users in accordance with one or more embodiments described herein.

FIG. 22 illustrates a communication diagram of an example, non-limiting workflow 2200 that can facilitate adaptable QR codes for customized experiences with connected users in accordance with one or more embodiments described herein.

In various embodiments, the merchant signage 106 can visually display the QR code 202 to the client device 104. Accordingly, at act 2202, the client device 104 can electronically scan and/or capture the QR code 202.

In various instances, the client device 104 can, at act 2204, electronically transmit the QR code 202 to the adaptable QR code system 102. In various cases, the client device 104 can also, at act 2204, determine and electronically transmit the client identifier 204 and the location indicator 206 to the adaptable QR code system 102.

In various aspects, the adaptable QR code system 102 can, at act 2206, electronically identify the merchant 304 based on the location indicator 206 and/or the QR code 202 (e.g., by leveraging the merchant repository 302).

In various instances, the adaptable QR code system 102 can, at act 2208, electronically identify the client profile 504 based on the client identifier 204 (e.g., by leveraging the client profile repository 502).

In various aspects, the adaptable QR code system 102 can, at act 2210, electronically identify the one or more other users 2006 that are correlated with the user of the client device 104. In various cases, this can be facilitated by analyzing the social media account 1902 of the user of the client device 104. Accordingly, the adaptable QR code system 102 can, also at act 2210, identify the one or more other client devices 1904.

In various aspects, the adaptable QR code system 102 can, at act 2212, electronically identify the digital content 702 based on the merchant 304, the client profile 504, and/or data associated with the one or more other users 2006 (e.g., by using the client profile 504 and/or analogous client profiles of the one or more other users 2006 to filter and/or sort through electronic records that specify the inventory, promotions, and/or reward plans of the merchant 304). Accordingly, the digital content 702 can be considered as being customized to the user of the client device 104 and/or to the one or more other users 2006.

In various instances, the adaptable QR code system 102 can, at act 2214, electronically transmit the digital content 702 to the client device 104.

In various aspects, the adaptable QR code system 102 can, at act 2216, electronically transmit the digital content 702 to the one or more other client devices 1904.

FIGS. 23-24 illustrate flow diagrams of example, non-limiting computer-implemented methods 2300-2400 that can facilitate adaptable QR codes for customized experiences in accordance with one or more embodiments described herein. In various cases, the computer-implemented methods 2300-2400 can be implemented by the adaptable QR code system 102.

First, consider the computer-implemented method 2300. In various embodiments, act 2302 can include receiving, by a device (e.g., 112) operatively coupled to a processor and from a customer device (e.g., 104), a quick response (QR) code (e.g., 202), a customer identifier (e.g., 204), and/or geolocation information (e.g., 206) associated with the customer device.

In various instances, act 2304 can include identifying, by the device (e.g., 114) and from a plurality of vendors (e.g., 406), a first vendor (e.g., 304) that corresponds to the QR code, based on identifying that the first vendor corresponds to the geolocation information.

In various aspects, act 2306 can include identifying, by the device (e.g., 116) and from a plurality of customer profiles (e.g., 604), a first customer profile (e.g., 504), that corresponds to the customer identifier.

In various instances, act 2308 can include identifying, by the device (e.g., 118), electronic content (e.g., 702) based on the first vendor and/or the first customer profile.

In various aspects, act 2310 can include causing, by the device (e.g., 120), the electronic content to be provided to the customer device.

Although not explicitly shown in FIG. 23, the electronic content can include: an advertisement or a recommendation for a product or service based on a current inventory of the first vendor or based on product or service preferences (e.g., 608 indicated by the first customer profile; or an amount of reward points earned from the first vendor based on a transaction history (e.g., 610) indicated by the first customer profile.

Although not explicitly shown in FIG. 23, the computer-implemented method 2300 can further comprise: analyzing, by the device (e.g., 114), an electronic record associated with the first vendor to determine if the QR code is in an active state; in response to determining that the QR code is in an active state, identifying, by the device (e.g., 118), the electronic content; and in response to determining that the QR code is in an inactive state, transmitting, by the device (e.g., 120), an electronic message to a computing device (e.g., 1002) associated with the first vendor, wherein the electronic message prompts the first vendor to activate the QR code.

Although not explicitly shown in FIG. 23, the QR code can be received via a first program (e.g., Venmo® app) of the customer device, and the electronic content can be provided via a second program (e.g., PayPal® app) of the customer device.

Although not explicitly shown in FIG. 23, the electronic content can be provided via the second program (e.g., PayPal® app) based on determining that the second program is a preferred program of a user of the customer device.

Although not explicitly shown in FIG. 23, the computer-implemented method 2300 can further comprise: analyzing, by the device (e.g., 118), a database corresponding to a second program (e.g., PayPal® app) to identify the first vendor, the first customer profile, and the electronic content, wherein the electronic content is provided via the first program (e.g., Venmo® app) of the customer device.

Although not explicitly shown in FIG. 23, the computer-implemented method 2300 can further comprise: receiving, by the device (e.g., 112), sound information (e.g., 1302) from the customer device; identifying, by the device (e.g., 1202), a sound signature (e.g., 1304) that corresponds to the QR code; and comparing, by the device (e.g., 1202), the sound information with the sound signature, wherein the causing the electronic content to be provided to the customer device is based on determining that the sound information corresponds to the sound signature.

Now, consider the computer-implemented method 2400. In various embodiments, act 2402 can include receiving, by a device (e.g., 112) operatively coupled to a processor and from a first client device (e.g., 104), a quick response (QR) code (e.g., 202), a first client identifier (e.g., 204), and/or a first location indicator (e.g., 206) associated with the first client device.

In various aspects, act 2404 can include identifying, by the device (e.g., 114) and from a plurality of merchants (e.g., 406), a first merchant (e.g., 304) that corresponds to the QR code, based on identifying that the first merchant corresponds to the first location indicator.

In various instances, act 2406 can include identifying, by the device (e.g., 116) and from a plurality of client profiles (e.g., 604), a first client profile (e.g., 504) of a first user (e.g., 2002) that corresponds to the first client identifier.

In various aspects, act 2408 can include identifying, by the device (e.g., 116), one or more second users (e.g., 2006) that correspond to the first user.

In various instances, act 2410 can include identifying, by the device (e.g., 118), digital content (e.g., 702) based on the first merchant, the first client profile, and/or information corresponding to the one or more second users.

In various aspects, act 2412 can include causing, by the device (e.g., 120), the digital content to be provided to the first client device and/or one or more second client devices (e.g., 1904) corresponding to the one or more second users.

Although not explicitly shown in FIG. 24, the identifying the one or more second users that correspond to the first user can comprise: analyzing, by the device (e.g., 116), a second client profile (e.g., 1902) associated with the first user, wherein the second client profile corresponds to a first platform (e.g., Facebook®, Twitter®, Instagram®) that is different than a second platform (e.g., PayPal®) associated with the first client profile; and identifying, by the device (e.g., 116), the one or more second users based on determining that one or more client profiles corresponding to the one or more second users and corresponding to the first platform are connected to the second client profile of the first user. In some cases, the second client profile can be social media profile.

Although not explicitly shown in FIG. 24, the identifying the one or more second users that correspond to the first user can comprise: determining, by the device (e.g., 116) that one or more client profiles (e.g., 2004) associated with the one or more second users are connected to the first client profile.

Although not explicitly shown in FIG. 24, the computer-implemented method 2400 can further comprise: receiving, by the device (e.g., 112) one or more second location indicators from the one or more second client devices; and comparing, by the device (e.g., 112), the first location indicator with the one or more second location indicators, wherein the causing the digital content to be provided to the one or more second client devices is based on determining that the one or more second location indicators are within a threshold distance of the first location indicator.

In various instances, machine learning algorithms and/or models can be implemented in any suitable way to facilitate any suitable aspects described herein. That is, the receiver component 112 can implement any suitable artificial intelligence algorithms to perform its above-described functions, the merchant component 114 can implement any suitable artificial intelligence algorithms to perform its above-described functions, the client component 116 can implement any suitable artificial intelligence algorithms to perform its above-described functions, the content component 118 can implement any suitable artificial intelligence algorithms to perform its above-described functions, the transmitter component 120 can implement any suitable artificial intelligence algorithms to perform its above-described functions, and/or the fraud component 1202 can implement any suitable artificial intelligence algorithms to perform its above-described functions.

To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 25:
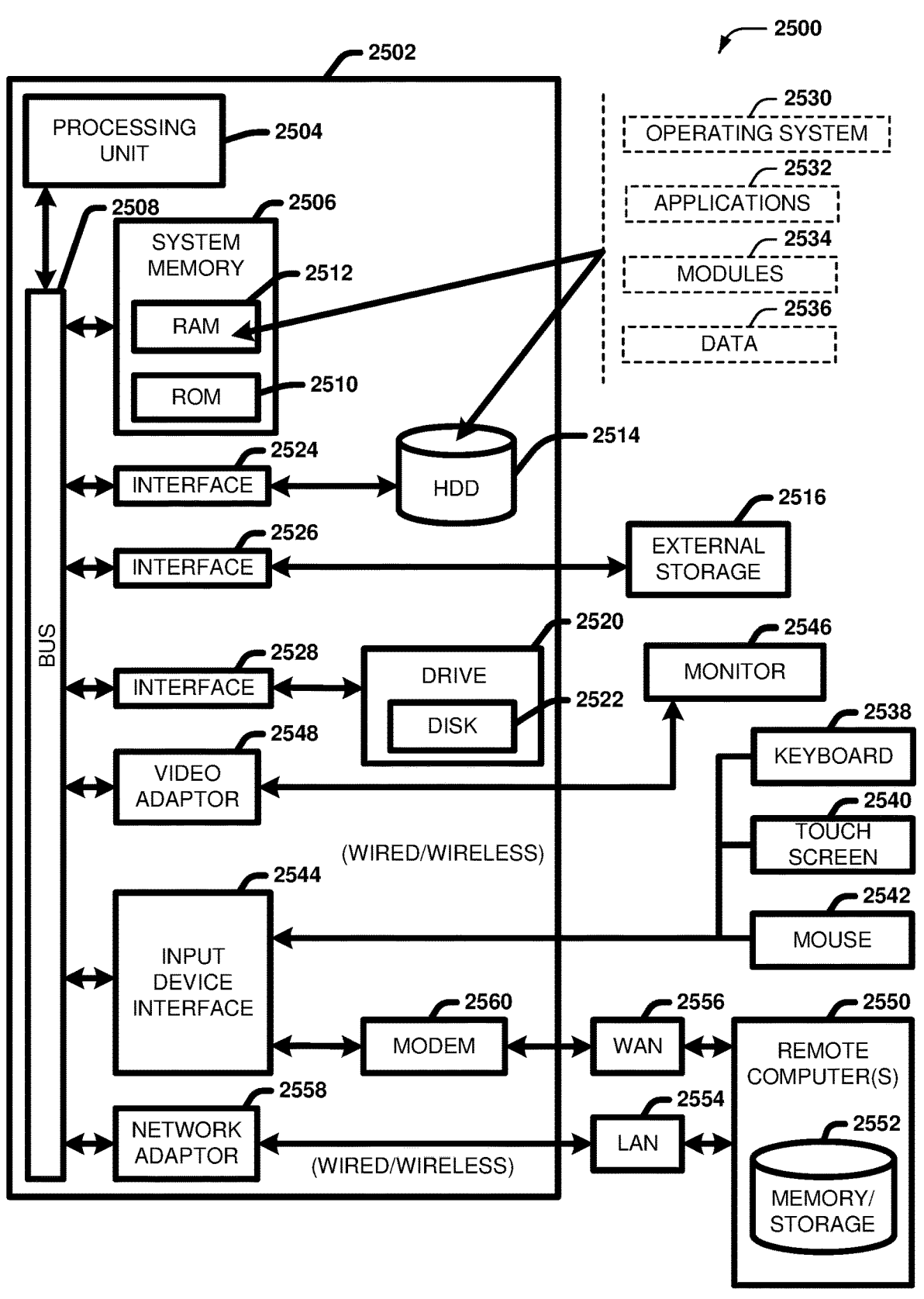
FIG. 25 illustrates a block diagram of an example, non-limiting operating environment in which one or more embodiments described herein can be facilitated.

In order to provide additional context for various embodiments described herein, FIG. 25 and the following discussion are intended to provide a brief, general description of a suitable computing environment 2500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 25, the example environment 2500 for implementing various embodiments of the aspects described herein includes a computer 2502, the computer 2502 including a processing unit 2504, a system memory 2506 and a system bus 2508. The system bus 2508 couples system components including, but not limited to, the system memory 2506 to the processing unit 2504. The processing unit 2504 can be any of various commercially available processors. Dual microprocessors and other multi processor architectures can also be employed as the processing unit 2504.

The system bus 2508 can be any of several types of bus structure that can further interconnect to a memory bus (with or without a memory controller), a peripheral bus, and a local bus using any of a variety of commercially available bus architectures. The system memory 2506 includes ROM 2510 and RAM 2512. A basic input/output system (BIOS) can be stored in a non-volatile memory such as ROM, erasable programmable read only memory (EPROM), EEPROM, which BIOS contains the basic routines that help to transfer information between elements within the computer 2502, such as during startup. The RAM 2512 can also include a high-speed RAM such as static RAM for caching data.

The computer 2502 further includes an internal hard disk drive (HDD) 2514 (e.g., EIDE, SATA), one or more external storage devices 2516 (e.g., a magnetic floppy disk drive (FDD) 2516, a memory stick or flash drive reader, a memory card reader, etc.) and a drive 2520, e.g., such as a solid state drive, an optical disk drive, which can read or write from a disk 2522, such as a CD-ROM disc, a DVD, a BD, etc. Alternatively, where a solid state drive is involved, disk 2522 would not be included, unless separate. While the internal HDD 2514 is illustrated as located within computer 2502, the internal HDD 2514 can also be config- ured for external use in a suitable chassis (not shown). Additionally, while not shown in environment 2500, a solid state drive (SSD) could be used in addition to, or in place of, an HDD 2514. The HDD 2514, external storage device(s) 2516 and drive 2520 can be connected to the system bus 2508 by an HDD interface 2524, an external storage inter- face 2526 and a drive interface 2528, respectively. The interface 2524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2512, including an operating system 2530, one or more application programs 2532, other program modules 2534 and program data 2536. All or portions of the operating system, applications, modules, and/or data can also be cached in the RAM 2512. The systems and methods described herein can be implemented utilizing various com- mercially available operating systems or combinations of operating systems.

Computer 2502 can optionally comprise emulation tech- nologies. For example, a hypervisor (not shown) or other intermediary can emulate a hardware environment for oper- ating system 2530, and the emulated hardware can option- ally be different from the hardware illustrated in FIG. 25. In such an embodiment, operating system 2530 can comprise one virtual machine (VM) of multiple VMs hosted at com- puter 2502. Furthermore, operating system 2530 can provide runtime environments, such as the Java runtime environ- ment or the .NET framework, for applications 2532. Run- time environments are consistent execution environments that allow applications 2532 to run on any operating system that includes the runtime environment. Similarly, operating system 2530 can support containers, and applications 2532 can be in the form of containers, which are lightweight, standalone, executable packages of software that include, e.g., code, runtime, system tools, system libraries and set- tings for an application.

Further, computer 2502 can be enable with a security module, such as a trusted processing module (TPM). For instance with a TPM, boot components hash next in time boot components, and wait for a match of results to secured values, before loading a next boot component. This process can take place at any layer in the code execution stack of computer 2502, e.g., applied at the application execution level or at the operating system (OS) kernel level, thereby enabling security at any level of code execution.

A user can enter commands and information into the computer 2502 through one or more wired/wireless input devices, e.g., a keyboard 2538, a touch screen 2540, and a pointing device, such as a mouse 2542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2504 through an input device interface 2544 that can be coupled to the system bus 2508, but can be connected by other interfaces, such as a parallel port, an IEEE 1394 serial port, a game port, a USB port, an IR interface, a BLUETOOTH® interface, etc.

A monitor 2546 or other type of display device can be also connected to the system bus 2508 via an interface, such as a video adapter 2548. In addition to the monitor 2546, a computer typically includes other peripheral output devices (not shown), such as speakers, printers, etc.

The computer 2502 can operate in a networked environ- ment using logical connections via wired and/or wireless communications to one or more remote computers, such as a remote computer(s) 2550. The remote computer(s) 2550 can be a workstation, a server computer, a router, a personal computer, portable computer, microprocessor-based enter- tainment appliance, a peer device or other common network node, and typically includes many or all of the elements described relative to the computer 2502, although, for pur- poses of brevity, only a memory/storage device 2552 is illustrated. The logical connections depicted include wired/ wireless connectivity to a local area network (LAN) 2554 and/or larger networks, e.g., a wide area network (WAN) 2556. Such LAN and WAN networking environments are commonplace in offices and companies, and facilitate enterprise-wide computer networks, such as intranets, all of which can connect to a global communications network, e.g., the Internet.

When used in a LAN networking environment, the computer 2502 can be connected to the local network 2554 through a wired and/or wireless communication network interface or adapter 2558. The adapter 2558 can facilitate wired or wireless communication to the LAN 2554, which can also include a wireless access point (AP) disposed thereon for communicating with the adapter 2558 in a wireless mode.

When used in a WAN networking environment, the computer 2502 can include a modem 2560 or can be connected to a communications server on the WAN 2556 via other means for establishing communications over the WAN 2556, such as by way of the Internet. The modem 2560, which can be internal or external and a wired or wireless device, can be connected to the system bus 2508 via the input device interface 2544. In a networked environment, program modules depicted relative to the computer 2502 or portions thereof, can be stored in the remote memory/storage device 2552. It will be appreciated that the network connections shown are example and other means of establishing a communications link between the computers can be used.

When used in either a LAN or WAN networking environment, the computer 2502 can access cloud storage systems or other network-based storage systems in addition to, or in place of, external storage devices 2516 as described above, such as but not limited to a network virtual machine providing one or more aspects of storage or processing of information. Generally, a connection between the computer 2502 and a cloud storage system can be established over a LAN 2554 or WAN 2556 e.g., by the adapter 2558 or modem 2560, respectively. Upon connecting the computer 2502 to an associated cloud storage system, the external storage interface 2526 can, with the aid of the adapter 2558 and/or modem 2560, manage storage provided by the cloud storage system as it would other types of external storage. For instance, the external storage interface 2526 can be configured to provide access to cloud storage sources as if those sources were physically connected to the computer 2502.

The computer 2502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 26 is a schematic block diagram of a sample computing environment 2600 with which the disclosed subject matter can interact. The sample computing environment 2600 includes one or more client(s) 2610. The client(s) 2610 can be hardware and/or software (e.g., threads, processes, computing devices). The sample computing environment 2600 also includes one or more server(s) 2630. The server(s) 2630 can also be hardware and/or software (e.g., threads, processes, computing devices). The servers 2630 can house threads to perform transformations by employing one or more embodiments as described herein, for example. One possible communication between a client 2610 and a server

2630 can be in the form of a data packet adapted to be transmitted between two or more computer processes. The sample computing environment 2600 includes a communication framework 2650 that can be employed to facilitate communications between the client(s) 2610 and the server(s) 2630. The client(s) 2610 are operably connected to one or more client data store(s) 2620 that can be employed to store information local to the client(s) 2610. Similarly, the server(s) 2630 are operably connected to one or more server data store(s) 2640 that can be employed to store information local to the servers 2630.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments are provided in the subject matter that follows:

1. A system, comprising: a processor that executes computer-executable instructions stored in a computer-readable memory, which causes the processor to: receive, from a client device, a quick response (QR) code, a client identifier, and location data associated with the client device; identify, from a plurality of merchants, a first merchant that corresponds to the QR code, based on identifying that the first merchant corresponds to the location data; identify, from a plurality of client profiles, a first client profile that corresponds to the client identifier; identify a digital content based on the first merchant and the first client profile; and cause the digital content to be provided to the client device.

2. The system of any preceding clause, wherein the digital content includes: an advertisement or a recommendation for a product or service based on a current inventory of the first merchant or based on product or service preferences indicated by the first client profile; or an amount of reward points earned from the first merchant based on a transaction history indicated by the first client profile.

3. The system of any preceding clause, wherein the computer-executable instructions are further executable to cause the processor to: analyze an electronic record associated with the first merchant to determine if the QR code is in an active state; in response to determining that the QR code is in an active state, identify the digital content; and in response to determining that the QR code is in an inactive state, transmit an electronic message to a computing device associated with the first merchant, wherein the electronic message prompts the first merchant to activate the QR code.

4. The system of any preceding clause, wherein the processor receives the QR code via a first application of the client device, and wherein the processor causes the digital content to be provided via a second application of the client device.

5. The system of any preceding clause, wherein the digital content is provided via the second application based on determining that the second application is a preferred application of a user of the client device.

6. The system of system of any preceding clause, wherein the processor receives the QR code via a first application of the client device, wherein the processor analyzes a database corresponding to a second application to identify the first merchant, the first client profile, and the digital content, and wherein the processor causes the digital content to be provided via the first application of the client device.

7. The system of any preceding clause, wherein the computer-executable instructions are further executable to cause the processor to: receive sound data from the client device; identify a sound signature that corresponds to the QR code; and compare the sound data with the sound signature, wherein the processor causes the digital content to be provided to the client device based on determining that the sound data corresponds to the sound signature.

8. A computer-implemented method, comprising: receiving, by a device operatively coupled to a processor and from a customer device, a quick response (QR) code, a customer identifier, and geolocation information associated with the customer device; identifying, by the device and from a plurality of vendors, a first vendor that corresponds to the QR code, based on identifying that the first vendor corresponds to the geolocation information; identifying, by the device and from a plurality of customer profiles, a first customer profile that corresponds to the customer identifier; identifying, by the device, electronic content based on the first vendor and the first customer profile; and causing, by the device, the electronic content to be provided to the customer device.

9. The computer-implemented method of any preceding clause, wherein the electronic content includes: an advertisement or a recommendation for a product or service based on a current inventory of the first vendor or based on product or service preferences indicated by the first customer profile; or an amount of reward points earned from the first vendor based on a transaction history indicated by the first customer profile.

10. The computer-implemented method of any preceding clause, further comprising: analyzing, by the device, an electronic record associated with the first vendor to determine if the QR code is in an active state; in response to determining that the QR code is in an active state, identifying, by the device, the electronic content; and in response to determining that the QR code is in an inactive state, transmitting, by the device, an electronic message to a computing device associated with the first vendor, wherein the electronic message prompts the first vendor to activate the QR code.

11. The computer-implemented method of any preceding clause, wherein the QR code is received via a first program of the customer device, and wherein the electronic content is provided via a second program of the customer device.

12. The computer-implemented method of any preceding clause, wherein the electronic content is provided via the second program based on determining that the second program is a preferred program of a user of the customer device.

13. The computer-implemented method of any preceding clause, wherein the QR code is received via a first program of the customer device, and further comprising: analyzing, by the device, a database corresponding to a second program to identify the first vendor, the first customer profile, and the electronic content, wherein the electronic content is provided via the first program of the customer device.

14. The computer-implemented method of any preceding clause, further comprising: receiving, by the device, sound information from the customer device; identifying, by the device, a sound signature that corresponds to the QR code; and comparing, by the device, the sound information with the sound signature, wherein the causing the electronic content to be provided to the customer device is based on determining that the sound information corresponds to the sound signature.

15. A computer program product for facilitating adaptable quick response (QR) codes for customized experiences, the computer program product comprising a computer-readable memory having program instructions embodied therewith, the program instructions executable by a processor to cause the processor to: receive, from a first client device, a quick response (QR) code, a first client identifier, and a first location indicator; identify, from a plurality of merchants, a first merchant that corresponds to the QR code, based on identifying that the first merchant corresponds to the first location indicator; identify, from a plurality of client profiles, a first client profile of a first user that corresponds to the first client identifier; identify one or more second users that correspond to the first user; identify a digital content based on the first merchant, the first client profile, and information corresponding to the one or more second users; and cause the digital content to be provided to the first client device and one or more second client devices that respectively correspond to the one or more second users.

16. The computer program product of any preceding clause, wherein the identifying the one or more second users that correspond to the first user comprises: analyze a second client profile associated with the first user, wherein the second client profile corresponds to a first platform that is different than a second platform associated with the first client profile; and identify the one or more second users based on determining that one or more client profiles corresponding to the one or more second users and corresponding to the first platform are connected to the second client profile of the first user.

17. The computer program product of any preceding clause, wherein the first platform is a social media platform.

18. The computer program product of any preceding clause, wherein the identifying the one or more second users that correspond to the first user comprises: determining that one or more client profiles associated with the one or more second users are connected to the first client profile.

19. The computer program product of any preceding clause, wherein the program instructions are further executable to cause the processor to: receive one or more second location indicators from the one or more second client devices; and compare the first location indicator with the one or more second location indicators, wherein the processor causes the digital content to be provided to the one or more second client devices based on determining that the one or more second location indicators are within a threshold distance of the first location indicator.

20. The computer program product of any preceding clause, wherein the digital content includes at least one of: an advertisement or recommendation for a product or service based on a current inventory of the first merchant or based on product or service preferences of the one or more second users; or an amount of reward points earned from the first merchant based on transaction histories of the one or more second users.

What is claimed is:

1. A computer-implemented method comprising:
receiving, by at least one processor, a graphical code;
    wherein the graphical code is captured by an image capturing device of a mobile device of a customer;
receiving, by the at least one processor, data from a surrounding environment;
determining, by the at least one processor, that the received graphical code is authentic based on the data received from the surrounding environment;
identifying, by the at least one processor, a merchant associated with the graphical code from a merchant database;
identifying, by the at least one processor, a customer profile that corresponds to the mobile device of the customer;
    wherein the customer profile is associated with at least one financial instrument of the customer;
generating, by the at least one processor, at least one digital content based on determining that the graphical code is authentic and based on the merchant and the customer profile;
identifying, by the at least one processor, a first financial instrument of the at least one financial instrument;
    wherein the first financial instrument is associated with the merchant; and
instructing, by the at least one processor, an application executing on the mobile device of the customer to render the first financial instrument and the at least one digital content for display on the mobile device of the customer.

2. The method of claim 1, wherein the customer profile comprises at least one transaction history between the customer and the merchant, wherein the at least one transaction history comprises how many rewards points have been accumulated by the customer.

3. The method of claim 2, wherein the financial instrument comprises the rewards points.

4. The method of claim 1, further comprising:
receiving, by the at least one processor, an indication that the first financial instrument was used to complete a new transaction associated with the merchant; and
generating, by the at least one processor, an updated at least one transaction history including the new transaction.

5. The method of claim 4, further comprising:
updating, by the at least one processor, the at least one digital content, based on the updated at least one transaction history, to generate an updated at least one digital content; and
instructing, by the at least one processor, the application to render the updated at least one digital content for display on the mobile device of the customer.

6. The method of claim 1, wherein the at least one digital content comprises at least one of rewards points being offered by the merchant, coupons being offered by the merchant or discounts being offered by the merchant.

7. The method of claim 1, wherein the graphical code is a quick response (QR) code.

8. The method of claim 1, further comprising:
receiving, by the at least one processor, an indication that at least one electronic record of the merchant has changed;
generating, by the at least one processor, an updated at least one electronic record;
updating, by the at least one processor, the at least one digital content, based on the updated at least one electronic record, to generate an updated at least one digital content; and
instructing, by the at least one processor, the application to render the updated at least one digital content for display on the mobile device of the customer.

9. The method of claim 8, wherein the at least one electronic record comprises at least one of currently available inventory, currently available promotional offers or currently available rewards plans.

10. A system comprising:
a computing device configured to execute software instructions that cause the computing device to at least:
    receive a graphical code and a customer identifier associated with a customer;
    receive data from a surrounding environment;
    determine that the received graphical code is authentic based on the data received from the surrounding environment;
    identify a merchant associated with the graphical code from a merchant database;
    identify a first financial instrument associated with the merchant; and
    instruct an application executing on the mobile device of the customer to render the first financial instrument and at least one digital content for display on a mobile device of the customer.

11. The system of claim 10, wherein the customer identifier is associated with a customer profile; and wherein the customer profile comprises at least one transaction history between the customer and the merchant, wherein the at least one transaction history comprises how many rewards points have been accumulated by the customer.

12. The system of claim 11, wherein the financial instrument comprises the rewards points.

13. The system of claim 10, wherein the software instructions, when executed, further cause the computing device to perform steps to:
receive an indication that the first financial instrument was used to complete a new transaction associated with the merchant; and
generate an updated at least one transaction history including the new transaction.

14. The system of claim 13, wherein the software instructions, when executed, further cause the computing device to perform steps to:
update the at least one digital content, based on the updated at least one transaction history, to generate an updated at least one digital content; and
instruct the application to render the updated at least one digital content for display on the mobile device of the customer.

15. The system of claim 10, wherein the at least one digital content comprises at least one of rewards points being offered by the merchant, coupons being offered by the merchant or discounts being offered by the merchant.

16. The system of claim 10, wherein the graphical code is a quick response (QR) code.

17. The system of claim 10, wherein the software instructions, when executed, further cause the computing device to perform steps to:

receive an indication that at least one electronic record of the merchant has changed;

generate an updated at least one electronic record;

update the at least one digital content, based on the updated at least one electronic record, to generate an updated at least one digital content; and instruct the application to render the updated at least one digital content for display on the mobile device of the customer.

18. The system of claim 17, wherein the at least one electronic record comprises at least one of currently available inventory, currently available promotional offers or currently available rewards plans.

19. A computer-implemented method comprising:

receiving, by at least one processor, a graphical code from a mobile device;

receiving, by the at least one processor, data from a surrounding environment;

determining, by the at least one processor, that the received graphical code is authentic based on the data received from the surrounding environment;

identifying, by the at least one processor, a merchant associated with the graphical code from a merchant database;

identifying, by the at least one processor, a customer profile that corresponds to the mobile device;

wherein the customer profile is associated with at least one financial instrument of the customer;

generating, by the at least one processor, at least one digital content based on determining that the graphical code is authentic and based on the merchant and the customer profile;

receiving, by the at least one processor, at least one financial instrument prerequisite from the merchant;

determining, by the at least one processor, that the at least one financial instrument does not satisfy the at least one financial instrument prerequisite of the merchant; and instructing, by the at least one processor, an application executing on the mobile device of the customer not to render the at least one digital content for display on the mobile device of the customer.

20. The method of claim 19, wherein the at least one financial instrument prerequisite comprises the at least one financial instrument is associated with the merchant.

* * * * *